United States Patent
Hasselbarth et al.

(10) Patent No.: US 11,118,147 B2
(45) Date of Patent: *Sep. 14, 2021

(54) ADSORPTION SYSTEM AND METHOD FOR OPERATING AN ADSORPTION SYSTEM

(71) Applicant: FLAVOLOGIC GMBH, Vaterstetten (DE)

(72) Inventors: Alexander Hasselbarth, Vaterstetten (DE); Claudia Geyer, Vaterstetten (DE)

(73) Assignee: FLAVOLOGIC GMBH, Vaterstetten (DE)

( * ) Notice: Subject to any disclaimer, the term of this patent is extended or adjusted under 35 U.S.C. 154(b) by 237 days.

This patent is subject to a terminal disclaimer.

(21) Appl. No.: 15/773,908

(22) PCT Filed: Nov. 4, 2016

(86) PCT No.: PCT/EP2016/076743
§ 371 (c)(1),
(2) Date: May 4, 2018

(87) PCT Pub. No.: WO2017/077084
PCT Pub. Date: May 11, 2017

(65) Prior Publication Data
US 2019/0144802 A1 May 16, 2019

(30) Foreign Application Priority Data
Nov. 6, 2015 (DE) ...................... 10 2015 119 155.5

(51) Int. Cl.
*C12H 3/00* (2019.01)
*C12C 5/02* (2006.01)
(Continued)

(52) U.S. Cl.
CPC ................ *C12C 5/026* (2013.01); *A23L 2/56* (2013.01); *A23L 5/273* (2016.08); *A23L 27/70* (2016.08);
(Continued)

(58) Field of Classification Search
CPC .. C12C 12/04; C12G 1/06; C12H 3/00; C12H 3/04
See application file for complete search history.

(56) References Cited

U.S. PATENT DOCUMENTS 5,077,061 A 12/1991 Zuercher et al.
10,704,011 B2 7/2020 Hoem et al.
(Continued)

FOREIGN PATENT DOCUMENTS

DE 2452693 A1 4/1976
JP 5714132 A 1/1982
(Continued)

OTHER PUBLICATIONS

Decision of Refusal for Japanese Patent Application No. 2018-519970, dated Dec. 26, 2019.
(Continued)

*Primary Examiner* — Walter A Moore
(74) *Attorney, Agent, or Firm* — Tarolli, Sundheim, Covell & Tummino LLP

(57) ABSTRACT

The invention relates to an adsorption system (10) for accumulating flavoring substances, comprising at least one working chamber (12) in which at least one sorption agent is provided as a stationary phase and can be subjected to a flavoring substance-containing fluid which can be conducted through the working chamber as a mobile phase for attaching flavoring substances, wherein the flavoring substance-containing fluid is a food item from the group of beer-containing staple and/or luxury food items, beer wort, hops, hop extract, malt water, malt beer, malt wort and brewery-specific ingredients and products and/or is obtained by means of a dealcoholizing device from an ethanol-containing food item from the group of beer-containing staple and/or luxury food items, wherein a ratio of an average cross-sectional thickness to the total length of the at least one working chamber (12) is at most 0.3. The invention also relates to a method for operating such an adsorption system (10), a flavoring substance concentrate and a deflavored permeate which can be and/or are obtained by means of such (Continued)

an adsorption system (10) and/or by means of such a method from a flavoring substance-containing fluid, as well as to a beer which can be or is obtained by mixing an at least partially dealcoholized and/or fermentation-halted beer having such a flavoring substance concentrate.

8 Claims, 14 Drawing Sheets

(51) Int. Cl.
| | | |
|---|---|---|
| *A23L 2/56* | (2006.01) | |
| *C11B 9/02* | (2006.01) | |
| *A23L 27/00* | (2016.01) | |
| *C12H 6/02* | (2019.01) | |
| *C12H 3/04* | (2019.01) | |
| *A23L 5/20* | (2016.01) | |

(52) U.S. Cl.
CPC .............. *A23L 27/72* (2016.08); *C11B 9/022* (2013.01); *C12H 3/00* (2019.02); *C12H 3/04* (2019.02); *C12H 6/02* (2019.02); *A23V 2002/00* (2013.01); *C12G 2200/21* (2013.01)

(56) References Cited

U.S. PATENT DOCUMENTS

| | | | |
|---|---|---|---|
| 2013/0129866 A1 | 5/2013 | Phillips et al. | |
| 2014/0377411 A1 | 12/2014 | Hadasz | |
| 2016/0326473 A1* | 11/2016 | Thurnheer | ............. B01D 3/002 |

FOREIGN PATENT DOCUMENTS

| | | |
|---|---|---|
| JP | 60-7363 U | 1/1985 |
| JP | 62-51975 A | 3/1987 |
| JP | 8-54678 A | 2/1996 |
| JP | 8-213461 A | 8/1996 |
| JP | 11-508516 A | 7/1999 |
| JP | 11-333102 A | 12/1999 |
| JP | 11-334909 A | 12/1999 |
| JP | 2000-98610 A | 4/2000 |
| JP | 2000-132168 A | 5/2000 |
| JP | 2000-316559 A | 11/2000 |
| JP | 2001-59898 A | 3/2001 |
| JP | 2012-135283 A | 7/2012 |
| JP | 2013-99297 A | 5/2013 |
| WO | 1996/033801 A1 | 10/1996 |
| WO | 2015/104357 A1 | 7/2015 |
| WO | 2016/071476 A1 | 5/2016 |

OTHER PUBLICATIONS

Office action for Brazil Patent Application No. BR112018007297-4, dated Dec. 17, 2019.
Office action for Japanese Patent Application No. 2018-518516, dated Jun. 12, 2019.
Hypersol-Macronet MN200, 2016.
Columbia University, "Experiment 8: Chromatography", Published on March on Mar. 25, 2015 Retrieved at http:www.columbia.edu/cu/chemistry/ugrad/hssp/EXP_8.html.
U.S. Appl. No. 15/773,924, Office Action dated Nov. 5, 2020.
Japanese Office Action dated May 21, 2020.
2016348735 Australian Office Action dated May 12, 2020.
2016348733 Australian Office Action dated May 12, 2020.

* cited by examiner

ADSORPTION SYSTEM AND METHOD FOR OPERATING AN ADSORPTION SYSTEM

The invention relates to an adsorption system for accumulating flavoring substances from a flavoring substance-containing fluid, which is a food item from the group of beer-containing staple and/or luxury food items, beer wort, hops, hop extract, malt water, malt beer, malt wort and brewery-specific ingredients and products and/or is obtained from an ethanol-containing food item from the group of beer-containing staple and/or luxury food items by means of a dealcoholizing device. Furthermore, the invention relates to a method for operating such an adsorption system, a flavoring substance concentrate and a deflavored permeate, which are obtainable and/or obtained from a flavoring substance-containing fluid by means of such an adsorption system and/or by means of such a method, as well as to a beer, which is obtainable and/or obtained by mixing an at least partially dealcoholized and/or fermentation-halted beer with such a flavoring substance concentrate.

In the brewing trade, various types of the production of beer and beer-containing staple and luxury food items with low alcohol content are known. Therein, a staple and luxury food item is generally understood by the term beer, which is produced by partial or complete fermentation of sugared starch, without a distillation method having to be employed therein. In the narrower sense, a staple and luxury food item is understood by the term beer, which is obtained from malt and/or from starch-containing raw grain, that is from malt substitutes and is not distilled. Therefore, the term "beer-containing staple and luxury food item" includes unblended beer as well as beer, which is blended or mixed with further staple and/or luxury food items, for example fruit juices (beer mixed drink), worts or the like. Since the terms "low-alcohol" and "alcohol-free" are differently defined in different countries, it is spoken of "low-alcohol" in the following if the beer or the beer-containing staple and luxury food item contains maximally 1% by vol. and preferably maximally 0.7% by vol. of alcohol. It is spoken of "alcohol-free" in the following if the beer-containing staple and luxury food item maximally contains 0.5% by vol. Within the scope of the present disclosure, ethanol is generally understood by the term "alcohol" unless otherwise stated.

Usually, beer (beer on draught and full beer) has an alcohol content between about 4 and about 6% by vol., wherein light and simple beers with low alcohol content and strong beers like bock, double bock or triple bock beers with partially considerably higher alcohol content are also known. Usually, the classification is effected via the original wort content used in the production.

Presently, for dealcoholizing beers, mainly two methods are used, wherein combinations of these two methods are also known. In the one method, a lower alcohol content is achieved in that the fermentation is prematurely stopped, thus, the alcohol development is prevented or reduced. Thereby, the beverage usually obtains a sweetish taste since many carbohydrates are still present in their original form. In contrast, flavors, which only develop in the fermentation, partially or completely lack. In the other method, the alcohol is removed from the beverage in a downstream physical process, for example by distillation, rectification, dialysis or reverse osmosis, after completed fermentation process, wherein flavoring substances are always also removed together with the alcohol and partially even altered by the process. Moreover, further methods for lowering the alcohol content, such as for example mixing beer with water, blending alcohol-free and alcohol-containing beer etc., exist, but which often result in even more considerable taste alterations and therefore have only very low spread.

The comparatively severe taste alteration of the beverage is disadvantageous in all of the current methods such that currently available alcohol-free or alcohol-reduced beers have a flavor profile, which comparatively severely deviates from the flavor profile of the original beer and a full beer, respectively.

For improving the flavor profile, it is therefore known to again add flavoring substances to beer-containing staple and luxury food items to compensate for corresponding losses during the dealcoholization. The simplest approach is in adding artificial and nature-identical flavoring substances, respectively. However, such additions are undesired since they are declarable on the one hand and it is practically impossible to correctly restore the original complex flavor on the other hand. Therefore, the flavor profile of such beer-containing staple and luxury food items is usually perceived as artificial and little beer-like, respectively, by the consumer.

A further possibility is in extraction or recovery of flavoring substances from brewery-specific ingredients or products and the specific addition of these flavoring substances to the dealcoholized beer to generate or restore a beer-typical flavor profile. For extraction or recovery, besides beer, in particular beer wort, hops, hop extract, malt water, malt beer and malt wort are suitable, wherein this enumeration is not to be regarded as conclusive and includes further brewery-specific ingredients and products.

This has the advantage that the addition of flavoring substances thus extracted is usually not declarable and a less artificially seeming and more beer-like flavor profile than in the addition of individual flavoring substances can be achieved compared to the addition of individual flavoring substances. The cause hereof is especially in the high number and the complex composition of the flavoring substances contained in the beer, which considerably impedes a recovery from fluids, which arise within the scope of dealcoholizing methods, or from brewery-specific ingredients or products.

A method for extraction of flavoring substance concentrates is for example known from EP 2 075 321 A1. In this adsorption method, an aqueous flavor with one or more flavoring substances is first provided as a fluid. The flavoring substance-containing fluid is thereafter conducted through a sorption agent arranged in a working chamber, which can also be referred to as sorbent or adsorption material. Therein, at least a part of the flavoring substance contained in the fluid adsorbs on the sorption agent. The adsorbed flavoring substances can subsequently be desorbed from the sorption agent with the aid of a suitable desorption agent and collected as a flavoring substance concentrate, in which the flavoring substances are present accumulated higher with respect to their initial concentration.

However, a recovery and accumulation of beer-typical flavoring substances as uniform as possible is not possible with the aid of this adsorption method and adsorption system, respectively. In particular, only a relatively low concentration of polar flavoring substances is possible such that non-polar flavoring substances are relatively highly accumulated with respect to polar flavoring substances. Thereby, it is a priori not possible to obtain authentic flavoring substance concentrates, that is flavoring substance concentrates, in which both polar and non-polar flavoring substances are present as uniform as possible and with concentration factors as high as possible.

It is the object of the present invention to provide an adsorption system, which allows a particularly high accumulation of flavoring substances while maintaining an authentic flavor profile as largely as possible. Further objects of the invention are in specifying a method for operating such an adsorption system, which allows a high and uniform concentration of beer-typical flavoring substances, providing a flavoring substance concentrate with a beer-typical flavor profile and a concentration factor as high as possible, providing a permeate as largely deflavored as possible without beer-typical flavor profile and providing a beer with an alcohol content as low as possible and a beer-like flavor profile.

According to the invention, the objects are solved by an adsorption system for accumulating flavoring substances having the features of claim 1, by a method according to claim 31 for operating such an adsorption system, a flavoring substance concentrate according to claim 53, a deflavored permeate according to claim 54 as well as by a beer having the features of claim 55. Advantageous configurations with convenient developments of the invention are specified in the respective dependent claims, wherein advantageous configurations of each inventive aspect are to be regarded as advantageous configurations of each other inventive aspect.

A first aspect of the invention relates to an adsorption system for accumulating flavoring substances, including at least one working chamber, in which at least one sorption agent is arranged as a stationary phase and can be subjected to a flavoring substance-containing fluid capable of being conducted through the working chamber as a mobile phase for attaching flavoring substances, wherein the flavoring substance-containing fluid is a food item from the group of beer-containing staple and/or luxury food items, beer wort, hops, hop extract, malt water, malt beer, malt wort and brewery-specific ingredients and/or brewery-specific products and/or is obtained from an ethanol-containing food item from the group of beer-containing staple and/or luxury food items by means of a dealcoholizing device. Therein, it is provided according to the invention that a ratio of average cross-sectional thickness to total length of the at least one working chamber is at most 0.3. In other words, it is provided according to the invention that the adsorption system comprises at least one working chamber, in which the sorption agent or agents, which are to be traversed by the flavoring substance-containing fluid, can be arranged. Therein, a geometry of the at least one working chamber is selected such that the ratio of average cross-sectional thickness to total length of the working chamber or chambers is at most 0.3. Therein, ratios of average cross-sectional thickness to total length of for example 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, 0.001, $1.0*10^{-4}$, $1.0*10^{-5}$ or less are to be understood by a ratio of at most 0.3, wherein corresponding intermediate values are basically to be regarded as also disclosed. Hereby, a comparatively narrow sorbent bed as long as possible is provided, whereby it becomes possible to adsorb both polar and non-polar flavoring substances on the sorption agent as uniformly as possible depending on the binding characteristic of the respectively used sorption agent or agents and the flavoring substance molecules located in the fluid. Accordingly, with the aid of the adsorption system, it is possible to produce particularly authentic flavoring substance concentrates, that is flavoring substance concentrates, in which all of the flavoring substances present in the original fluid are present at least predominantly or substantially uniformly accumulated in low-loss manner. Furthermore, very high accumulation factors are achievable with the aid of the adsorption system according to the invention. Basically, it can be provided that the ratio of average cross-sectional thickness to total length of all of the working chambers is at least $1.0*10^{-7}$.

The concentration or accumulation factor of at least one flavoring substance in the flavoring substance concentrate with respect to the original fluid can basically be at least 1.01, in particular at least 10, preferably at least 100, preferably at least 1000 and in particular at least 15000.

For example, the concentration factor of at least one flavoring substance can be at least 2, 5, 10, 50, 100, 500, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, 20000, 20000, 25000, 30000, 35000, 40000, 45000, 50000, 55000, 60000, 65000, 70000, 75000, 80000, 85000, 90000, 95000, 100000 or more, wherein corresponding intermediate values are basically to be regarded as also disclosed. In other words, the flavoring substance concentrate has to be re-diluted by a corresponding factor in order that the flavoring substance is again present in its initial concentration as in the fluid. The higher the concentration factor, the lower the required storage and transport area and the simpler the further processing of the flavoring substance concentrate. Furthermore, the portion of solvent(s) decreases with the concentration such that ethanol-free flavoring substance concentrates can for example also be produced, which correspond to the halal regulations. Alternatively or additionally, within the scope of the present disclosure, it is provided for ethanol-containing fluids that the concentration or accumulation factor of at least one flavoring substance in the flavoring substance concentrate is determined related to an ethanol content of the fluid, this means that for at least one flavoring substance except for ethanol, the ratio of the concentrations c (in mol/l or in g/l) $C_{flavoring\ substance}:C_{ethanol}$ in the fluid and in the flavoring substance concentrate is formed and compared to each other, wherein the ratio $C_{flavoring\ substance}:C_{ethanol}$ in the concentrate is greater than the ratio $C_{flavoring\ substance}:C_{ethanol}$ in the fluid and is at least 0.01, in particular at least 10, preferably at least 100, preferably at least 1000 and in particular at least 15000 for at least one flavoring substance. Hereby, it can basically occur that the total volume of the first flavoring substance concentrate only insignificantly decreases, substantially remains the same or even increases compared to the fluid, but that the ratio of flavoring substance concentration to ethanol concentration is nevertheless greater in the flavoring substance concentrate than in the fluid since ethanol is depleted related to the at least one other flavoring substance. In terms of this definition of the concentration factor, ethanol is not understood as a flavoring substance, although ethanol can basically also contribute to the overall flavor of the fluid. In other words, it is provided that the concentration of at least one flavoring substance is higher in the flavoring substance concentrate than in the fluid and/or that at least one flavoring substance is present accumulated in the flavoring substance concentrate relative to ethanol related to the fluid, this means that ethanol in the flavoring substance concentrate is depleted at least relative to the concentration of the at least one flavoring substance. Therein, it can be provided that at least two flavoring substances, a multitude of flavoring substances, a plurality of flavoring substances, a predominant number of flavoring substances or all of the flavoring substances contained in the fluid have a respective concentration factor of at least 1.01.

Within the scope of the present invention, the arithmetic mean of the cross-sectional thicknesses over the total length of the working chamber or the working chambers is to be understood by the average cross-sectional thickness. In the simplest case, the working chamber is circular in cross-section such that the cross-sectional thickness corresponds to the internal diameter of the working chamber. However, the cross-sectional geometry is generally not restricted to certain designs and can for example also be rectangular, polygonal, elliptical, irregular etc. In the case of a single working chamber, the total length results from its length or height (in flow direction) or from the addition of the lengths or heights of all of the working chambers in the case of two or more working chambers. Therein, the at least one working chamber is preferably filled with one or more sorption agents at least at 50% by vol. For example, each working chamber can be filled with a sorption agent or a mixture of two or more sorption agents at least at 50% by vol., 55% by vol., 60% by vol., 65% by vol., 70% by vol., 75% by vol., 80% by vol., 85% by vol., 90% by vol., 95% by vol., 98% by vol., 99% by vol. or more.

Within the scope of the present invention, taste producing and/or aromatic substances are basically understood by a flavoring substance. Preferably, the fluid is present liquid and/or gaseous at least under standard conditions (SATP, Standard Ambient Temperature and Pressure, 25° C./1.013 bar). The total content of flavoring substances in the fluid can be between about 99% by vol. and 0.0001% by vol. and 1 ppb (1 µg/kg) or less, respectively, wherein all of the ingredients of the fluid of course always and exclusively complement each other to 100%. Percentage indications are to be basically understood as percents by volume within the scope of the present invention unless otherwise stated. Basically, the flavoring substances can be present in the fluid in dissolved and/or suspended or dispersed manner. Optionally, the fluid can have an ethanol content between 0.0001% by vol. and 99% by vol. This means that the fluid can have a total content of flavoring substances or an ethanol content of for example 0.0001 by vol., 0.001% by vol., 0.01% by vol., 0.1% by vol., 0.2% by vol., 0.3% by vol., 0.4% by vol., 0.5% by vol., 0.6% by vol., 0.7% by vol., 0.8% by vol., 0.9% by vol., 1% by vol., 2% by vol., 3% by vol., 4% by vol., 5% by vol., 6% by vol., 7% by vol., 8% by vol., 9% by vol. 10% by vol., 11% by vol. 12% by vol. 13% by vol. 14% by vol. 15% by vol. 16% by vol. 17% by vol., 18% by vol. 19% by vol. 20% by vol. 21% by vol. 22% by vol. 23% by vol. 24% by vol., 25% by vol. 26% by vol. 27% by vol. 28% by vol. 29% by vol. 30% by vol. 31% by vol., 32% by vol. 33% by vol. 34% by vol. 35% by vol. 36% by vol. 37% by vol. 38% by vol., 39% by vol. 40% by vol. 41% by vol. 42% by vol. 43% by vol. 44% by vol. 45% by vol., 46% by vol. 47% by vol. 48% by vol. 49% by vol. 50% by vol. 51% by vol. 52% by vol., 53% by vol. 54% by vol. 55% by vol. 56% by vol. 57% by vol. 58% by vol. 59% by vol., 60% by vol., 61% by vol., 62% by vol., 63% by vol., 64% by vol., 65% by vol., 66% by vol. 67% by vol. 68% by vol. 69% by vol. 70% by vol. 71% by vol. 72% by vol. 73% by vol., 74% by vol., 75% by vol., 76% by vol., 77% by vol., 78% by vol., 79% by vol., 80% by vol., 81% by vol., 82% by vol., 83% by vol., 84% by vol., 85% by vol., 86% by vol., 87% by vol., 88% by vol., 89% by vol., 90% by vol., 91% by vol., 92% by vol., 93% by vol., 94% by vol., 95% by vol., 96% by vol., 97% by vol., 98% by vol. or 99% by vol., wherein corresponding intermediate values are to be regarded as also disclosed. Similarly, it can be provided that the fluid is free of ethanol. Furthermore, it can be provided that the fluid contains between 0.0001% by vol. and 99.9999% by vol. of water. Furthermore, it can basically be provided that the fluid contains one or more alcohols alternatively or additionally to ethanol, such as for example $C_1$-$C_5$ alcohols, in particular methanol, propanol, isopropanol, butanol, isobutanol and/or tert-butanol, as well as optionally one or more higher alcohols from the group of $C_6$-$C_{20}$ or more. The sorption agent can be composed of a single chemical compound or compound class (monovarietal) or from a mixture of two or more chemical compounds or compound classes (mixture). Basically, multiple sorption agents can be collectively subjected to the fluid and be collectively arranged in the same working chamber, respectively. Similarly, it can be provided that multiple sorption agents are arranged one after the other and subjected to the fluid one after the other, respectively, viewed in flow direction. Within the scope of the present invention, all of the physical and chemical types of attachments of flavoring substances to the sorption agent are basically understood by the term "sorbing", in particular adsorption and/or absorption processes. Accordingly, within the scope of the present invention, all inverse procedures are basically understood by the term "desorbing", in which flavoring substances leave the sorption agent.

With the aid of the adsorption system according to the invention, different flavoring substance-containing fluids from the area of the brewing trade can be processed. Therein, the fluid can be a fluidic medium (gas phase and/or liquid phase) or a mixed phase from them. Further, the fluid can include proteins and enzymes brought into solution and/or suspension as well as sugars (monosaccharides, disaccharides, oligosaccharides and/or polymeric sugars (starch)) brought into solution and/or suspension. Furthermore, the fluid can include plant material (e.g. lignin, polyphenols) brought into solution and/or suspension. Furthermore, the fluid can include or be a gas from drying (spray dryer, freeze dryer, belt dryer, roller dryer), concentration, roasting (drum roaster, belt roaster, fluidized bed roasting), defoaming, gassing or degassing of liquids, deodorization (e.g. plate evaporator, downflow evaporator, water vapor distillation, steaming, vacuum steaming). Furthermore, the fluid can originate from the gas scrubbing, exhaust air from production plants (fermenters, fermentation, filling plants), exhaust air from production plants (hop storage, malt storage), room air from production sites and the like and/or be pump water of vacuum pumps. Furthermore, the fluid can include or be a water phase from a freeze dryer and/or a condensate after evaporation or gassing or drying.

Basically, the sorption agent can be selected from the group of ion exchangers, normal phases, polar bound phases and reversed phases or be any mixture thereof, in particular polyaromatic compounds, polystyrenes, poly(meth)acrylates, polypropylenes, polyesters, polytetrafluoroethylene and cross-linked polystyrenes, in particular copolymers of ethylvinylbenzene and divinylbenzene, provided from vinylpyrrolidone and divinylbenzene, from vinylpyridine and divinylbenzene and/or from styrene and divinylbenzene. An advantageous sorption characteristic is also achieved by the use of sorption agents, which include monomers with functional groups. Thus, sulfonic acid groups, ternary (e.g. methacrylic diethylamine) and quaternary ammonium groups (e.g. phenyltrimethylammonium), amides (e.g. benzamides), amines and halogen-modified aromatic compounds, heterocyclic compounds like 3-pyrrolidone, 2-pyrrolidone, 2-pyrroline, 3-pyrroline, pyrrole and/or piperazine, as well as halogenated aliphatic side chains have particularly proved themselves. Gelatinous polymers can also be employed. Basically, modified polyacrylates can also be used, in particular those, which include the following monomers: acrylic acid, acrylonitrile and alkyl acrylates such as for example methyl methacrylate, methyl acrylate, ethyl acrylate, 2-chloroethyl vinyl ether, 2-ethylhexyl acrylate, hydroxyethyl methacrylate, butyl acrylate and butyl methacrylate. Alternatively or additionally, there are CMS sorbents (CMS: carbon molecular sieve), which are formed from the pyrolysis of polymeric precursors and have a highly porous carbon structure themselves. SGPC sorbents (SGPC: spherical graphitized polymer carbon) and GCB sorbents are also employable (GCB: graphitized carbon black). Alternatives are polymers based on 2,6-diphenylene oxide, e.g. poly(2,6-diphenyl-p-phenylene oxide), or those with iminodiacetate functionality. The sorption agent or agents can for example be employed as bulk material and thereby corresponding sorbent beds can be built up in the working chamber. Alternatively or additionally, the sorption agent can be monolithically present in the working chamber and thus be traversed.

With the aid of these sorption agents individually or in any combination, a particularly high adsorption of the flavoring substances and thereby a particularly high recovery rate are ensured. Hereby, the sorption agent can additionally be optimally selected depending on the respective fluid and the flavoring substance molecules contained therein. Preferably, the mentioned polymers are additionally functionalized by means of suitable reagents during the polymerization of the basic polymer and by post-treatment of the basic polymer with corresponding reagents, respectively, to achieve the desired sorption characteristic.

Within the scope of this disclosure, "a"/"an" are generally to be read as indefinite articles, thus always also as "at least a"/"at least an" without expressly opposite indication.

In an advantageous configuration of the invention, it is provided that the adsorption system includes at least two working chambers capable of being fluidically coupled to each other and at least one pumping device for delivering the fluid through the working chambers. By this fluidic coupling of the two or more working chambers in connection with the at least one pumping device, considerably higher flow speeds are achieved in loading, in particular in contrast to a single working chamber with the same volume. In addition, the total length of the adsorption system increases such that a correspondingly higher recovery rate or a high final concentration in the flavoring substance concentrate can be achieved.

In a further advantageous configuration of the invention, it is provided that at least one pumping device is arranged upstream of a working chamber. Hereby, the pressure drop across the working chamber can be at least partially compensated for and a high flow speed of the fluid through the working chamber can be ensured. Alternatively or additionally, it is provided that at least one pumping device is arranged between two working chambers. This represents a further advantageous possibility of compensating for a pressure drop downstream of a working chamber and ensuring a high flow speed of the fluid through the working chamber downstream of the pumping device. Alternatively or additionally, it has proven advantageous if all of the working chambers are fluidically arranged between two pumping devices. Hereby, it is possible to reverse a flow direction through the working chambers in constructively simple manner. Thereby, the sorption material can for example be loaded in one flow direction and be unloaded in the opposite flow direction. Similarly, it can be provided that the at least two pumping devices are differently formed. For example, the pumping devices can differ with regard to their maximum delivery flow. Similarly, it can be provided that at least one of the pumping devices is pulsation-free and/or explosion-protected and/or allows reversible delivery.

Further advantages arise in that the adsorption system includes at least one valve device, by means of which a flow through at least one working chamber is controllable and/or adjustable. This allows particularly variable and adequate liberation, reduction or interruption of the flow through one or more working chambers. The at least one valve device can basically be formed operable or controllable and/or adjustable in manual manner and/or by machine. Within the scope of the present invention, pure shut-off devices are basically also understood by valve devices, which can either halt or let pass a volume flow, but do not allow partial reduction of the volume flow. For example, the at least one valve device can be a check or ball valve or the like in some configurations since these shut-off devices do not have to be actively controlled and thereby are very inexpensive and operationally reliable.

In a further advantageous configuration of the invention, it is provided that the adsorption system includes a control device, which is formed to operate the adsorption system in an absorption mode, in which the at least one sorption agent is subjected to the flavoring substance-containing fluid to adsorb flavoring substances on the sorption agent, and in a desorption mode, in which the at least one sorption agent is subjected to a fluidic desorption agent to desorb flavoring substances adsorbed on the sorption agent as a flavoring substance concentrate. This allows a high automatization or at least partial automatization degree of the adsorption system such that flavoring substance concentrates can be continuously or at least semi-continuously produced. Within the scope of the present invention, the expression "formed to" basically relates to items, which do not only have a basic suitability to anything, but also actually achieve the respectively indicated effect during their intended operation by correspondingly set up hardware and/or software. For example, the control device can comprise a processor device, which is arranged to perform the mentioned steps and in particular an embodiment of the method according to the second inventive aspect. Hereto, the processor device can comprise at least one microprocessor and/or at least one microcontroller. Furthermore, the processor device can comprise a program code, which is arranged to perform the embodiment of the mentioned steps and in particular an embodiment of the method according to the second inventive aspect and to correspondingly control and/or regulate corresponding devices of the adsorption system upon executing by the processor device. The program code can be stored in a data storage of the processor device.

It can be provided that a desorption agents is provided, which is selected from the group of protic solvents, aprotic non-polar solvents and aprotic polar solvents. Hereby, the desorption agent can be optimally adapted to the type and number of the adsorbed flavoring substance molecules as well as to the sorption agent. Solvents are understood by protic solvents, which can cleave off protons and/or form hydrogen bridges in contrast to aprotic solvents. In the simplest case, water is for example used. Further examples are methanol, ethanol, primary and secondary amines, carboxylic acids (e.g. formic acid, acetic acid), primary and secondary amides (e.g. formamide) and mineral acids (sulfuric acid, nitric acid, phosphoric acid, halogen hydracids). Aprotic non-polar solvents are highly lipophilic and hydrophobic, while aprotic polar solvents have at least one highly polar functional group (e.g. carbonyl group, nitro group, nitrile group) and thereby a permanent dipole moment, which results in an improvement of the solubility of polar substances compared to aprotic non-polar solvents. Examples for aprotic non-polar solvents include alkanes, alkenes, alkynes, benzene, toluene and other aromatic compounds with aliphatic and aromatic substituents, carboxylic acid esters, ethers (dimethyl ether, diethyl ether, ethylmethyl ether), tetramethylsilane, dichloromethane, trichloromethane, trichloromethane, carbon tetrachloride, carbon disulfide, over-critical carbon dioxide and fluorinated, in particular perfluorinated hydrocarbons. Examples for aprotic polar solvents include ketones (acetone), lactones (γ-butyrolactone), lactams (N-methyl-2-pyrrolidone), nitriles (acetonitrile), nitro compounds (nitromethane), tertiary carboxylic acid amides (dimethylformamide), urea derivatives (tetramethyl urea, dimethylpropylene urea), sulfoxides (dimethyl sulfoxide), sulfones (sulfolane) and carbonic acid esters (dimethyl carbonate, ethylene carbonate).

For example, methanol, ethanol, propane-1-ol, butane-1-ol, pentane-1-ol, hexane-1-ol, heptane-1-ol, octane-1-ol, nonane-1-ol, decane-1-ol, undecane-1-ol, dodecane-1-ol, tridecane-1-ol, tetradecane-1-ol, pentadecane-1-ol, hexadecane-1-ol, octadecane-1-ol, hexacosane-1-ol, triacontane-1-ol, propane-2-ol, butane-2-ol, 2-methylpropane-1-ol, 2-methylpropane-2-ol, pentane-2-ol, pentane-3-ol, 2-methylbutane-1-ol, 3-methylbutane-1-ol, 2-methylbutane-2-ol, 3-methylbutane-2-ol, 2,2-dimethylpropane-1-ol, ethane-1,2-diol, propane-1,2-diol, propane-1,3-diol, butane-1,2-diol, butane-1,3-diol, butane-1,4-diol, butane-2,3-diol, pentane-1,5-diol, hexane-1,6-diol, octane-1,8-diol, nonane-1,9-diol, decane-1,10-diol, propane-1,2,3-triol, cyclopentanol, cyclohexanol, prop-2-en-1-ol, but-2-en-1-ol, phenylmethanol, (hydroxymethyl)benzene, 1-phenylethane-1-ol, (1-hydroxyethyl)benzene ($C_6H_5CH(OH)CH_3$), 2-phenylethane-1-ol, (2-hydroxyethyl)benzene ($C_6H_5CH_2CH_2OH$), diphenylmethanol ($(C_6H_5)_2CHOH$, triphenylmethanol ($(C_6H_5)_3COH$), ethyl acetate, dichloromethane, trichloromethane, carbon tetrachloride, dimethylether, diethylether, methylethylether, water, water vapor, inorganic acids, for example phosphoric acid, hydrochloric acid etc., carboxylic acids, for example formic acid, acetic acid, lactic acid, malic acid, citric acid, ascorbic acid, tartaric acid etc., chlorogenic acid and the derivates thereof, caffeic acid, ferulic acid, maleic acid, lyes, for example soda lye, potassium hydroxide, $Ca(OH)_2$, sodium- or potassium salts of the phosphoric acid, as well as any mixtures and/or gradients from two or more desorption agents can be used as the desorption agent, wherein the mentioned list of possible desorption agents is not to be regarded as conclusive.

Accordingly, at least two desorption agents and/or a desorption agent gradient can basically be continuously and/or stepped provided and/or an emulsion of at least two desorption agents not freely miscible with each other can be provided. This allows a particularly high control of the retention and resolution such that all of the adsorbed flavoring substance molecules can be optionally commonly or successively desorbed or desorbed in certain sequences and be collected as a flavoring substance concentrate. Besides a mixture of 2, 3, 4, 5, 6, 7, 8, 9, 10 or more desorption agents, a desorption agent gradient altered continuously in time and/or gradually of 2, 3, 4, 5, 6, 7, 8, 9, 10 or more desorption agents can be used. Similarly, it can be provided that an emulsion of at least two desorption agents not freely miscible with each other is used. One understands disperse systems of two or more liquids not freely miscible with each other by an emulsion. Therein, one of the desorption agents constitutes the dispersion agent, in which the desorption agent or the other desorption agents is or are distributed in the form of fine droplets as another phase (also: inner or disperse phase). Depending on the size of the dispersed particles and on the kinetic and thermodynamic stability, respectively, one speaks of coarsely disperse and colloid disperse systems. The use of an emulsion offers the advantage of a particularly fast and complete desorption with low volume input, whereby correspondingly authentic and highly concentrated flavoring substance concentrates are obtained. For example, flavoring substances can first be desorbed only with (optionally hot) water as the desorption agent and subsequently with ethanol as the desorption agent from the same plant part. In other words, a step gradient of water-ethanol can be provided as the desorption agent. The obtained desorbates can be commonly or separately collected in at least 2 fractions. The portion desorbed by means of water can be employed for reflavoring dealcoholized beer without further reprocessing due to its low ethanol content or its absence of ethanol. The portion desorbed by means of ethanol can optionally be diluted with water (brewing water) and subjected to new accumulation (high accumulation).

In an advantageous configuration of the invention, it is provided that the control device is formed to set a flow direction of the desorption agent in the desorption mode such that the flow direction of the desorption agent is opposite to a flow direction of the flavoring substance-containing fluid in the adsorption mode. Hereto, the control device is preferably at least coupled to at least one pumping device and/or at least one valve to operate it in controlling and/or regulating manner.

In a further advantageous configuration of the invention, it is provided that the control device is formed to conduct the flavoring substance-containing fluid parallel through at least two working chambers in the absorption mode. This allows a particularly fast loading of the sorption agent arranged in the working chambers with high accumulation of the flavoring substance or substances contained in the fluid. Moreover, two or more shorter working chambers can be used instead of one long working chamber with correspondingly high pressure loss, the combined total length of which corresponds to that of a particularly long working chamber. Moreover, in this manner, the number and geometry of the working chambers can be optimally adapted to the respective boundary conditions such as for instance the fluid amount, the fluid flow and the composition of the fluid or the flavoring substances contained therein. Alternatively or additionally, it is provided that the control device is formed to serially conduct the desorption agent through at least two working chambers in the desorption mode. This allows an at least substantially complete recovery of the adsorbed flavoring substances using a minimum volume of desorption agent. Alternatively or additionally, it is provided that the control device is formed to transport the desorption agent out of the adsorption system through an outlet, whereby a simple removal of the desorbed flavoring substances or the flavoring substance concentrate obtained by desorption is allowed. Furthermore, it is alternatively or additionally provided that the control device is formed to conduct different desorption agents through at least two working chambers in the desorption mode. For example, predominantly non-polar flavoring substances can be adsorbed in a first one of the working chambers and be desorbed with ethanol or an ethanol-containing desorption agent, while predominantly polar flavoring substances are adsorbed in a second one or the working chambers and are desorbed with water or water vapor. This allows a particularly good and at least largely complete recovery of all of the beer-typical flavoring substances with correspondingly high concentration factors.

Further advantages arise if the adsorption system includes at least one tempering device, by means of which at least one working chamber and/or the fluid and/or the desorption agent and/or at least a part of a flavoring substance concentrate can be tempered to a predetermined temperature. Hereby, the adsorption and/or desorption characteristic can be optimally adapted to the composition of the fluid and/or the desired flavoring substance concentrate. For example, the tempering device can be formed such that temperatures of 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C. ore more are adjustable, wherein corresponding intermediate values such as for example 40° C., 41° C., 42° C., 43° C., 44° C., 45° C., 46° C., 47° C., 48° C., 49° C., 50° C. etc. are to be regarded as also disclosed. Basically, the tempering device can be formed for relative heating and/or cooling.

Further advantages arise in that the tempering device includes an immersion bath, in which at least one working chamber is arranged at least in certain areas for tempering, and/or a microwave device and/or a high-frequency heating device and/or an inductive heating device and/or an electrical heating device and/or a hot gas, steam and/or heating liquid device and/or at least one chamber, which can be subjected to a heating and/or cooling agent, and/or a double- or multi-walled design of at least a part of the adsorption system for subjecting to a heating and/or cooling agent. This allows optimum tempering as well as optionally the possibility of using already present energy sources for example of a brewery, whereby an improved energy balance and lower investment and operating costs can be realized. In particular, a double-walled design of parts of the adsorption systems is suitable to efficiently set the corresponding areas fast to the desired temperature by a heating or cooling agent. Alternatively or additionally, at least parts of the adsorption system can be arranged in at least one correspondingly dimensioned tub, which can be partially or completely filled with or traversed by a corresponding heating or cooling agent as needed.

In a further advantageous configuration of the invention, it is provided that the control device is coupled to the tempering device and is preferably formed to differently operate the tempering device in the adsorption mode and in the desorption mode. Hereby, particularly high recovery and accumulation factors are realizable. For example, the tempering device can be formed to adjust a lower temperature in the adsorption mode than in the desorption mode such that it can be desorbed at higher temperatures than adsorbed. Inversely, it can be reasonable in some embodiments to adsorb at higher temperatures than to desorb.

In further configuration of the invention, the average cross-sectional area of at least one working chamber is selected such that a volume $V_1$ of desorption agent, which is sufficient to desorb at least ⅔ of the flavoring substances 3-methylbutane-1-ol and 2-phenylethanol adsorbed on the sorption agent arranged in the working chamber in the adsorption mode, corresponds to the formulas (I) and (II)

$V_1 \geq 0.025$ m*average cross-sectional area in m² of the at least one working chamber    (I);

$V_1 \leq 8.0$ m*average cross-sectional area in m² of the at least one working chamber    (II);

In other words, $V_1$ and the average cross-sectional area (measured in m²) of the at least one working chamber are matched to each other such that $V_1$ corresponds to the factor of average cross-sectional area*0.025 m, 0.030 m, 0.035 m, 0.040 m, 0.045 m, 0.050 m, 0.055 m, 0.060 m, 0.065 m, 0.070 m, 0.075 m, 0.080 m, 0.085 m, 0.090 m, 0.095 m, 0.100 m, 0.105 m, 0.110 m, 0.115 m, 0.120 m, 0.125 m, 0.130 m, 0.135 m, 0.140 m, 0.145 m, 0.150 m, 0.155 m, 0.160 m, 0.165 m, 0.170 m, 0.175 m, 0.180 m, 0.185 m, 0.190 m, 0.195 m, 0.200 m, 0.205 m, 0.210 m, 0.215 m, 0.220 m, 0.225 m, 0.230 m, 0.235 m, 0.240 m, 0.245 m, 0.25 m, 0.50 m, 0.75 m, 1.00 m, 1.25 m, 1.50 m, 1.75 m, 2.00 m, 2.25 m, 2.50 m, 2.75 m, 3.00 m, 3.25 m, 3.50 m, 3.75 m, 4.00 m, 4.25 m, 4.50 m, 4.75 m, 5.00 m, 5.25 m, 5.50 m, 5.75 m, 6.00 m, 6.25 m, 6.50 m, 6.75 m, 7.00 m, 7.25 m, 7.50 m, 7.75 m or 8.00 m, wherein corresponding intermediate values are to be regarded as also disclosed here too. In this manner, the geometry of the at least one working chamber can be particularly simply configured to ensure a recovery of at least ⅔, that is for example of 66.6 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, 98 mol %, 99 mol % or 100 mol % of the polar flavoring substances 3-methylbutane-1-ol and 2-phenylethanol highly relevant to beer flavor. Therein, this configuration is in particular reasonable in context with organic compounds such as for example ethanol as the desorption agent or as a part of a desorption agent mixture.

In a further advantageous configuration of the invention, the adsorption system includes a first fluid path for conducting the flavoring substance-containing fluid through the at least one working chamber and a second fluid path for conducting the desorption agent through the at least one working chamber. In this manner, the adsorption system can be particularly flexibly operated since different fluid paths for adsorption and desorption can be selected. For example, separate conduit systems can be associated with the fluid paths.

Further advantages arise in that the first and the second fluid path have different lengths and/or different average cross-sectional thicknesses and/or different volumes. This allows advantageous dead space minimization as well as the provision of different sorbent capacities in differently elutable areas of the adsorption system or the respective fluid path. For example, the second fluid path can have a total volume higher at least by the factor of 2 than the first fluid path to sorb substances in desired amount, which cannot or are not to be sufficiently sorbed in the first fluid path due to their physical-chemical characteristics. In addition, the pH value or the salt content can be varied or adjusted before the first and/or the second fluid path such that certain substances are preferably sorbed in the plant part respectively provided thereto.

In a further advantageous configuration of the adsorption system, it includes a collecting container and/or fraction collector capable of being fluidically coupled to at least one working chamber. Hereby, it is possible to collect the flavoring substance concentrate obtained by desorption in the collecting container or to collect multiple fractions with the aid of the fraction collector depending on a temporal frequency and/or an adjusted fraction volume, which can then be combined alone or in any manner to achieve a certain flavor profile.

In a further advantageous configuration of the invention, it is provided that at least one working chamber of the adsorption system includes at least two channels fluidically connected to each other for arranging the at least one sorption agent, which are arranged interleaved with each other in a common housing. Such a "labyrinthine" configuration of at least one working chamber presents a particularly advantageous possibility of providing a fluid path as long as possible with low installation space demand.

Further advantages arise in that the adsorption system includes at least two working chambers, which can be traversed by the flavoring substance-containing fluid and/or by the desorption agent independently of each other. This allows a continuous or at least semi-continuous operation of the adsorption system, whereby a correspondingly high throughput is allowed.

Further advantages arise in that at least one working chamber has a cross-sectional area varying along its longitudinal axis. The working chamber can for example have a cross-section continuously or discontinuously and gradually decreasing, respectively, along its longitudinal extension. For example, the working chamber can be formed funnel-shaped or triangular or trapezoidal in longitudinal section. Similarly, it can be provided that the working chamber has areas with cross-sectional areas decreasing along its longitudinal axis and areas with increasing cross-sectional areas. Alternatively or additionally, it is provided that the adsorption system includes at least two working chambers with different average cross-sectional areas. This allows providing different local adsorption capacities in the adsorption system to differently well bind flavoring substances adsorbing on the respectively used sorption agent yet in an authentic quantity ratio and preferably at least predominantly in quantitative manner. For example, a first working chamber viewed in loading direction can be narrower than one or more working chambers following in loading direction. Thereby, it is achieved that those flavoring substances, which can be very efficiently bound to a comparatively small amount of sorption agent, can be at least largely or exclusively adsorbed in the first working chamber. A high final concentration of these substances is associated therewith, whereby flavoring substance concentrates with correspondingly high accumulation factors can be obtained after a desorption. Those flavoring substances, which require a comparatively greater amount of sorption agent to be capable of being predominantly or at least substantially quantitatively bound, are mainly bound in the working chamber or chambers following in flow direction due to the larger cross-sectional areas and the locally higher amounts of sorption agent associated therewith, that is of higher adsorption capacity. In a subsequent desorption step, which is preferably effected opposite to the loading direction, the flavoring substances with comparatively inferior binding characteristics are then released from the areas with larger cross-sectional areas in the ratio correct in amount and subsequently get into the narrower working chamber, where they are desorbed or dissolved together with the comparatively better binding flavoring substances. Thereby, it is achieved that the flavoring substances binding both better and inferiorly to the respective sorption agent are present in a quantity ratio authentic related to the fluid in the resulting flavoring substance concentrate.

Further advantages arise in that a total length of the at least one working chamber is at least 2.5 m and/or that an average cross-sectional thickness of the at least one working chamber is between 3 mm and 6.0 m and/or that the ratio of average cross-sectional thickness to total length of the at least one working chamber is at most 0.04. In particular, total lengths of 2.5 m, 3.0 m, 3.5 m, 4.0 m, 4.5 m, 5.0 m, 5.5 m, 6.0 m, 6.5 m, 7.0 m, 7.5 m, 8.0 m, 8.5 m, 9.0 m, 9.5 m, 10.0 m, 10.5 m, 11.0 m, 11.5 m, 12.0 m, 12.5 m, 13.0 m, 13.5 m, 14.0 m, 14.5 m, 15.0 m, 15.5 m, 16.0 m, 16.5 m, 17.0 m, 17.5 m, 18.0 m, 18.5 m, 19.0 m, 19.5 m, 20.0 m, 21 m, 22 m, 23 m, 24 m, 25 m, 26 m, 27 m, 28 m, 29 m, 30 m, 31 m, 32 m, 33 m, 34 m, 35 m, 36 m, 37 m, 38 m, 39 m, 40 m, 41 m, 42 m, 43 m, 44 m, 45 m, 46 m, 47 m, 48 m, 49 m, 50 m, 51 m, 52 m, 53 m, 54 m, 55 m, 56 m, 57 m, 58 m, 59 m, 60 m, 61 m, 62 m, 63 m, 64 m, 65 m, 66 m, 67 m, 68 m, 69 m, 70 m, 71 m, 72 m, 73 m, 74 m, 75 m, 76 m, 77 m, 78 m, 79 m, 80 m, 81 m, 82 m, 83 m, 84 m, 85 m, 86 m, 87 m, 88 m, 89 m, 90 m, 91 m, 92 m, 93 m, 94 m, 95 m, 96 m, 97 m, 98 m, 99 m, 100 m or more are to be understood by a total length of all of the present working chambers of at least 2.5 m. In particular, cross-sectional thicknesses or internal diameters of 3 mm, 4 mm, 5 mm, 6 mm, 7 mm, 8 mm, 9 mm, 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 41 cm, 42 cm, 43 cm, 44 cm, 45 cm, 46 cm, 47 cm, 48 cm, 49 cm, 50 cm, 51 cm, 52 cm, 53 cm, 54 cm, 55 cm, 56 cm, 57 cm, 58 cm, 59 cm, 60 cm, 61 cm, 62 cm, 63 cm, 64 cm, 65 cm, 66 cm, 67 cm, 68 cm, 69 cm, 70 cm, 71 cm, 72 cm, 73 cm, 74 cm, 75 cm, 76 cm, 77 cm, 78 cm, 79 cm, 80 cm, 81 cm, 82 cm, 83 cm, 84 cm, 85 cm, 86 cm, 87 cm, 88 cm, 89 cm, 90 cm, 91 cm, 92 cm, 93 cm, 94 cm, 95 cm, 96 cm, 97 cm, 98 cm, 99 cm, 1.0 m, 1.1 m, 1.2 m, 1.3 m, 1.4 m, 1.5 m, 1.6 m, 1.7 m, 1.8 m, 1.9 m, 2.0 m, 2.1 m, 2.2 m, 2.3 m, 2.4 m, 2.5 m, 2.6 m, 2.7 m, 2.8 m, 2.9 m, 3.0 m, 3.1 m, 3.2 m, 3.3 m, 3.4 m, 3.5 m, 3.6 m, 3.7 m, 3.8 m, 3.9 m, 4.0 m, 4.1 m, 4.2 m, 4.3 m, 4.4 m, 4.5 m, 4.6 m, 4.7 m, 4.8 m, 4.9 m, 5.0 m, 5.1 m, 5.2 m, 5.3 m, 5.4 m, 5.5 m, 5.6 m, 5.7 m, 5.8 m, 5.9 m or 6.0 m as well as corresponding intermediate values are to be understood by a cross-sectional thickness between 3 mm and 6.0 m. In particular, the cross-sectional thickness can be selected depending on the planned volume flow. Corresponding values of 0.040, 0.039, 0.038, 0.037, 0.036, 0.035, 0.034, 0.033, 0.032, 0.031, 0.030, 0.029, 0.028, 0.027, 0.026, 0.025, 0.024, 0.023, 0.022, 0.021, 0.020, 0.019, 0.018, 0.017, 0.016, 0.015, 0.014, 0.013, 0.012, 0.011, 0.010, 0.009, 0.008, 0.007, 0.006, 0.005, 0.004, 0.003, 0.002, 0.001, 0.0005, 0.0001 or less are to be understood by a ratio of average cross-sectional thickness to total length of the at least one working chamber of at most 0.04, wherein corresponding intermediate values basically are to be regarded as also disclosed.

In further configuration, it is provided that the total length and the average cross-sectional thickness of the at least one working chamber are selected depending on the sorption characteristics of the at least one sorption agent at a predetermined process temperature and a predetermined average percolation rate of the flavoring substance-containing fluid such that 3-methylbutane-1-ol and 2-phenylethanol contained in the fluid adsorb on the at least one sorption agent at least at 66 mol %, that is at 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, 98 mol %, 99 mol % or 100 mol %. Thereby, the respective values for total length and average cross-sectional thickness can be optimized by simple experiments customary according to state of the art such that an adsorption as extensive as possible and preferably at least substantially complete of the polar compounds 3-methylbutane-1-ol and 2-phenylethanol relevant to a beer-typical flavor is ensured.

Further advantages arise in that the adsorption system includes at least two working chambers, wherein at least one working chamber has a smaller volume than a working chamber downstream with respect to a loading direction, in which the at least one sorption agent is to be subjected to the flavoring substance-containing fluid. In other words, the adsorption system comprises two or more working chambers disposed one after the other in loading direction with volume increasing in loading direction. Hereby, it is particularly simply possible to predominantly bind the non-polar flavoring substances in the first or upstream working chamber and to predominantly bind the polar flavoring substances in the second or downstream working chamber. The volume ratios of the individual working chambers correlate with the sorbent amount respectively capable of being introduced and with the flavoring substance amounts respectively to be bound. Further advantages are in that the at least two working chambers can be subjected to a desorption in different manner and independently of each other, respectively. The two- or multi-stage design moreover offers additional possibilities to the benefit of the specific accumulation or depletion of certain flavoring substances, whereby a modulation of the flavor profile is possible. Furthermore, the two- or multi-stage design allows that particularly high accumulation factors can be achieved. One working chamber alone usually cannot receive a great initial volume in a reasonable process time on the one hand and allow a particularly low extract volume with correspondingly high accumulation factors of the individual flavoring substances on the other hand. For example, with an accumulation by a factor of 3000, ca. 3000 liters would have to be delivered through the one working chamber in the adsorption mode on the one hand, but only 1 liter of extract would have to be obtained in the desorption mode. However, this is possible with two or more working chambers.

Further advantages arise in that the adsorption system includes a high concentration device, by means of which at least a part of the first flavoring substance concentrate, which is obtainable by subjecting the at least one sorption agent to the fluidic desorption agent, is separable into at least one permeate and into at least one second flavoring substance concentrate, which has a lower ratio of ethanol:3-methylbutane-1-ol with respect to the first flavoring substance concentrate. Such a high concentration device thereby allows the production of a second flavoring substance concentrate with a relative depletion of ethanol related to one or more other flavoring substances, for example related to the flavoring substance 3-methylbutane-1-ol important to a beer-typical flavor, starting from the first flavoring substance concentrate. By the first accumulation stage, the result of which the first flavoring substance concentrate represents, a focused application in the following high concentration device is allowed and thereby minimization or complete avoidance of losses of difficultly adsorbable, highly polar flavoring substances with log $P_{ow}$ values (decadic logarithm of the n-octanol-water distribution coefficient $K_{ow}$)<1.5, for example of fusel alcohols, ethyl acetate and the like. Furthermore, it can be provided that the first flavoring substance concentrate can be concentrated two or multiple times with the aid of the high concentration device.

It is particularly advantageous if the high concentration device is formed to reduce a ratio of ethanol:3-methylbutane-1-ol in the second flavoring substance concentrate at least by the factor of 2 with respect to the first flavoring substance concentrate. This means that at least two times as much 3-methylbutane-1-ol related to the respective ethanol amount or concentration is present in the second flavoring substance concentrate. Basically, the factor can also be greater than 2 and for example be 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more.

Further advantages arise in that the high concentration device includes at least one working chamber, in which at least one sorption agent is arranged as a stationary phase and can be subjected to the flavoring substance concentrate capable of being conducted through the working chamber as a mobile phase for attachment of flavoring substances. In other words, the high concentration device is also formed as a solid phase extraction device, whereby the second and each further concentration of the first flavoring substance concentrate can be performed by a purely physical process, which occurs between a liquid phase (flavoring substance concentrate) and a solid phase (sorption agent or sorbent), and thereby in particularly gentle manner as well as with high recovery rates and accumulation factors.

Further advantages arise in that the at least one working chamber has a total length of at least 2.5 m and/or that an average cross-sectional thickness of the at least one working chamber is between 3 mm and 6.0 m. In particular, total lengths of 2.5 m, 3.0 m, 3.5 m, 4.0 m, 4.5 m, 5.0 m, 5.5 m, 6.0 m, 6.5 m, 7.0 m, 7.5 m, 8.0 m, 8.5 m, 9.0 m, 9.5 m, 10.0 m, 10.5 m, 11.0 m, 11.5 m, 12.0 m, 12.5 m, 13.0 m, 13.5 m, 14.0 m, 14.5 m, 15.0 m, 15.5 m, 16.0 m, 16.5 m, 17.0 m, 17.5 m, 18.0 m, 18.5 m, 19.0 m, 19.5 m, 20.0 m, 21 m, 22 m, 23 m, 24 m, 25 m, 26 m, 27 m, 28 m, 29 m, 30 m, 31 m, 32 m, 33 m, 34 m, 35 m, 36 m, 37 m, 38 m, 39 m, 40 m, 41 m, 42 m, 43 m, 44 m, 45 m, 46 m, 47 m, 48 m, 49 m, 50 m, 51 m, 52 m, 53 m, 54 m, 55 m, 56 m, 57 m, 58 m, 59 m, 60 m, 61 m, 62 m, 63 m, 64 m, 65 m, 66 m, 67 m, 68 m, 69 m, 70 m, 71 m, 72 m, 73 m, 74 m, 75 m, 76 m, 77 m, 78 m, 79 m, 80 m, 81 m, 82 m, 83 m, 84 m, 85 m, 86 m, 87 m, 88 m, 89 m, 90 m, 91 m, 92 m, 93 m, 94 m, 95 m, 96 m, 97 m, 98 m, 99 m, 100 m or more are to be understood by a total length of all of the present working chambers of the high concentration device of at least 2.5 m. In particular, cross-sectional thicknesses or internal diameters of 3 mm, 4 mm, 5 mm, 6 mm, 7 mm, 8 mm, 9 mm, 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 41 cm, 42 cm, 43 cm, 44 cm, 45 cm, 46 cm, 47 cm, 48 cm, 49 cm, 50 cm, 51 cm, 52 cm, 53 cm, 54 cm, 55 cm, 56 cm, 57 cm, 58 cm, 59 cm, 60 cm, 61 cm, 62 cm, 63 cm, 64 cm, 65 cm, 66 cm, 67 cm, 68 cm, 69 cm, 70 cm, 71 cm, 72 cm, 73 cm, 74 cm, 75 cm, 76 cm, 77 cm, 78 cm, 79 cm, 80 cm, 81 cm, 82 cm, 83 cm, 84 cm, 85 cm, 86 cm, 87 cm, 88 cm, 89 cm, 90 cm, 91 cm, 92 cm, 93 cm, 94 cm, 95 cm, 96 cm, 97 cm, 98 cm, 99 cm, 1.0 m, 1.1 m, 1.2 m, 1.3 m, 1.4 m, 1.5 m, 1.6 m, 1.7 m, 1.8 m, 1.9 m, 2.0 m, 2.1 m, 2.2 m, 2.3 m, 2.4 m, 2.5 m, 2.6 m, 2.7 m, 2.8 m, 2.9 m, 3.0 m, 3.1 m, 3.2 m, 3.3 m, 3.4 m, 3.5 m, 3.6 m, 3.7 m, 3.8 m, 3.9 m, 4.0 m, 4.1 m, 4.2 m, 4.3 m, 4.4 m, 4.5 m, 4.6 m, 4.7 m, 4.8 m, 4.9 m, 5.0 m, 5.1 m, 5.2 m, 5.3 m, 5.4 m, 5.5 m, 5.6 m, 5.7 m, 5.8 m, 5.9 m or 6.0 m as well as corresponding intermediate values are to be understood by a cross-sectional thickness between 3 mm and 6.0 m. In particular, the cross-sectional thickness can be selected depending on the planned volume flow.

Alternatively or additionally, it is provided that a geometry of the at least one working chamber is selected such that a volume $V_2$, which the working chamber has in a length section of 2 m to 4 m, corresponds to a final volume of second flavoring substance concentrate. Hereby, the geometry of the working chamber can be optimally adapted to that final or desired volume, which the second flavoring substance concentrate is to have or to which the first flavoring substance concentrate is to be concentrated. Deviations of up to ±10% between the volume $V_2$ and the final volume can be provided.

Further advantages arise in that the high concentration device includes at least one pumping device, which is adapted to pump the flavoring substance concentrate through the at least one working chamber, preferably with a percolation rate of at least 20 ml/(min*cm$^2$). This allows a particularly precise process control. For example, percolation rates of 20 ml/(min*cm$^2$), 25 ml/(min*cm$^2$), 30 ml/(min*cm$^2$), 35 ml/(min*cm$^2$), 40 ml/(min*cm$^2$), 45 ml/(min*cm$^2$), 50 ml/(min*cm$^2$), 55 ml/(min*cm$^2$), 60 ml/(min*cm$^2$), 65 ml/(min*cm$^2$), 70 ml/(min*cm$^2$), 75 ml/(min*cm$^2$), 80 ml/(min*cm$^2$), 85 ml/(min*cm$^2$), 90 ml/(min*cm$^2$), 95 ml/(min*cm$^2$), 100 ml/(min*cm$^2$) or more as well as corresponding intermediate values are to be understood by a percolation rate of at least 20 ml/(min*cm$^2$).

Further advantages arise in that the high concentration device includes at least two working chambers capable of being fluidically coupled to each other, wherein at least one pumping device for delivering the fluid through the working chambers is disposed upstream of a working chamber and/or between two working chambers and/or that all of the working chambers are fluidically disposed between two pumping devices. By the fluidic coupling of the two or more working chambers in connection with the at least one pumping device, considerably higher flow speeds are achieved in loading, in particular in contrast to a single working chamber with the same volume. In addition, the total length of the adsorption system increases such that a correspondingly higher recovery rate or a high final concentration in the second or each further flavoring substance concentrate can be achieved.

Further advantages arise in that the high concentration device is formed to subject the at least one sorption agent to a fluidic desorption agent to desorb flavoring substances adsorbed on the sorption agent as a second flavoring substance concentrate accumulated in flavoring substance. In this manner, it is possible to obtain the second or each further flavoring substance concentrate with the aid of the desorption agent as an eluate of the high concentration device. The desorption agent can basically be the same desorption agent as in the above described extraction of the first flavoring substance concentrate, that is a fluidic pure substance as well as any mixtures and/or gradients of two or more desorption agents. Furthermore, the desorption agent of the high concentration device can be the same desorption agent/desorption agent mixture or the same desorption agent gradient as in the extraction of the first flavoring substance concentrate. Alternatively, a varying desorption agent/desorption agent mixture or a deviating desorption agent gradient can be provided. Hereby, an at least extensive removal of ethanol from the flavoring substance concentrate in terms of a solvent exchange is for example possible, for example by using water or water vapor as the desorption agent for the high concentration device. Alternatively, ethanol can (also) be used as the desorption agent or an ethanol-containing desorption agent mixture for obtaining the second or each further flavoring substance concentrate in the high concentration device.

Further advantages arise in that the high concentration device includes at least one tempering device, by means of which at least an area of the high concentration device can be tempered to a predetermined temperature. Hereby, the adsorption and/or desorption characteristic of the high concentration device can be optimally adapted to the composition of the first flavoring substance concentrate and/or the desired second flavoring substance concentrate. For example, the tempering device can be formed such that temperatures of 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C. or more are adjustable, wherein corresponding intermediate values such as for example 40° C., 41° C., 42° C., 43° C., 44° C., 45° C., 46° C., 47° C., 48° C., 49° C., 50° C. etc. are to be regarded as also disclosed. The tempering device can basically be formed for relative heating and/or cooling.

Further advantages arise in that it includes a metering device, by means of which a pH value of the fluid and/or at least one desorption agent and/or the first and/or second flavoring substance concentrate can be adjusted and/or varied. In this manner, a specific discrimination of acidic and alkaline flavoring substances, respectively, is possible. Non-conclusive examples for such flavoring substances are in particular amines (primary, secondary and tertiary amines) as well as carboxylic acid-containing compounds (e.g. formic acid, acetic acid etc).

Further advantages arise in that at least one working chamber is helically and/or spirally and/or zigzag-shaped and/or meandering formed at least in certain areas. Hereby, the at least one working chamber, which is comparatively long on the one hand and comparatively thin on the other hand as already discussed, is formed in particularly space saving manner and can be particularly simply integrated in the adsorption system and the high concentration device, respectively.

A second aspect of the invention relates to a method for operating an adsorption system according to the first inventive aspect, in which at least one sorption agent as a stationary phase is arranged in the at least one working chamber of the adsorption system and is traversed by a flavoring substance-containing fluid as a mobile phase such that at least a part of the flavoring substances contained in the fluid adsorbs on the sorption agent, wherein a ratio of average cross-sectional thickness to total length of the at least one working chamber is at most 0.3. Therein, a food item is used as the flavoring substance-containing fluid, which stems from the group of beer-containing staple and/or luxury food items, beer wort, hops, hop extract, malt water, malt beer, malt wort and brewery-specific ingredients and products and/or is obtained from an ethanol-containing food item from the group of beer-containing staple and/or luxury food items by means of a dealcoholizing device. Hereby, a preferably narrow sorbent bed as long as possible is provided and used for the adsorption of at least a part of the flavoring substance molecules contained in the fluid, whereby it is possible to adsorb both polar and non-polar flavoring substances on the sorption agent as uniformly as possible depending on the binding characteristic of the respectively used sorption agent or agents and the flavoring substance molecules located in the fluid. Accordingly, it is possible with the aid of the method to produce particularly authentic and highly accumulated flavoring substance concentrates, that is flavoring substance concentrates, in which all of the flavoring substances present in the original fluid are present at least predominantly or substantially uniformly and low-loss accumulated with high accumulation factors. Further features and the advantages thereof can be taken from the descriptions of the first inventive aspect, wherein advantageous configurations of the first inventive aspect are to be regarded as advantageous configurations of the second inventive aspect and vice versa.

Generally, the method can be performed at all suitable process temperatures, for example at temperatures between −100° C. and +200° C., thus for example at −100° C., −95° C., −90° C., −85° C., −80° C., −75° C., −70° C., −65° C., −60° C., −55° C., −50° C., −45° C., −40° C., −35° C., −30° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C. or more, wherein corresponding intermediate temperatures as 80° C., 81° C., 82° C., 83° C., 84° C., 85° C., 86° C., 87° C., 88° C., 89° C., 90° C. etc. are to be regarded as also disclosed. Lower process temperatures are for example suitable in some applications for cooling and/or condensing hot fluids from the room air or industrial processes. Higher process temperatures can promote the loading and/or unloading of the sorption agent in some applications. Furthermore, it is possible to vary the process temperature one or multiple times during the method.

Furthermore, the method can basically be performed at all suitable process pressures, for example at pressures between about 0 bar and about 15 bar, thus for example at 0.0001 bar, 0.001 bar, 0.01 bar, 0.1 bar, 0.2 bar, 0.3 bar, 0.4 bar, 0.5 bar, 0.6 bar, 0.7 bar, 0.8 bar, 0.9 bar, 1 bar, 2 bar, 3 bar, 4 bar, 5 bar, 6 bar, 7 bar, 8 bar, 9 bar, 10 bar, 11 bar, 12 bar, 13 bar, 14 bar, 15 bar or more. Furthermore, it is possible to vary the process pressure one or multiple times during the method.

In an advantageous configuration of the invention, it is provided that a flavoring substance-containing distillate and/or a flavoring substance-containing membrane permeate of an at least partially dealcoholized beer are used as the fluid. Hereby, fluids, which are obtained by different dealcoholizing methods, can advantageously be used for flavoring substance recovery and accumulation. Alternatively or additionally, it is provided that a fluid with an ethanol content between 0% by vol. and 50% by vol. is used. In particular, ethanol contents of 0% by vol., 1% by vol., 2% by vol., 3% by vol., 4% by vol., 5% by vol., 6% by vol., 7% by vol., 8% by vol., 9% by vol. 10% by vol. 11% by vol. 12% by vol. 13% by vol. 14% by vol. 15% by vol., 16% by vol. 17% by vol. 18% by vol. 19% by vol. 20% by vol. 21% by vol. 22% by vol., 23% by vol. 24% by vol. 25% by vol. 26% by vol. 27% by vol. 28% by vol., 29% by vol., 30% by vol. 31% by vol. 32% by vol. 33% by vol. 34% by vol. 35% by vol., 36% by vol., 37% by vol. 38% by vol. 39% by vol. 40% by vol. 41% by vol. 42% by vol., 43% by vol., 44% by vol., 45% by vol., 46% by vol., 47% by vol., 48% by vol., 49% by vol. or 50% by vol. as well as corresponding intermediate values are understood by an ethanol content between 0% by vol. and 50% by vol. Hereby, very different fluids, which are present in a brewery or produced by it, can be processed within the scope of the method according to the invention and used for producing flavoring substance concentrates.

Further advantages arise in that the fluid is conducted through the at least one working chamber with an average percolation rate of at least 20 ml/(min*cm$^2$). This allows a particularly precise process control. For example, percolation rates of 20 ml/(min*cm$^2$), 25 ml/(min*cm$^2$), 30 ml/(min*cm$^2$), 35 ml/(min*cm$^2$), 40 ml/(min*cm$^2$), 45 ml/(min*cm$^2$), 50 ml/(min*cm$^2$), 55 ml/(min*cm$^2$), 60 ml/(min*cm$^2$), 65 ml/(min*cm$^2$), 70 ml/(min*cm$^2$), 75 ml/(min*cm$^2$), 80 ml/(min*cm$^2$), 85 ml/(min*cm$^2$), 90 ml/(min*cm$^2$), 95 ml/(min*cm$^2$), 100 ml/(min*cm$^2$) or more as well as corresponding intermediate values are to be understood by a percolation rate of at least 20 ml/(min*cm$^2$).

In an advantageous configuration of the invention, it is provided that the flavoring substance-containing fluid is conducted parallel through at least two working chambers. This allows a particularly fast loading of the sorbents or sorption agents arranged in the working chambers with short procedure passages, whereby the method can be particularly fast, inexpensively and at least semi- or quasi-continuously performed. In addition, distribution chromatographic effects on the sorption agents can be better controlled and a too severe spatial separation of polar and non-polar flavoring substances can be prevented. This additionally improves the authenticity of the flavoring substance concentrate capable of being obtained by subsequent desorption. At the same time, a high concentration factor is achieved, whereby correspondingly highly accumulated flavoring substance concentrates become accessible. Furthermore, the at least two working chambers can contain different sorption agents or different sorption agent mixtures to ensure an improved adsorption as complete as possible of all of the flavoring substance species contained in the fluid. At the same time, working chambers with low total volume and lower sorbent loading, respectively, can be used than it would be possible in using a single working chamber with the same loading capacity. Thereby, the pressure drop across the working chambers decreases, whereby it can be operated at lower differential pressures. This for example allows the use of more inexpensive pumping devices and results in a lower wear of the sorption agent, whereby corresponding cost savings are realizable. In addition, the method can be simply adapted to different fluid flows via the respectively selected number and type of the working chambers and the sorption agents contained therein. Alternatively or additionally, it is provided that the flavoring substance-containing fluid is conducted through the at least one working chamber opposite to the direction of gravity. In other words, the working chamber or chambers are arranged as vertical as possible and traversed by the fluid from the bottom to the top. This improves the adsorption of the flavoring substances contained in the fluid.

Alternatively or additionally, it is provided that the fluid is serially conducted through at least two working chambers, wherein at least one downstream working chamber preferably has a larger volume than at least one upstream working chamber. In other words, two or more working chambers arranged one after the other in loading direction are serially traversed, wherein the working chambers have volumes increasing in loading direction. Hereby, it is particularly simply possible to predominantly bind the non-polar flavoring substances in the first or upstream working chamber and to predominantly bind the polar flavoring substances in the second or downstream working chamber. The volume ratios of the individual working chambers correlate with the sorbent amount respectively capable of being introduced and with the flavoring substance amounts respectively to be bound. Further advantages are in that the at least two working chambers can be subjected to a desorption in different manner and independently of each other, respectively. The two- or multi-stage design moreover offers additional possibilities to the benefit of the specific accumulation or depletion of certain flavoring substances, whereby modulation of the flavor profile is possible. Furthermore, the two- or multi-stage design allows that particularly high accumulation factors can be achieved. One working chamber alone usually cannot receive a large initial volume in a reasonable process time on the one hand and allow a particularly low extract volume with correspondingly high accumulation factors of the individual flavoring substances on the other hand. For example, with an accumulation by a factor of 3000, ca. 3000 liters would have to be delivered through the one working chamber in the adsorption mode on the one hand, but only 1 liter of extract would have to be extracted in the desorption mode. However, this is possible with two or more working chambers, which are serially loaded in the described manner.

Further advantages arise in that a temperature in the at least one upstream working chamber is set to a higher value than a temperature in the at least one downstream working chamber upon passing the fluid. Hereby, the adsorption characteristic can be optimally adjusted such that particularly authentic flavoring substance concentrates with high recovery rates are obtainable.

In a further advantageous configuration of the invention, it is provided that the sorption agent is subjected to a fluidic desorption agent after adsorbing at least a part of the flavoring substances from the fluid such that the flavoring substances adsorbed on the sorption agent at least partially desorb. This allows the recovery of the adsorbed flavoring substances in the form of a flavoring substance concentrate containing them.

Further advantages arise in that the desorption agent is conducted through the at least one working chamber in reverse flow direction compared to the flavoring substance-containing fluid. In other words, the working chamber or chambers and the sorption agent arranged therein, respectively, are traversed in reverse direction for unloading with respect to the flow direction used for loading. This represents an at least substantially complete recovery of all of the flavoring substances adsorbed on the respective sorption agent, whereby a correspondingly complete recovery of the flavoring substances contained in the original fluid in highly concentrated form is achieved. Alternatively or additionally, it is provided that the desorption agent is serially conducted through at least two working chambers. This too ensures an at least largely complete recovery of the flavoring substances, which are adsorbed on the respective sorption agent in the at least two working chambers. Alternatively or additionally, it is provided that the desorption agent is pumped opposite to the flow direction of the fluid with a higher differential pressure. This allows switching between adsorption and loading, respectively, and desorption and unloading, respectively, in simple manner. In addition, it is possible to introduce the desorption agent with the desorbed flavoring substances contained therein into the fluid or into a fluid main flow after the working chamber, to dilute it in the fluid main flow and to supply it to a further working chamber. Hereby, one or more downstream working chambers can be subjected to a fluid accumulated in flavoring substances with respect to the original fluid, wherein an (always) higher flavoring substance accumulation with correspondingly high concentration factors can be achieved in the one or more downstream working chambers.

In a further advantageous configuration of the invention, it is provided that the desorption agent is conducted through the at least one working chamber in direction of gravity. In other words, the working chamber or chambers are disposed as vertically as possible and traversed by the desorption agent from the top to the bottom. This improves the desorption of the flavoring substances adsorbed on the sorption agent, whereby correspondingly highly concentrated authentic flavoring substance concentrates are obtained.

Further advantages arise in that a desorption agent gradient is employed in conducting through at least one working chamber and/or a solvent change is employed for gradual desorption of flavoring substances from the same working chamber and/or that different desorption agents are conducted through different working chambers and/or that different desorption agent volumes are conducted through different working chambers. This optionally allows the production of particularly authentic flavoring substance concentrates with particularly high accumulation factors of the individual flavoring substances or alternatively the specific modulation of the composition of the flavoring substance concentrate, for example not to recover and accumulate, respectively, undesired flavoring substances or only to low extent, while desired flavoring substances are accumulated relative to the undesired ones. Hereby, a kind of solvent change is similarly possible, in which ethanol is preferably partially or completely replaced with another solvent, in particular water.

Further advantages arise in that differently tempered desorption agents are conducted through different working chambers. For example, a first working chamber can be subjected to a desorption agent tempered to room temperature (25° C.) and a second working chamber can be subjected to a temperature increased with respect to the room temperature (e.g. 50° C., 75° C., 100° C. or more) to achieve a certain desorption characteristic. Alternatively or additionally, it is provided that only predetermined areas of the at least one working chamber are subjected to desorption agent, whereby only certain flavoring substances or flavoring substance groups or fractions can be selectively desorbed to specifically modulate the flavor profile of the resulting flavoring substance concentrate. Alternatively or additionally, it is provided that at least one working chamber is subjected to a desorption agent at an increased pressure with respect to a normal pressure. Hereby too, a certain desorption characteristic can be achieved.

Further advantages arise in that at least two desorbed fractions are collected and combined to the flavoring substance concentrate. This means that 2, 3, 4, 5, 6, 7, 8, 9, 10, 11, 12, 13, 14, 15, 16, 17, 18, 19, 20 or more fractions are collected, at least two of which are completely or partially combined to the flavoring substance concentrate. This is in particular advantageous if multiple working chambers are subjected to optionally different desorption agents to ensure a recovery of all of the flavoring substances as complete as possible. Conversely, it is of course basically possible to discard one or more fractions or only partially combine them to the flavoring substance concentrate to achieve modeling of the flavor profile.

Further advantages arise in that at least one desorption agent from the group of ethanol, water, water vapor and ethanol-water mixture is used. Hereby, the parameters of accumulation factor, recovery degree and ethanol content of the flavoring substance concentrate can in particular be specifically influenced. In particular the use of water and/or water vapor as the desorption agent afterwards facilitates the production of alcohol-free beers with particularly low ethanol contents (e.g. <0.1% by vol., <0.045% by vol. or less), since the flavoring substance concentrate, which can be mixed with the alcohol-free beer, to improve the flavor profile thereof, a priori contains very little ethanol or is even practically free of ethanol such that also the addition of larger amounts of flavoring substance concentrate does not entail or at least does not entail a relevant increase of the ethanol content.

Further advantages arise in that a flavoring substance concentrate is produced, in which a recovery ratio of 3-methylbutane-1-ol:2-phenylethanol is at least $2/3$ related to the initial concentrations in the fluid and/or in which at least 30 mol %, thus for example 30 mol %, 35 mol %, 40 mol %, 45 mol %, 50 mol %, 55 mol %, 60 mol %, 65 mol %, 70 mol %, 75 mol %, 80 mol %, 85 mol %, 90 mol %, 95 mol %, 100 mol % or more of 2-phenylethanol have been recovered related to the initial concentration in the fluid and/or in which the concentrations of 3-methylbutane-1-ol and 2-phenylethanol are accumulated at least by the factor of 10, thus for example by the factor of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more related to the initial concentrations in the fluid. Hereby, it is ensured that polar and non-polar flavoring substances relevant to the beer flavor are at least largely recovered and concentrated as highly as possible.

In a further advantageous configuration of the invention, it is provided that a flavoring substance-containing distillate and/or a flavoring substance-containing membrane permeate of an at least partially dealcoholized beer is used as the fluid, wherein an ethanol amount of the first flavoring substance concentrate is at most $1/10$ of an ethanol amount of the employed fluid (distillate, membrane permeate). This allows the production of flavoring substance concentrates correspondingly depleted in ethanol, which can be added to an alcohol-free beer without problem, to improve the flavor profile of the dealcoholized beer without a relevant increase of the ethanol content of the dealcoholized beer occurring. Thereby, beers with a residual ethanol content of less than 0.1% by vol., in particular of at most 0.045% by vol., can similarly be produced, which nevertheless have an authentic flavor profile, which for example corresponds to that of a full beer, without having to add synthesized or natural or nature-identical flavors to the beer hereto, in particular such flavors, which were not obtained from beer. In contrast, all of the flavoring substances added to the beer can be recovered from brewery-specific ingredients and products. Therein, in particular ethanol amounts of $1/10$, $1/20$, $1/30$, $1/40$, $1/50$, $1/60$, $1/70$, $1/80$, $1/90$, $1/100$, $1/110$, $1/120$, $1/130$, $1/140$, $1/150$, $1/160$, $1/170$, $1/180$, $1/190$, $1/200$, $1/300$, $1/400$, $1/500$, $1/600$, $1/700$, $1/800$, $1/900$, $1/1000$, $1/1100$, $1/1200$, $1/1300$, $1/1400$, $1/1500$, $1/1600$, $1/1700$, $1/1800$, $1/1900$, $1/2000$, $1/2100$, $1/2200$, $1/2300$, $1/2400$, $1/2500$, $1/2600$, $1/2700$, $1/2800$, $1/2900$, $1/3000$, $1/3100$, $1/3200$, $1/3300$, $1/3400$, $1/3500$, $1/3600$, $1/3700$, $1/3800$, $1/3900$, $1/4000$, $1/4100$, $1/4200$, $1/4300$, $1/4400$, $1/4500$, $1/4600$, $1/4700$, $1/4800$, $1/4900$, $1/5000$ or less related to the ethanol amount on the volume of the employed starting fluid are to be understood by an ethanol amount of at most $1/10$.

Further advantages arise in that an ethanol content of the flavoring substance concentrate is adjusted to a value between 0.5% by vol. and 40% by vol. preferably by addition of brewing water. Thereby, the ethanol content can for example be adjusted to 0.5% by vol., 1.0% by vol., 1.5% by vol., 2.0% by vol., 2.5% by vol., 3.0% by vol., 3.5% by vol., 4.0% by vol., 4.5% by vol., 5.0% by vol., 5.5% by vol., 6.0% by vol., 6.5% by vol., 7.0% by vol., 7.5% by vol., 8.0% by vol., 8.5% by vol., 9.0% by vol., 9.5% by vol., 10.0% by vol., 10.5% by vol., 11.0% by vol., 11.5% by vol., 12.0% by vol., 12.5% by vol., 13.0% by vol., 13.5% by vol., 14.0% by vol., 14.5% by vol. 15.0% by vol. 15.5% by vol. 16.0% by vol. 16.5% by vol. 17.0% by vol. 17.5% by vol. 18.0% by vol. 18.5% by vol. 19.0% by vol. 19.5% by vol. 20.0% by vol. 20.5% by vol., 21.0% by vol., 21.5% by vol., 22.0% by vol., 22.5% by vol., 23.0% by vol., 23.5% by vol., 24.0% by vol., 24.5% by vol., 25.0% by vol., 25.5% by vol., 26.0% by vol., 26.5% by vol., 27.0% by vol., 27.5% by vol., 28.0% by vol., 28.5% by vol., 29.0% by vol., 29.5% by vol., 30.0% by vol., 30.5% by vol., 31.0% by vol., 31.5% by vol., 32.0% by vol., 32.5% by vol., 33.0% by vol., 33.5% by vol., 34.0% by vol., 34.5% by vol., 35.0% by vol., 35.5% by vol., 36.0% by vol., 36.5% by vol., 37.0% by vol., 37.5% by vol., 38.0% by vol., 38.5% by vol., 39.0% by vol., 39.5% by vol. or 40.0% by vol. Hereto, brewing water present in breweries anyway is preferably used. By adjusting the ethanol content, it can be ensured that a desired loading characteristic of the sorption agent or agents is achieved in partial or complete further processing of the first flavoring substance concentrate in the high concentration device.

Further advantages arise in that at least a part of the first flavoring substance concentrate from at least one working chamber of the first accumulation stage of the adsorption system is separated into at least one permeate depleted in flavoring substances and into at least one second flavoring substance concentrate accumulated in flavoring substances by means of a high concentration device. The permeate depleted in flavoring substances can optionally be discarded or be used for producing alcoholic beverages, the taste of which is not to be reminiscent of beer. The second flavoring substance concentrate further accumulated with respect to the first flavoring substance concentrate can be particularly well used for adjusting the flavor profile of a dealcoholized or alcohol-free beer without increasing the ethanol content thereof. Alternatively or additionally, the second flavoring substance concentrate can be used for flavoring other staple and luxury food items, perfumes and the like. Further, it can be provided that at least a part of the first flavoring substance concentrate is mixed with at least a part of the second flavoring substance concentrate to a third flavoring substance concentrate.

In further configuration of the invention, an additional accumulation of the flavoring substance concentrate is allowed in that the flavoring substance concentrate is conducted through at least one working chamber of the high concentration device, in which at least one sorption agent is arranged as a stationary phase and attaches to flavoring substances of the flavoring substance concentrate conducted through the working chamber as a mobile phase.

Further advantages arise in that the flavoring substance concentrate is conducted through at least one working chamber, which has a total length of at least 2.5 m and/or that the flavoring substance concentrate is conducted through the at least one working chamber with an average percolation rate of at least 20 ml/(min*cm$^2$). Hereby, an at least predominant recovery both of polar and non-polar flavoring substances in a process time as short as possible is allowed, whereby the authentic flavor profile remains and the method can be correspondingly economically performed.

Further advantages arise in that the at least one sorption agent of the high concentration device is subjected to a fluidic desorption agent and flavoring substances adsorbed on the sorption agent are desorbed as a second flavoring substance concentrate, wherein at least the flavoring substances 3-methylbutane-1-ol and 2-phenylethanol are therein preferably accumulated at least by the factor of 10, thus for example by the factor of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more relative to the first flavoring substance concentrate. Starting from the original fluid, it is thereby possible to produce a second flavoring substance concentrate highly concentrated with respect to the first flavoring substance concentrate, in which both the beer-typical polar and the beer-typical non-polar flavoring substances are accumulated by the factor of 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000 or more, wherein corresponding intermediate values are to be regarded as also disclosed.

Further advantages arise in that at least one desorption agent from the group of ethanol, water, water vapor and ethanol-water mixture is used. Hereby, the parameters of accumulation factor, recovery degree and ethanol content of the flavoring substance concentrate can in particular be specifically influenced. In particular the use of water and/or water vapor as the desorption agent afterwards facilitates the production of alcohol-free beers with particularly low ethanol contents (e.g. <0.1% by vol., <0.045% by vol. or less) since the flavoring substance concentrate, which can be mixed with the alcohol-free beer to improve the flavor profile thereof, a priori contains very little ethanol or is even practically free of ethanol such that also the addition of larger amounts of flavoring substance concentrate does not entail or at least does not entail a relevant increase of the ethanol content.

Further advantages arise in that a flavoring substance-containing distillate and/or a flavoring substance-containing membrane permeate of an at least partially dealcoholized beer is used as the fluid, wherein an ethanol amount of the second flavoring substance concentrate is at most $1/10$ of an ethanol amount of the employed fluid. This allows the production of particularly highly concentrated flavoring substance concentrates, of which correspondingly little volume has to be added to a alcohol-free beer to improve the flavor profile of the dealcoholized beer without a relevant increase of the ethanol content of the dealcoholized beer occurring. Thereby, in particular beers with a residual ethanol content of less than 0.1% by vol., in particular of at most 0.045% by vol., can be produced, which nevertheless have an authentic flavor profile, which corresponds to that of a full beer, without having to add artificial or nature-identical flavors to the beer hereto. In contrast, all of the flavoring substances added to the beer can be recovered from brewery-specific ingredients and products. Therein, in particular ethanol amounts of $1/10$, $1/20$, $1/30$, $1/40$, $1/50$, $1/60$, $1/70$, $1/80$, $1/90$, $1/100$, $1/110$, $1/120$, $1/130$, $1/140$, $1/150$, $1/160$, $1/170$, $1/180$, $1/190$, $1/200$, $1/300$, $1/400$, $1/500$, $1/600$, $1/700$, $1/800$, $1/900$, $1/1000$, $1/1100$, $1/1200$, $1/1300$, $1/1400$, $1/1500$, $1/1600$, $1/1700$, $1/1800$, $1/1900$, $1/2000$, $1/2100$, $1/2200$, $1/2300$, $1/2400$, $1/2500$, $1/2600$, $1/2700$, $1/2800$, $1/2900$, $1/3000$, $1/3100$, $1/3200$, $1/3300$, $1/3400$, $1/3500$, $1/3600$, $1/3700$, $1/3800$, $1/3900$, $1/4000$, $1/4100$, $1/4200$, $1/4300$, $1/4400$, $1/4500$, $1/4600$, $1/4700$, $1/4800$, $1/4900$, $1/5000$ or less related to the ethanol amount in the total volume of the employed starting fluid are to be understood by an ethanol amount of at most $1/10$.

Further advantages arise in that a second flavoring substance concentrate is produced, in which a recovery ratio of 3-methylbutane-1-ol:2-phenylethanol is at least $2/3$ related to the initial concentrations in the fluid and/or in which at least 30 mol % of 2-phenylethanol have been recovered related to the initial concentration in the fluid and/or in which the concentrations of 3-methylbutane-1-ol and 2-phenylethanol are accumulated at least by the factor of 10, thus for example by the factor of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more related to the initial concentrations in the fluid. Hereby, it is ensured that polar and non-polar flavoring substances relevant to the beer flavor are at least largely recovered and concentrated as highly as possible.

Further advantages arise if at least two from a group consisting of first flavoring substance concentrate, second flavoring substance concentrate, flavoring substance-containing fluid, deflavored permeate and beer-containing staple and/or luxury food item, are mixed. In other words, two, three, four of five from the group of first flavoring substance concentrate, second flavoring substance concentrate (high concentration stage), flavoring substance-containing fluid (raw material for flavoring substance concentrate production), deflavored permeate and beer-containing staple and/or luxury food item are mixed with each other to a desired final product. The mixing can for example be manually effected via batch processing or automatically effected in a continuous inline process. Therein, it can basically be provided that the entire volume or only one or more fractions of first flavoring substance concentrate and/or second flavoring substance concentrate and/or flavoring substance-containing fluid and/or deflavored permeate and/or beer-containing staple and/or luxury food item is or are mixed. Hereby, a particularly flexible possibility of adjusting desired flavoring substance profiles as well as of producing desired staple and luxury food items is given. The aim of mixing can for example be filling or compensating for a "flavor gap" between an actual flavor profile and a set flavor profile, for example between the flavor profile of a 0.0% beer and the flavor profile of a 0.5% beer or a full beer. Alternatively, an aim of the mixing can be producing a certain balance of certain flavoring substances, to generate a desired flavor profile. In the case of beer, the flavor profile of a 0.0% beer can for example be adjusted by mixing such that certain flavoring substances are balanced analogously to a 0.5% beer or a full beer starting from the actual flavor profile without the total concentration of the concerned flavoring substances in the mixed beer necessarily corresponding to the total concentration in a full beer.

A third aspect of the invention relates to a working chamber for an adsorption system according to the first inventive aspect, which can be filled with at least one sorption agent. Therein, it is provided according to the invention that a ratio of average cross-sectional thickness to total length of the working chamber is at most 0.3. The features resulting herefrom and the advantages thereof can be taken from the descriptions of the first inventive aspect, wherein advantageous configurations of the first inventive aspect are to be regarded as advantageous configurations of the third inventive aspect and vice versa.

A fourth aspect of the invention relates to a flavoring substance concentrate, which is obtainable and/or obtained from a flavoring substance-containing fluid by means of an adsorption system according to the first inventive aspect and/or by a method according to the second inventive aspect, wherein the flavoring substance-containing fluid is a food item from the group of beer-containing staple and/or luxury food items, beer wort, hops, hop extract, malt water, malt beer, malt wort and brewery-specific ingredients and products and/or is obtained from an ethanol-containing food item from the group of beer-containing staple and/or luxury food items by means of a dealcoholizing device. Thereby, the flavoring substance concentrate optionally represents an authentic image of the fluid, since the flavoring substances originally contained in the fluid are at least largely uniformly accumulated, or a modeled image of the fluid, in which certain flavoring substances are depleted relative to other flavoring substances. This allows particularly flexibly flavoring staple and luxury food items, in particular alcohol-free beer or beer mixed beverages and beverages with beer flavor, respectively, wherein the flavoring substance concentrate can basically also be used alone or for room fragrancing, for producing perfumes and the like. For example, the flavoring substance concentrate can be used for flavoring the following staple and luxury food items:

Non-alcoholic beverages; preparations for the preparation of beverages; alcohol-free cocktail mixed beverages; alcohol-free cocktails; alcohol-free beverages with fruit juices; alcohol-free fundamental basis for cocktails; alcohol-free wines; aperitifs, alcohol-free; flavored, carbonic acid-containing beverages; dealcoholized wines; non-alcoholic wines; smoothies; alcohol-free fruit beverages; sorbet beverages; sorbets; sorbets in the form of beverages; partially frozen refreshing drinks [slush drinks]; deep-frozen beverages based on fruit; wines, alcohol-free; wines, dealcoholized; wines, non-alcoholic; alcohol-free beverages; dealcoholized beverages; refreshing beverages; alcohol-free fruit beverages; alcohol-free fruit extracts; beverages produced from fruit; ice-cooled fruit beverages; fruit beverages; fruit beverages without alcohol; fruit beverages and fruit juices; fruit nectars; fruit juices; fruit juices with fruit pulp; fruit juice beverages; fruit juice concentrates; fruit syrup; beverages based on fruit; carbonic acid-containing juices; concentrated fruit juices (Fruchtsäfte); concentrated fruit juices (Obstsäfte); cider [fermented/unfermented]; fruit juices for use as beverages; juices; juices from mixed fruit; grape juices; grape juice beverages; beverages predominantly composed of fruit juices; alcoholic beverages including beer; alcoholic preparations for the preparation of beverages; alcohol-containing jelly beverages; alcoholic carbonic acid-containing beverages including beer; aperitifs; beverages with low alcohol content; liquors and liqueurs; wines; liquors; alcohol-reduced wines and beers; champagne; fruit wine; natural sparkling wines; fruit sparkling wines; rosé wines; red wine; sparkling wines; bubbly; sweet wines; dinner wines; grape sparkling wine; grape wine; pomace wine; wine for the food preparation; wines with increased alcohol content; wine-containing beverages [wine spritzers]; white wines; alcopops; alcohol-containing fruit extracts; alcohol-containing beverages with fruit content; alcoholic mixed drinks including beer mixed beverages; alcoholic punch; cold punches [beverages]; cocktails and wine punches, wherein this enumeration is not conclusive.

Further features and the advantages thereof can be taken from the descriptions of the first and the second inventive aspect, wherein advantageous configurations of the first and the second inventive aspect are to be regarded as advantageous configurations of the fourth inventive aspect and vice versa.

A fifth aspect of the invention relates to a deflavored permeate, obtainable and/or obtained from a flavoring substance-containing fluid by means of an adsorption system according to the first inventive aspect and/or by a method according to the second inventive aspect, wherein the flavoring substance-containing fluid is a food item from the group of beer-containing staple and/or luxury food items, beer wort, hops, hop extract, malt water, malt beer, malt wort and brewery-specific ingredients and products and/or is obtained from an ethanol-containing food item from the group of beer-containing staple and/or luxury food items by means of a dealcoholizing device. Since an at least large recovery of the flavoring substances contained in the fluid is possible with the aid of the adsorption system and the method, respectively, the permeate is correspondingly highly depleted and at least approximately odorless for the human. Therefore, the deflavored permeate can be advantageously used for producing staple and luxury food items, which are not to have a beer-typical flavor profile. An enumeration of suitable staple and luxury food items is found in the description of the fourth inventive aspect and is also applicable to the present inventive aspect.

A sixth aspect of the invention relates to a beer, which is produced by mixing an at least partially dealcoholized and/or fermentation-halted beer-containing staple and/or luxury food item with a flavoring substance concentrate, which is obtainable and/or obtained by means of an adsorption system according to the first inventive aspect and/or by a method according to the second inventive aspect, wherein the beer has an ethanol content of at most 0.5% by vol. and a concentration of 3-methylbutane-1-ol in the staple and/or luxury food item is at least 0.01 ppm. The flavoring substance 3-methylbutane-1-ol, which is a comparatively highly polar compound, is important for a beer-typical flavor profile one the one hand, but is severely depleted and a priori not formed or only formed to low extent in the production of alcohol-free beer, be it by dealcoholization and/or by fermentation stop, since 3-methylbutane-1-ol (isoamyl alcohol) is formed by degradation of the amino acid leucin during fermentation with yeasts via the intermediate stage of the α-keto isocaproic acid, that is only during the fermentation. Thereby, 3-methylbutane-1-ol represents an important flavor component on the one hand and an important indicator of the presence of a beer flavor as authentic as possible on the other hand, which can only be achieved or restored by recovery of both polar and non-polar flavoring substances as uniform as possible. In contrast to an artificial addition of pure 3-methylbutane-1-ol, which results in a correspondingly artificial olfactory impression due to the lack of further polar beer-typical flavoring substances, authentic flavoring substance concentrates can be obtained from brewery-specific ingredients and products and be used for producing alcohol-free beer with a flavor profile similar to full beer or with a flavor profile, which would correspond to that of the original non-dealcoholized or fully fermented beer, by mixing by means of an adsorption system according to the first inventive aspect and/or by a method according to the second inventive aspect. Due to the high concentration factors, which are achievable with the aid of the adsorption system and method according to the invention, respectively, correspondingly low amounts of flavoring substance concentrate are required to achieve a beer-typical flavor profile such that the ethanol content of the dealcoholized beer is not or at least practically not influenced. Alternatively, it is possible with the aid of the adsorption system and method according to the invention, respectively, to produce aqueous flavoring substance concentrates with optionally relatively low concentration factors, but which are ethanol-free or at least substantially ethanol-free such that their addition to a dealcoholized and/or fermentation-halted beer in an amount, which is sufficient for ensuring a beer-typical flavor, does not entail or at least not entail a relevant (<0.1% by vol., in particular <0.01% by vol., preferably <0.005% by vol.) increase of the ethanol content of the finished beer. The dealcoholized and/or fermentation-halted beer can for example be a top- or bottom-fermented beer or a mixture of top- and bottom-fermented beers.

Top-fermented beer types for example include ale, top-fermented dark beer, Berliner Weiße, spelt beer, Emmerbier, Gose, oats beer, Kölsch, Wieß, Porter, rye beer, stout and wheat beer, while bottom-fermented beer types for example include export beer, light beer, lager beer, Maerzen, Munich dark beer, porter, pils, black beer, red beer or Zoigl, wherein this enumeration is not conclusive. Correspondingly, the flavoring substance concentrate, with which the beer is mixed, can also have been obtained from the mentioned beer types, individually or in any combination, or from a fluid, which is related to the production of one or more of the mentioned beer types in the brewing trade. The expression ppm (parts per million, millionth) stands for the number $10^{-6}$ and is used for the millionth part related to the mass within the scope of the present disclosure. In particular, 0.01 ppm, 0.02 ppm, 0.03 ppm, 0.04 ppm, 0.05 ppm, 0.06 ppm, 0.07 ppm, 0.08 ppm, 0.09 ppm, 0.10 ppm, 0.11 ppm, 0.12 ppm, 0.13 ppm, 0.14 ppm, 0.15 ppm, 0.16 ppm, 0.17 ppm, 0.18 ppm, 0.19 ppm, 0.20 ppm, 0.21 ppm, 0.22 ppm, 0.23 ppm, 0.24 ppm, 0.25 ppm, 0.26 ppm, 0.27 ppm, 0.28 ppm, 0.29 ppm, 0.30 ppm, 0.31 ppm, 0.32 ppm, 0.33 ppm, 0.34 ppm, 0.35 ppm, 0.36 ppm, 0.37 ppm, 0.38 ppm, 0.39 ppm, 0.40 ppm, 0.41 ppm, 0.42 ppm, 0.43 ppm, 0.44 ppm, 0.45 ppm, 0.46 ppm, 0.47 ppm, 0.48 ppm, 0.49 ppm, 0.50 ppm, 0.51 ppm, 0.52 ppm, 0.53 ppm, 0.54 ppm, 0.55 ppm, 0.56 ppm, 0.57 ppm, 0.58 ppm, 0.59 ppm, 0.60 ppm, 0.61 ppm, 0.62 ppm, 0.63 ppm, 0.64 ppm, 0.65 ppm, 0.66 ppm, 0.67 ppm, 0.68 ppm, 0.69 ppm, 0.70 ppm, 0.71 ppm, 0.72 ppm, 0.73 ppm, 0.74 ppm, 0.75 ppm, 0.76 ppm, 0.77 ppm, 0.78 ppm, 0.79 ppm, 0.80 ppm, 0.81 ppm, 0.82 ppm, 0.83 ppm, 0.84 ppm, 0.85 ppm, 0.86 ppm, 0.87 ppm, 0.88 ppm, 0.89 ppm, 0.90 ppm, 0.91 ppm, 0.92 ppm, 0.93 ppm, 0.94 ppm, 0.95 ppm, 0.96 ppm, 0.97 ppm, 0.98 ppm, 0.99 ppm, 1 ppm, 2 ppm, 3 ppm, 4 ppm, 5 ppm, 6 ppm, 7 ppm, 8 ppm, 9 ppm, 10 ppm, 11 ppm, 12 ppm, 13 ppm, 14 ppm, 15 ppm, 16 ppm, 17 ppm, 18 ppm, 19 ppm, 20 ppm, 21 ppm, 22 ppm, 23 ppm, 24 ppm, 25 ppm, 26 ppm, 27 ppm, 28 ppm, 29 ppm, 30 ppm, 31 ppm, 32 ppm, 33 ppm, 34 ppm, 35 ppm, 36 ppm, 37 ppm, 38 ppm, 39 ppm, 40 ppm, 41 ppm, 42 ppm, 43 ppm, 44 ppm, 45 ppm, 46 ppm, 47 ppm, 48 ppm, 49 ppm, 50 ppm, 51 ppm, 52 ppm, 53 ppm, 54 ppm, 55 ppm, 56 ppm, 57 ppm, 58 ppm, 59 ppm, 60 ppm, 61 ppm, 62 ppm, 63 ppm, 64 ppm, 65 ppm, 66 ppm, 67 ppm, 68 ppm, 69 ppm, 70 ppm, 71 ppm, 72 ppm, 73 ppm, 74 ppm, 75 ppm, 76 ppm, 77 ppm, 78 ppm, 79 ppm, 80 ppm, 81 ppm, 82 ppm, 83 ppm, 84 ppm, 85 ppm, 86 ppm, 87 ppm, 88 ppm, 89 ppm, 90 ppm, 91 ppm, 92 ppm, 93 ppm, 94 ppm, 95 ppm, 96 ppm, 97 ppm, 98 ppm, 99 ppm, 100 ppm, 101 ppm, 102 ppm, 103 ppm, 104 ppm, 105 ppm, 106 ppm, 107 ppm, 108 ppm, 109 ppm, 110 ppm, 111 ppm, 112 ppm, 113 ppm, 114 ppm, 115 ppm, 116 ppm, 117 ppm, 118 ppm, 119 ppm, 120 ppm or more are to be understood by a mass portion of at least 0.01 ppm, wherein corresponding intermediate values such as for example 35.01 ppm, 35.02 ppm, 35.03 ppm, 35.04 ppm, 35.05 ppm, 35.06 ppm, 35.07 ppm, 35.08 ppm, 35.09 ppm, 35.10 ppm, 35.11 ppm, 35.12 ppm, 35.13 ppm, 35.14 ppm, 35.15 ppm, 35.16 ppm, 35.17 ppm, 35.18 ppm, 35.19 ppm, 35.20 ppm, 35.21 ppm, 35.22 ppm, 35.23 ppm, 35.24 ppm, 35.25 ppm, 35.26 ppm, 35.27 ppm, 35.28 ppm, 35.29 ppm, 35.30 ppm, 35.31 ppm, 35.32 ppm, 35.33 ppm, 35.34 ppm, 35.35 ppm, 35.36 ppm, 35.37 ppm, 35.38 ppm, 35.39 ppm, 35.40 ppm, 35.41 ppm, 35.42 ppm, 35.43 ppm, 35.44 ppm, 35.45 ppm, 35.46 ppm, 35.47 ppm, 35.48 ppm, 35.49 ppm, 35.50 ppm, 35.51 ppm, 35.52 ppm, 35.53 ppm, 35.54 ppm, 35.55 ppm, 35.56 ppm, 35.57 ppm, 35.58 ppm, 35.59 ppm, 35.60 ppm, 35.61 ppm, 35.62 ppm, 35.63 ppm, 35.64 ppm, 35.65 ppm, 35.66 ppm, 35.67 ppm, 35.68 ppm, 35.69 ppm, 35.70 ppm, 35.71 ppm, 35.72 ppm, 35.73 ppm, 35.74 ppm, 35.75 ppm, 35.76 ppm, 35.77 ppm, 35.78 ppm, 35.79 ppm, 35.80 ppm, 35.81 ppm, 35.82 ppm, 35.83 ppm, 35.84 ppm, 35.85 ppm, 35.86 ppm, 35.87 ppm, 35.88 ppm, 35.89 ppm, 35.90 ppm, 35.91 ppm, 35.92 ppm, 35.93 ppm, 35.94 ppm, 35.95 ppm, 35.96 ppm, 35.97 ppm, 35.98 ppm, 35.99 ppm, 36.00 ppm etc. are to be regarded as also disclosed. Accordingly, ethanol contents of 0.50% by vol., 0.49% by vol., 0.48% by vol., 0.47% by vol., 0.46% by vol., 0.45% by vol., 0.44% by vol., 0.43% by vol., 0.42% by vol., 0.41% by vol., 0.40% by vol., 0.39% by vol., 0.38% by vol., 0.37% by vol., 0.36% by vol., 0.35% by vol., 0.34% by vol., 0.33% by vol., 0.32% by vol., 0.31% by vol., 0.30% by vol., 0.29% by vol., 0.28% by vol., 0.27% by vol., 0.26% by vol., 0.25% by vol., 0.24% by vol., 0.23% by vol., 0.22% by vol., 0.21% by vol., 0.20% by vol., 0.19% by vol., 0.18% by vol., 0.17% by vol., 0.16% by vol., 0.15% by vol., 0.14% by vol., 0.13% by vol., 0.12% by vol., 0.11% by vol., 0.10% by vol. or less are to be understood by an ethanol content of at most 0.5% by vol.

Further advantages arise in that the beer has an ethanol content of at most 0.1% by vol., in particular of at most 0.045% by vol. This means that the beer-containing staple and/or luxury food item can have an ethanol content of 0.100% by vol., 0.099% by vol., 0.098% by vol., 0.097% by vol., 0.096% by vol., 0.095% by vol., 0.094% by vol., 0.093% by vol., 0.092% by vol., 0.091% by vol., 0.090% by vol., 0.089% by vol., 0.088% by vol., 0.087% by vol., 0.086% by vol., 0.085% by vol., 0.084% by vol., 0.083% by vol., 0.082% by vol., 0.081% by vol., 0.080% by vol., 0.079% by vol., 0.078% by vol., 0.077% by vol., 0.076% by vol., 0.075% by vol., 0.074% by vol., 0.073% by vol., 0.072% by vol., 0.071% by vol., 0.070% by vol., 0.069% by vol., 0.068% by vol., 0.067% by vol., 0.066% by vol., 0.065% by vol., 0.064% by vol., 0.063% by vol., 0.062% by vol., 0.061% by vol., 0.060% by vol., 0.059% by vol., 0.058% by vol., 0.057% by vol., 0.056% by vol., 0.055% by vol., 0.054% by vol., 0.053% by vol., 0.052% by vol., 0.051% by vol., 0.050% by vol., 0.049% by vol., 0.048% by vol., 0.047% by vol., 0.046% by vol., 0.045% by vol., 0.044% by vol., 0.043% by vol., 0.042% by vol., 0.041% by vol., 0.040% by vol., 0.039% by vol., 0.038% by vol., 0.037% by vol., 0.036% by vol., 0.035% by vol., 0.034% by vol., 0.033% by vol., 0.032% by vol., 0.031% by vol., 0.030% by vol., 0.029% by vol., 0.028% by vol., 0.027% by vol., 0.026% by vol., 0.025% by vol., 0.024% by vol., 0.023% by vol., 0.022% by vol., 0.021% by vol., 0.020% by vol., 0.019% by vol., 0.018% by vol., 0.017% by vol., 0.016% by vol., 0.015% by vol., 0.014% by vol., 0.013% by vol., 0.012% by vol., 0.011% by vol., 0.010% by vol., 0.009% by vol., 0.008% by vol., 0.007% by vol., 0.006% by vol., 0.005% by vol., 0.004% by vol., 0.003% by vol., 0.002% by vol., 0.001% by vol. or less or be completely ethanol-free. Beers with an ethanol content of 0.099% or less are also referred to as "0.0% beers". Thereby, such staple and/or luxury food items can also be produced or merchandized in countries, in which any consumption of ethanol is forbidden, wherein the staple and/or luxury food item nevertheless has a beer-typical flavor profile, for example similar or identical to a beer on draught, lager or full beer.

Further advantages arise in that the beer contains less than 5% by vol., in particular less than 1% by vol. and preferably 0% by vol. of flavoring substances and/or flavoring extracts, which do not originate from brewery-specific ingredients and products. In other words, the beer contains 5.0% by vol., 4.9% by vol., 4.8% by vol., 4.7% by vol., 4.6% by vol., 4.5% by vol., 4.4% by vol., 4.3% by vol., 4.2% by vol., 4.1% by vol., 4.0% by vol., 3.9% by vol., 3.8% by vol., 3.7% by vol., 3.6% by vol., 3.5% by vol., 3.4% by vol., 3.3% by vol., 3.2% by vol., 3.1% by vol., 3.0% by vol., 2.9% by vol., 2.8% by vol., 2.7% by vol., 2.6% by vol., 2.5% by vol., 2.4% by vol., 2.3% by vol., 2.2% by vol., 2.1% by vol., 2.0% by vol., 1.9% by vol., 1.8% by vol., 1.7% by vol., 1.6% by vol., 1.5% by vol., 1.4% by vol., 1.3% by vol., 1.2% by vol., 1.1% by vol., 1.0% by vol., 0.9% by vol., 0.8% by vol., 0.7% by vol., 0.6% by vol., 0.5% by vol., 0.4% by vol., 0.3% by vol., 0.2% by vol., 0.1% by vol. or less of added flavoring substances and/or flavoring extracts, which do not originate from brewery-specific ingredients and products, in particular not from beer and/or from fluids from dealcoholizing plants. Preferably, the beer-containing staple and/or luxury food item is free of (artificially) added flavoring substances and/or flavoring extracts, which do not originate from brewery-specific ingredients and products, in particular not from beer and/or from fluids from dealcoholizing plants for beer. Thereby, it is possible to produce alcohol-free beers, which contain at most 0.1% by vol. of alcohol or less, yet have a flavor profile typical for full beer and additionally comply with the requirements of the German beer regulation ("German purity law") or analogous regulations and do not have declarable ingredients besides water, cereal, hops and optionally yeast, respectively. For spontaneously fermented beer, an implicit yeast addition is assumed.

Further advantages arise if the beer has an ethanol content between 0.3% by vol. and 0.5% by vol. and a concentration of
ethyl acetate is at least 0.1 ppm; and/or
ethyl butyrate is at least 0.01 ppm; and/or
isobutanol is at least 0.01 ppm; and/or
isoamyl acetate is at least 0.01 ppm; and/or
2-methylbutane-1-ol is at least 0.1 ppm; and/or
3-methylbutane-1-ol is at least 0.5 ppm; and/or
ethyl hexanoate is at least 0.01 ppm; and/or
2-phenylethylacetate is at least 0.01 ppm; and/or
2-phenylethanol is at least 0.1 ppm Within the scope of the present disclosure, for example, concentrations of 0.10 ppm, 0.11 ppm, 0.12 ppm, 0.13 ppm, 0.14 ppm, 0.15 ppm, 0.16 ppm, 0.17 ppm, 0.18 ppm, 0.19 ppm, 0.20 ppm, 0.21 ppm, 0.22 ppm, 0.23 ppm, 0.24 ppm, 0.25 ppm, 0.26 ppm, 0.27 ppm, 0.28 ppm, 0.29 ppm, 0.30 ppm, 0.31 ppm, 0.32 ppm, 0.33 ppm, 0.34 ppm, 0.35 ppm, 0.36 ppm, 0.37 ppm, 0.38 ppm, 0.39 ppm, 0.40 ppm, 0.41 ppm, 0.42 ppm, 0.43 ppm, 0.44 ppm, 0.45 ppm, 0.46 ppm, 0.47 ppm, 0.48 ppm, 0.49 ppm, 0.50 ppm, 0.51 ppm, 0.52 ppm, 0.53 ppm, 0.54 ppm, 0.55 ppm, 0.56 ppm, 0.57 ppm, 0.58 ppm, 0.59 ppm, 0.60 ppm, 0.61 ppm, 0.62 ppm, 0.63 ppm, 0.64 ppm, 0.65 ppm, 0.66 ppm, 0.67 ppm, 0.68 ppm, 0.69 ppm, 0.70 ppm, 0.71 ppm, 0.72 ppm, 0.73 ppm, 0.74 ppm, 0.75 ppm, 0.76 ppm, 0.77 ppm, 0.78 ppm, 0.79 ppm, 0.80 ppm, 0.81 ppm, 0.82 ppm, 0.83 ppm, 0.84 ppm, 0.85 ppm, 0.86 ppm, 0.87 ppm, 0.88 ppm, 0.89 ppm, 0.90 ppm, 0.91 ppm, 0.92 ppm, 0.93 ppm, 0.94 ppm, 0.95 ppm, 0.96 ppm, 0.97 ppm, 0.98 ppm, 0.99 ppm, 1 ppm, 2 ppm, 3 ppm, 4 ppm, 5 ppm, 6 ppm, 7 ppm, 8 ppm, 9 ppm, 10 ppm, 11 ppm, 12 ppm, 13 ppm, 14 ppm, 15 ppm, 16 ppm, 17 ppm, 18 ppm, 19 ppm, 20 ppm, 21 ppm, 22 ppm, 23 ppm, 24 ppm, 25 ppm, 26 ppm, 27 ppm, 28 ppm, 29 ppm, 30 ppm, 31 ppm, 32 ppm, 33 ppm, 34 ppm, 35 ppm, 36 ppm, 37 ppm, 38 ppm, 39 ppm, 40 ppm, 41 ppm, 42 ppm, 43 ppm, 44 ppm, 45 ppm, 46 ppm, 47 ppm, 48 ppm, 49 ppm, 50 ppm, 51 ppm, 52 ppm, 53 ppm, 54 ppm, 55 ppm, 56 ppm, 57 ppm, 58 ppm, 59 ppm, 60 ppm, 61 ppm, 62 ppm, 63 ppm, 64 ppm, 65 ppm, 66 ppm, 67 ppm, 68 ppm, 69 ppm, 70 ppm, 71 ppm, 72 ppm, 73 ppm, 74 ppm, 75 ppm, 76 ppm, 77 ppm, 78 ppm, 79 ppm, 80 ppm, 81 ppm, 82 ppm, 83 ppm, 84 ppm, 85 ppm, 86 ppm, 87 ppm, 88 ppm, 89 ppm, 90 ppm, 91 ppm, 92 ppm, 93 ppm, 94 ppm, 95 ppm, 96 ppm, 97 ppm, 98 ppm, 99 ppm, 100 ppm, 101 ppm, 102 ppm, 103 ppm, 104 ppm, 105 ppm, 106 ppm, 107 ppm, 108 ppm, 109 ppm, 110 ppm, 111 ppm, 112 ppm, 113 ppm, 114 ppm, 115 ppm, 116 ppm, 117 ppm, 118 ppm, 119 ppm, 120 ppm or more as well as corresponding intermediate values are to be understood by concentrations of at least 0.1 ppm. Accordingly, values of 0.010 ppm, 0.011 ppm, 0.012 ppm, 0.013 ppm, 0.014 ppm, 0.015 ppm, 0.016 ppm, 0.017 ppm, 0.018 ppm, 0.019 ppm, 0.020 ppm, 0.021 ppm, 0.022 ppm, 0.023 ppm, 0.024 ppm, 0.025 ppm, 0.026 ppm, 0.027 ppm, 0.028 ppm, 0.029 ppm, 0.030 ppm, 0.031 ppm, 0.032 ppm, 0.033 ppm, 0.034 ppm, 0.035 ppm, 0.036 ppm, 0.037 ppm, 0.038 ppm, 0.039 ppm, 0.040 ppm, 0.041 ppm, 0.042 ppm, 0.043 ppm, 0.044 ppm, 0.045 ppm, 0.046 ppm, 0.047 ppm, 0.048 ppm, 0.049 ppm, 0.050 ppm, 0.051 ppm, 0.052 ppm, 0.053 ppm, 0.054 ppm, 0.055 ppm, 0.056 ppm, 0.057 ppm, 0.058 ppm, 0.059 ppm, 0.060 ppm, 0.061 ppm, 0.062 ppm, 0.063 ppm, 0.064 ppm, 0.065 ppm, 0.066 ppm, 0.067 ppm, 0.068 ppm, 0.069 ppm, 0.070 ppm, 0.071 ppm, 0.072 ppm, 0.073 ppm, 0.074 ppm, 0.075 ppm, 0.076 ppm, 0.077 ppm, 0.078 ppm, 0.079 ppm, 0.080 ppm, 0.081 ppm, 0.082 ppm, 0.083 ppm, 0.084 ppm, 0.085 ppm, 0.086 ppm, 0.087 ppm, 0.088 ppm, 0.089 ppm, 0.090 ppm, 0.091 ppm, 0.092 ppm, 0.093 ppm, 0.094 ppm, 0.095 ppm, 0.096 ppm, 0.097 ppm, 0.098 ppm, 0.099 ppm, 0.01 ppm etc. (see above) to 120 ppm or more are to be understood by a mass concentration of 0.01 ppm. Preferably, the alcohol-free beer is mixed with as much flavoring substance concentrate according to the invention as the final concentrations of the individual flavoring substances in the mixed beer are in the following ranges:
ethyl acetate 1 ppm to 50 ppm; and/or
ethyl butyrate 0.01 ppm to 0.2 ppm; and/or
isobutanol 2.0 ppm to 50 ppm; and/or
isoamyl acetate 0.2 ppm to 5 ppm; and/or
2-methylbutane-1-ol 3 ppm to 25 ppm; and/or
3-methylbutane-1-ol 10 ppm to 100 ppm; and/or
ethyl hexanoate 0.1 ppm to 0.35 ppm; and/or
2-phenylethylacetate 0.1 ppm to 1.5 ppm; and/or
2-phenylethanol at least 5 ppm to 45 ppm,
to ensure a full beer-like flavor profile in particular in the manner of a wheat beer, export, light beer or lager beer.

In a further advantageous configuration of the invention, it is provided that the beer has an ethanol content below 0.3% by vol., in particular of at most 0.045% by vol., and that a concentration of
ethyl acetate is at least 0.1 ppm; and/or
ethyl butyrate is at least 0.01 ppm; and/or
isobutanol is at least 0.01 ppm; and/or
isoamyl acetate is at least 0.01 ppm; and/or
2-methylbutane-1-ol is at least 0.01 ppm; and/or
3-methylbutane-1-ol is at least 0.08 ppm; and/or ethyl hexanoate is at least 0.01 ppm; and/or
2-phenylethylacetate is at least 0.01 ppm; and/or
2-phenylethanol is at least 0.1 ppm As already mentioned, in "0.0% beer" and very low-alcohol beers <0.3%, respectively, it is usually required to return larger amounts of beer-typical flavoring substances since "0.0% beers" have still considerably lower contents in particular of polar, fermentative flavoring substances not only with respect to full beers, but also with respect to "alcohol-free" beers (0.3-0.5% by vol. of ethanol). Accordingly, the "0.0% beer" has to be reflavored with larger volumes of flavoring substance concentrate and/or with higher concentrated flavoring substance concentrate (e.g. second flavoring substance concentrate highly accumulated by means of a high accumulation device) or specific mixtures of first and second flavoring substance concentrate. Preferably, the "0.0% beer" is mixed with as much flavoring substance concentrate according to the invention as the final concentration of the individual flavoring substances in the mixed beer are in the following ranges:
ethyl acetate 1 ppm to 50 ppm; and/or
ethyl butyrate 0.01 ppm to 0.2 ppm; and/or
isobutanol 2.0 ppm to 50 ppm; and/or
isoamyl acetate 0.2 ppm to 5 ppm; and/or
2-methylbutane-1-ol 3 ppm to 25 ppm; and/or
3-methylbutane-1-ol 10 ppm to 100 ppm; and/or
ethyl hexanoate 0.1 ppm to 0.35 ppm; and/or
2-phenylethylacetate 0.1 ppm to 1.5 ppm; and/or
2-phenylethanol at least 5 ppm to 45 ppm,
to ensure a full beer-like flavor profile in particular in the manner of a wheat beer, export, light beer, lager beer.

A further aspect of the invention relates to a sorption agent for use in a method according to the twelfth inventive aspect and/or for a device according to the thirteenth inventive aspect, wherein the sorption agent includes a polymer with substituted and/or unsubstituted phenylethene and divinylbenzene monomers. In other words, it is provided according to the invention that the sorption agent includes a monomer of the formula

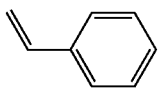

as well as one or more monomers of the formula

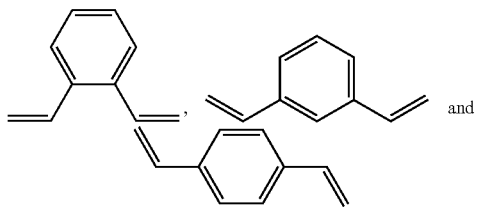

or is composed of these monomers, wherein the individual monomers can each be substituted or unsubstituted. With the aid of the sorption agent according to the invention, corresponding flavoring substance concentrates accumulated in flavoring substances and permeates depleted in flavoring substances with respectively authentic olfactory impression can be obtained from flavoring substance-containing fluids. In contrast to sorption agents known from the prior art, the sorption agent according to the invention also allows binding polar substances, whereby both polar and non-polar substances are uniformly accumulated and depleted, respectively. Moreover, polar flavoring and tasting substances can also be completely or at least predominantly desorbed. Therefore, it is managed with the aid of the sorption agent according to the invention to also remove dyes and tasting substances, in particular those, which taste bitter, from the fluid, to accumulate them on the sorption agent and finally to provide them as a concentrate after the desorption. By the choice of the portion of phenylethene and divinylbenzene monomers of the total weight of the sorption agent as well as by the choice of the ratio of phenylethene to divinylbenzene monomers, the composition of the concentrate and the accumulation factors of the individual flavoring substances can be influenced, respectively, such that an authentic flavoring concentrate can be produced in any case. For example, the mass portion of the phenylethene monomers of the total weight of the sorption agent can be 1%, 2%, 3%, 4%, 5%, 6%, 7%, 8%, 9%, 10%, 11%, 12%, 13%, 14%, 15%, 16%,17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99%, while the mass portion of the divinylbenzene monomers can correspondingly be 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2% or 1%. Preferably, the sorption agent is a polystyrene divinylbenzene copolymer, wherein statistic, alternating, block-shaped and grafted copolymers can basically be provided. Furthermore, it can be provided that the copolymers are modified and include substituted monomers, respectively, to for example provide alkaline or acidic characteristics. Other monomers or other compounds capable of being incorporated in the polymer are also provided, which impart the desired sorption characteristics, in particular with respect to polar flavoring substances, to the polymer optionally in addition to acidic and/or alkaline groups corresponding to the desired application.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above and below, which extend beyond the feature combinations set out in the relations of the claims or deviate from these feature combinations. There shows:

BRIEF DESCRIPTION OF THE DRAWINGS

FIG. 1 shows a schematic diagram of an adsorption system 10 according to the invention according to a first embodiment. The shown adsorption system 10 allows process management for isolating flavoring substances as a flavoring substance concentrate from a flavoring substance-containing fluid, wherein a particularly high accumulation of the flavoring substances in the flavoring substance concentrate or extract on the one hand and the maintenance of an authentic flavor profile on the other hand are ensured. For this purpose, the adsorption system 10 includes three working chambers 12 in the shown embodiment, which are fluidically coupled to each other via a conduit system 13, which constitutes a first fluid path, and respectively filled with a sorption agent as a stationary phase. Basically, the working chambers 12 can also be referred to as column or extraction cell and each have a circularly cylindrical shape with identical geometric dimensions in the shown embodiment. Thereby, all of the working chambers 12 have constant cross-sectional thicknesses along their respective longitudinal axes L. Furthermore, only one or two or four or more working chambers 12 can also be provided instead of three working chambers 12. In the present embodiment, all of the working chambers 12 are filled with the same, monovarietal styrene divinylbenzene copolymer as the sorption agent. Within the scope of the present disclosure, "monovarietal" does not mean that as the sorption agent, generally, for example chemical compounds from the group of polyaromatic compounds, polystyrenes, poly(meth)acrylates, polypropylenes, polyesters, polytetrafluoroethylene and cross-linked polystyrenes, in particular copolymers of ethylvinylbenzene and divinylbenzene, of vinylpyrrolidone and divinylbenzene, of vinylpyridine and divinylbenzene and/or of styrene and divinylbenzene can be used. Similarly, ion exchange materials can be provided. An advantageous sorption characteristic is also achieved by the use of sorption agents, which include monomers with functional groups. Thus, sulfonic acid groups, ternary (e.g. methacryl diethylamine) and quaternary ammonium groups (e.g. phenyltrimethylammonium), amides (e.g. benzamides), amines and halogen-modified aromatic compounds, heterocyclic compounds like 3-pyrrolidone, 2-pyrrolidone, 2-pyrroline, 3-pyrroline, pyrrole and/or piperazine as well as halogenated aliphatic side chains have proven themselves. Gelatinous polymers can also be employed. Basically, modified polyacrylates can also be used, in particular those, which include the following monomers: acrylic acid, acrylonitrile and alkyl acrylates such as for example methyl methacrylate, methylacrylate, ethylacrylate, 2-chloroethylvinylether, 2-ethylhexylacrylate, hydroxyethyl methacrylate, butyl acrylate and butyl methacrylate. Alternatively or additionally, there are CMS sorbents (CMS: carbon molecular sieve), which are formed from the pyrolysis of polymeric precursors and have a highly porous carbon structure themselves. SGPC sorbents (SGPC: spherical graphitized polymer carbon) and GCB sorbents are also employable (GCB: graphitized carbon black). Alternatives are polymers based on 2,6-diphenylene oxide, e.g. poly(2,6-diphenyl-p-phenylene oxide), or those with iminodiacetate functionality.

Figure 1:
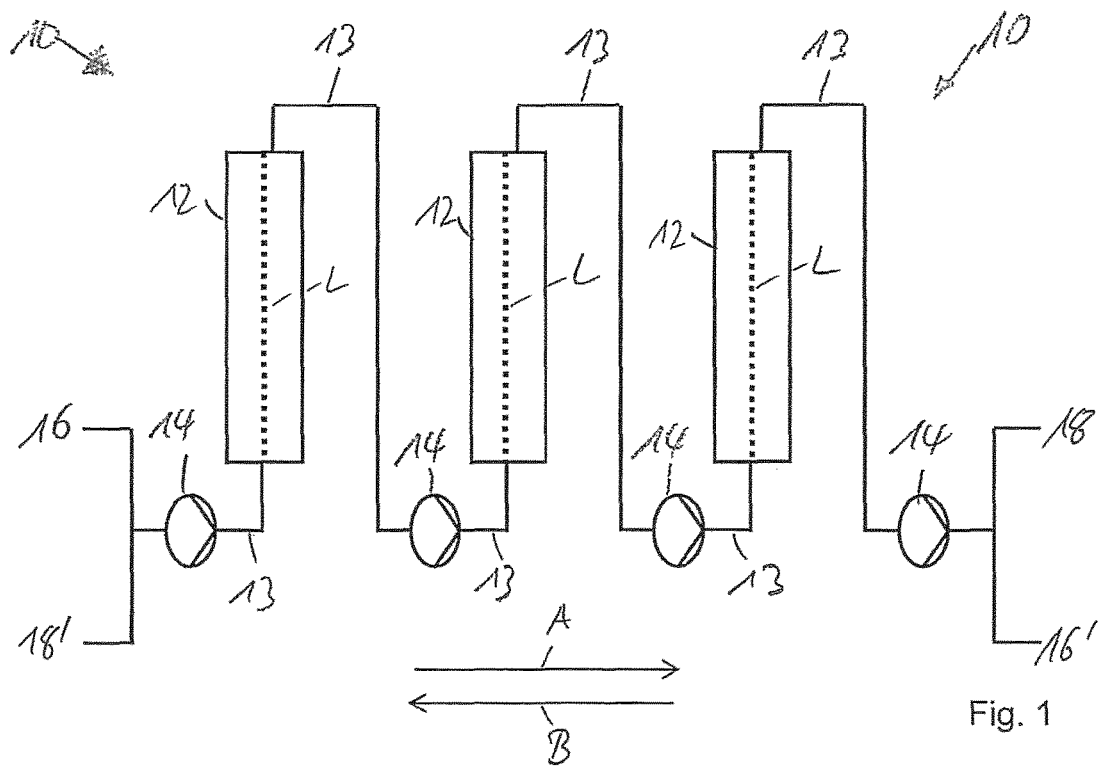
FIG. 1 a schematic diagram of an adsorption system according to the invention according to an embodiment.

With the aid of these sorption agents individually or in any combination, a particularly high adsorption of the flavoring substance or substances and thereby a particularly high recovery rate are ensured. In addition, the sorption agent can hereby be optimally selected depending on the respective fluid and the flavoring substances contained therein, respectively. Preferably, these polymers are additionally functionalized by means of suitable reagents during the polymerization of the basic polymer or by post-treatment of the basic polymer with corresponding reagents to achieve the desired sorption characteristic.

However, it can also be provided that at least one of the working chambers 12 is filled with a mixture of two or more sorption agents and/or that different working chambers 12 are filled with different sorption agents or sorption agent mixtures to achieve a specific adsorption behavior optimally adapted to the fluid respectively to be processed. The three working chambers 12 together provide a particularly long and at the same time comparatively thin sorbent bed since a ratio of average cross-sectional thickness to combined total length of the working chambers 12 is less than 0.3. For example, the average cross-sectional thickness is between 3 mm and 80 cm, while the total length is between 2.6 m and 80 m.

Furthermore, the adsorption system 10 includes four pumping devices 14 in total, which are arranged before, between and after the working chambers 12.

For loading the sorption agents arranged in the working chambers 12, the adsorption system 10 is operated in an absorption mode. Hereto, the flavoring substance-containing fluid is introduced into the conduit system 13 through the inlet 16 as a mobile phase and serially conducted through the working chambers 12 with the aid of the pumping devices 14 according to arrow A. For example, the fluid can be an aqueous flavor. For example, the fluid is a food item from the group of beer-containing staple and/or luxury food items, beer wort, hops, hop extract, malt water, malt beer, malt wort and brewery-specific ingredients and products and/or is obtained from an ethanol-containing food item from the group of beer-containing staple and/or luxury food items by means of a dealcoholizing device. Therein, the flavoring substances present in the fluid adsorb on the sorption agent. The deflavored fluid or permeate is then removed from the conduit system 13 at the outlet 18.

As required, it can be provided that an ethanol content of the fluid is adjusted to a value of at least 0.5% by vol. and/or to a value of at most 50% by vol. before conducting through the adsorption system 10. This allows a particularly high recovery rate, wherein it is additionally ensured that a particularly "authentic" flavoring substance concentrate is obtained, that is a flavoring substance concentrate, in which both polar and non-polar flavoring substances are at least substantially uniformly accumulated. Therein, the ethanol content can basically be adjusted to the requested value by addition of ethanol or an ethanol-rich solvent mixture and/or by addition of an ethanol-free solvent, for example water, or by addition of a low-ethanol solvent mixture. For example, the ethanol content can be adjusted to a value of 0.5% by vol., 1.0% by vol., 1.5% by vol., 2.0% by vol., 2.5% by vol., 3.0% by vol., 3.5% by vol., 4.0% by vol., 4.5% by vol., 5.0% by vol., 5.5% by vol., 6.0% by vol., 6.5% by vol., 7.0% by vol., 7.5% by vol., 8.0% by vol., 8.5% by vol., 9.0% by vol., 9.5% by vol., 10.0% by vol., 10.5% by vol., 11.0% by vol., 11.5% by vol., 12.0% by vol., 12.5% by vol. 13.0% by vol., 13.5% by vol., 14.0% by vol., 14.5% by vol. 15.0% by vol. 15.5% by vol. 16.0% by vol. 16.5% by vol. 17.0% by vol. 17.5% by vol. 18.0% by vol. 18.5% by vol. 19.0% by vol. 19.5% by vol. 20.0% by vol. 20.5% by vol., 21.0% by vol., 21.5% by vol., 22.0% by vol., 22.5% by vol., 23.0% by vol., 23.5% by vol., 24.0% by vol., 24.5% by vol., 25.0% by vol., 25.5% by vol., 26.0% by vol., 26.5% by vol., 27.0% by vol., 27.5% by vol., 28.0% by vol., 28.5% by vol., 29.0% by vol., 29.5% by vol., 30.0% by vol., 30.5% by vol., 31.0% by vol., 31.5% by vol., 32.0% by vol., 32.5% by vol., 33.0% by vol., 33.5% by vol., 34.0% by vol., 34.5% by vol., 35.0% by vol., 35.5% by vol., 36.0% by vol., 36.5% by vol., 37.0% by vol., 37.5% by vol., 38.0% by vol., 38.5% by vol., 39.0% by vol., 39.5% by vol., 40.0% by vol., 40.5% by vol., 41.0% by vol., 41.5% by vol., 42.0% by vol., 42.5% by vol., 43.0% by vol., 43.5% by vol., 44.0% by vol., 44.5% by vol., 45.0% by vol., 45.5% by vol., 46.0% by vol., 46.5% by vol., 47.0% by vol., 47.5% by vol., 48.0% by vol., 48.5% by vol., 49.0% by vol., 49.5% by vol. or 50.0% by vol., wherein corresponding intermediate values are to be regarded as also disclosed. Preferably, the ethanol content is adjusted to a value between about 1.5% by vol. and about 10% by vol. of ethanol. Alternatively, the fluid can also be free of ethanol. Similarly, it can basically be provided that the ethanol content of the fluid is not adjusted, but that the fluid is used in the respectively present form or with a respectively given ethanol content including a content of 0%.

For unloading, the adsorption system 10 is subsequently switched to a desorption mode. Hereto, a desorption agent, for example water, ethanol or an ethanol/water mixture, is introduced into the conduit system 13 via an inlet 16' and serially conducted through the working chambers 12 in opposite delivery direction according to arrow B with the aid of the reversible pumping devices 14. Upon conducting the desorption agent, the flavoring substances bound to the sorption agent again desorb such that a flavoring substance concentrate is obtained and removed from the conduit system 13 at the outlet 18'.

By the fluidic connection of the individual working chambers 12 and the upstream, intermediate and downstream reversible pumping devices 14, it is achieved that considerably higher flow speeds are possible in loading and unloading than it would be possible using a single working chamber 12 with the same volume. In addition, a low amount of desorption agent corresponding to the relatively small diameter or cross-sectional area of the working chambers 12 can be employed in the desorption, whereby a higher concentration of the flavoring substances with lower desorption agent demand is achieved. In addition, it is advantageous to use a particularly long sorbent bed to adsorb both polar and non-polar flavoring substances as quantitatively as possible to obtain correspondingly authentic flavoring substance concentrates and permeates as free of flavor as possible.

Within the scope of the present invention, it is basically preferred if at least the ratios of the mass portions of the up to five most flavor imprinting flavoring substances different from the desorption agent in the flavoring substance concentrate differ by at most ±50% from the corresponding ratios of their mass portions in the fluid and/or that each flavoring substance different from the desorption agent is present accumulated respectively by a mass-related factor of at most 1.49 related to the fluid in individual comparison to each other flavoring substance different from the desorption agent in the flavoring substance concentrate. This allows the provision of a particularly "authentic" flavoring substance concentrate, that is a flavoring substance concentrate, in which all or at least the five flavoring substances imprinting the total flavor present in the original fluid are at least substantially uniformly accumulated in the flavoring substance concentrate—independently of their physical characteristics such as for example polarity or boiling point—such that the sensory characteristics of the flavoring substance concentrate correspond to those of the fluid, in particular if the flavoring substance concentrate is rediluted such that the concentration(s) of the flavoring substance or substances at least substantially again correspond(s) to their original concentrations in the fluid. At least the 2, 3, 4 or 5 flavoring substances, which significantly contribute to the total flavor of the fluid of all of the flavoring substances present in the fluid or in the flavoring substance concentrate, are accumulated in the flavoring substance concentrate as uniformly as possible such that their mass-related concentrations in the fluid and in the flavoring substance concentrate differ according to amount by maximally 1%, 2%, 3%, 4%, 5%, 6%, 7%, 8%, 9%, 10%, 11%, 12%, 13%,14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% in pair-wise comparison. Which of the flavoring substances in the fluid belong to the up to five most flavor imprinting ones, can be determined with the aid of approaches common to the expert within the scope of experiments customary according to the state of the art. Reference is only exemplarily made to the inherently known determination of flavor values or to omission experiments with recombinations. Basically, it can also be provided that one or more flavoring substances of a first group are accumulated independently of each other respectively by the factor of 1.49 or less compared to one or more tasting and/or aromatic substances of a second group related to the originally provided fluid in the flavoring substance concentrate. In particular, factors of 1.49, 1.48, 1.47, 1.46, 1.45, 1.44, 1.43, 1.42, 1.41, 1.40, 1.39, 1.38, 1.37, 1.36, 1.35, 1.34, 1.33, 1.32, 1.31, 1.30, 1.29, 1.28, 1.27, 1.26, 1.25, 1.24, 1.23, 1.22, 1.21, 1.20, 1.19, 1.18, 1.17, 1.16, 1.15, 1.14, 1.13, 1.12, 1.11, 1.10, 1.09, 1.08, 1.07, 1.06, 1.05, 1.04, 1.03, 1.02, 1.01, 1.00, 0.99, 0.98, 0.97, 0.96, 0.95, 0.94, 0.93, 0.92, 0.91, 0.90, 0.89, 0.88, 0.87, 0.86, 0.85, 0.84, 0.83, 0.82, 0.81, 0.80, 0.79, 0.78, 0.77, 0.76, 0.75, 0.74, 0.73, 0.72, 0.71, 0.70, 0.69, 0.68, 0.67, 0.66, 0.65, 0.64, 0.63, 0.62, 0.61, 0.60, 0.59, 0.58, 0.57, 0.56, 0.55, 0.54, 0.53, 0.52, 0.51 or 0.50 are to be understood by a factor of 1.49 or less. The flavoring substances of the first group can for example be selected from the group of ethyl butyrate, ethylmethyl butyrate-2, methyl capronate, linalool, alpha-ionone, beta-ionone, delta-decalactone, 2E-hexenol, 2E-hexenal, hexanal, beta-damascenone, octanal, nootkatone, p-menthenthiol-1, 8, benzaldehyde, gamma-decalactone, linalool oxide, furfurylthiol-2, 4-vinylguaiacol, isomeric isopropylmethoxypyrazines, isomeric ethyldimethylpyrazines, indole, methyljasmonate, jasminlactone, dipropyldisulfide, dipropyltrisulfide, methylpropyldisulfide, L-menthol, menthone, L-carvone, isoamyl acetate (3-methylbutyl acetate), 2-acetyl-1-pyrroline, 2E, 4Z-decadienal, 3, 5-dimethyltrithiolan, citral, caryophyllene, 1-octene-3-ol, 1-octene-3-on, hydroxybenzyl acetone, cis-3-hexenol, 3Z-hexenol, methylbutyrate, geraniol, ethyl-2E, 4Z-decadienoate, 8-mercapto-p-menth-1-en-3-on, 2E, 4Z, 7Z-tridecatrienal, 2E, 5Z-undecadienal, nonanal, 4-octanolide, 5-octanolide, 1-phenylethanol, 2-phenylethanol, wine lactone and menthofurolactones. The flavoring substances of the second group can for example be selected from C1-C5 alcohols, preferably methanol, ethanol, propanol, isopropanol, butanol, 2-methylbutane-1-ol, 3-methylbutane-1-ol, diacetyl, acetaldehyde, furfural, furfuryl alcohol, phenol, acetoin, dimethylsulfide, methyl mercaptan, lactic acid and acetic acid. In other words, it can in particular be provided that no or a relative accumulation as low as possible (e.g. ≤±50%) of rather hydrophobic flavoring substances (first group) with respect to rather hydrophilic flavoring substances (second group) related to the fluid is effected in the flavoring substance concentrate such that an authentic flavoring substance concentrate with an accumulation as uniform as possible of all of the flavoring substances originally present in the fluid is produced independently of their polarity. Correspondingly, a permeate depleted in flavoring substances improved compared to the prior art can basically also be generated since the flavoring substances contained in the fluid are correspondingly more uniformly depleted in the permeate such that the permeate has an attenuated, but further authentic taste and flavor profile or is largely or completely odorless at least for the human.

Alternatively or additionally, it is provided that the ratios of the mass portions of at least two and preferably of at least three different flavoring substances in the flavoring substance concentrate differ by at most ±50% from the corresponding ratios of their mass portions in the fluid, wherein at least one of the flavoring substances is hydrophobic (selected from the first group) and at least one further flavoring substance is hydrophilic (selected from the second group). Hereby too, the provision of a particularly "authentic" flavoring substance concentrate is allowed, in which polar and non-polar flavoring substances are present accumulated as uniformly as possible.

The concentration or accumulation factor of each flavoring substance in the flavoring substance concentrate with respect to the original fluid can basically be at least 1.01, in particular at least 10, preferably at least 100, preferably at least 1000 and in particular at least 15000. For example, the concentration factor of each flavoring substance can be 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2, 5, 10, 50, 100, 500, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, 20000, 20000, 25000, 30000, 35000, 40000, 45000, 50000, 55000, 60000, 65000, 70000, 75000, 80000, 85000, 90000, 95000, 100000 or more, wherein corresponding intermediate values are to be regarded as also disclosed. In other words, the flavoring substance concentrate has to be rediluted by a corresponding factor in order that the flavoring substances are again present in their initial concentration as in the fluid. The higher the concentration factor, the lower the required storage and transport area and the simpler the further processing of the flavoring substance concentrate. Similarly, high concentration factors facilitate the production of powdery and encapsulated flavors, respectively. Furthermore, the portion of solvent(s), in particular of ethanol, decreases with the concentration such that for example ethanol-free flavoring substance concentrates can also be produced, which comply with the halal regulations.

Basically, it can also be provided that the desorption agent is the same chemical compound as a flavoring substance contained in the fluid. In this case, the concerned flavoring substance is preferably not taken into account in the determination of its accumulation degree in the flavoring substance concentrate since reasonable statements about its accumulation and depletion in the concentrate or permeate are a priori not possible. For example, the original fluid can contain ethanol as the flavoring substance such that the chemical compound is preferably not incorporated in the assessment of the above mentioned mass portion ratios in case of the use of ethanol as the desorption agent. Alternatively, the relative accumulation of one or more flavoring substances with respect to ethanol can be used for determining the concentration factor between original fluid and flavoring substance concentrate in this case.

Figure 2:
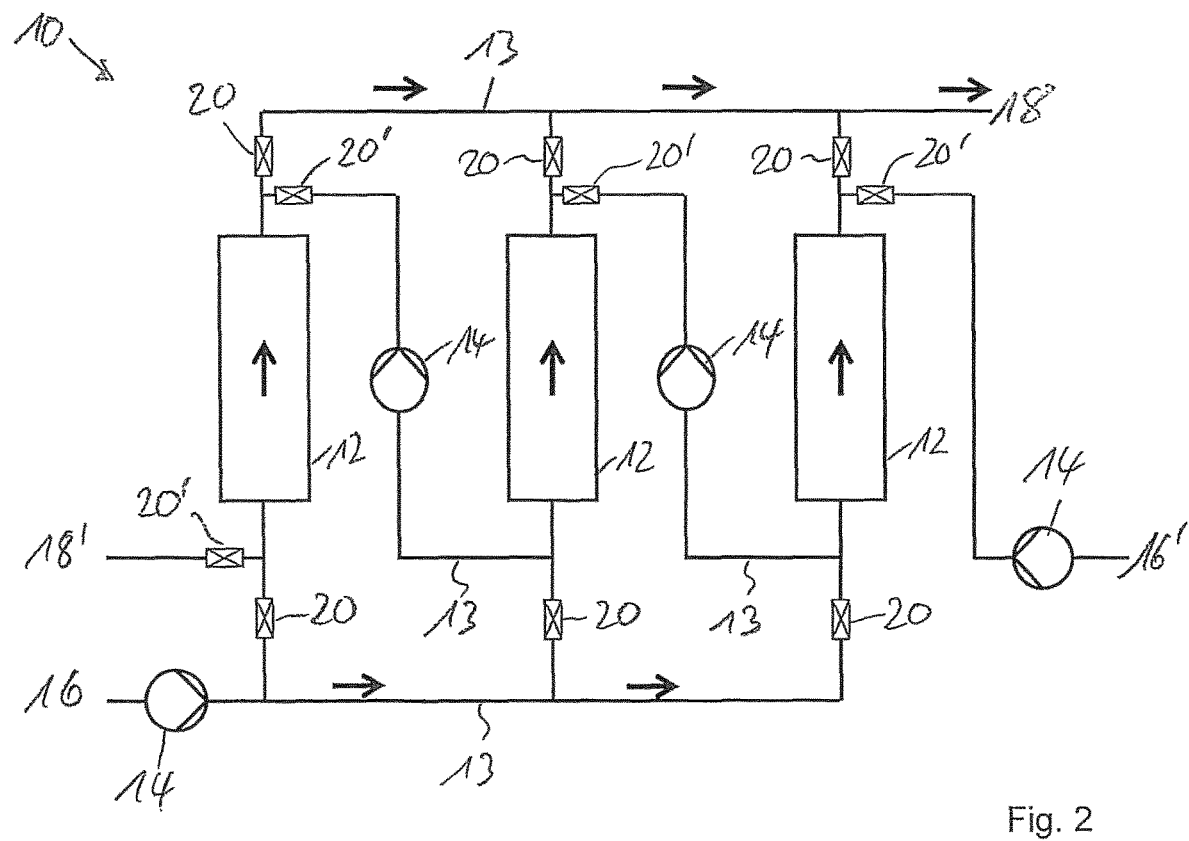
FIG. 2 a schematic diagram of the adsorption system according to the invention according to a further embodiment, wherein it is operated in an adsorption mode.

FIG. 2 shows a schematic diagram of the adsorption system 10 according to the invention according to a further embodiment. The adsorption system 10 is optimized to particularly fast loading speed with maximization of the extract concentration in the flavoring substance concentrate at the same time. For this purpose, the adsorption system 10 includes multiple controllable and/or adjustable valve devices 20, 20' as well as a conduit system 13 differently formed compared to the preceding embodiment besides three working chambers 12 and four pumping devices 14. It is to be emphasized that a varying number of working chambers 12, pumping devices 14 and valve devices 20 can of course also be provided in this case.

The adsorption system 10 is operated in the adsorption mode in FIG. 2, wherein the flow direction used for loading is symbolized by arrows. For loading the sorption agents arranged in the working chambers 12, the flavoring substance-containing fluid as the mobile phase is again introduced into the conduit system 13 through the inlet 16, but conducted parallel through all of the working chambers 12 with the aid of the pumping devices 14 at the same time. For this purpose, the valve devices 20 are opened, while the valve devices denoted by 20' are closed. The control and/or regulation of the pumping devices 14 and/or the valve devices 20, 20' as well as the switching between adsorption mode and desorption mode can basically be effected with the aid of a control device (not shown). Thereby, the flavoring substances contained in the fluid adsorb on the sorption agents at the same time, with which the three working chambers 12 are filled. The deflavored fluid or permeate is then removed from the conduit system 13 at the outlet 18.

Figure 3:
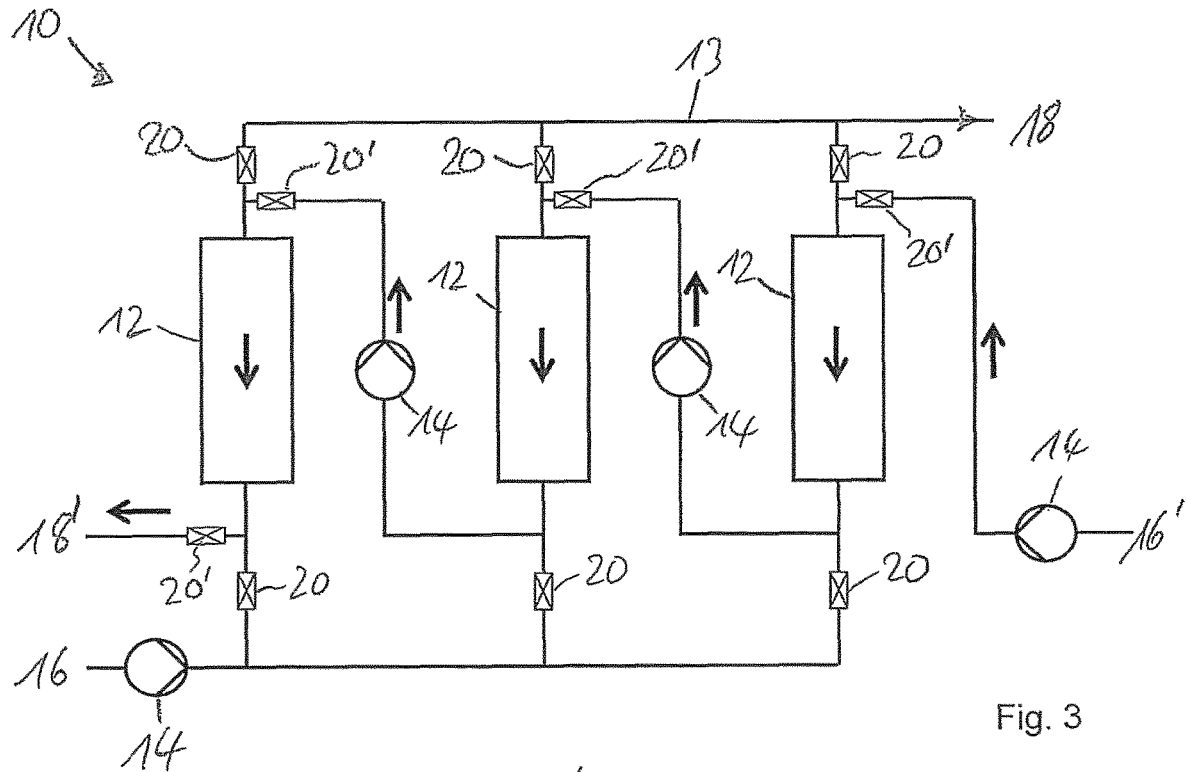
FIG. 3 a schematic diagram of the adsorption system according to the invention shown in FIG. 2, wherein it is operated in a desorption mode.

The desorption of the flavoring substances is explained based on FIG. 3, which shows a schematic diagram of the adsorption system 10 operated in the desorption mode. In the desorption mode, the valve devices denoted by 20' are now opened, while the valve devices denoted by 20 are closed. Now, a desorption agent is pumped into the conduit system 13 according to the arrows through the inlet 16' and serially conducted through the working chambers 12 in opposite delivery direction with the aid of the reversible pumping devices 14. Upon conducting the desorption agent, the flavoring substances bound on the sorption agent again desorb such that a flavoring substance concentrate is obtained and removed from the conduit system 13 at the outlet 18'. In other words, the loading of the sorption agents is parallel effected in contrast to the first embodiment, while the unloading and desorbing, respectively, are again serially performed. This allows the particularly fast loading speed with maximization of the extract concentration in the flavoring substance concentrate at the same time.

Figure 4:
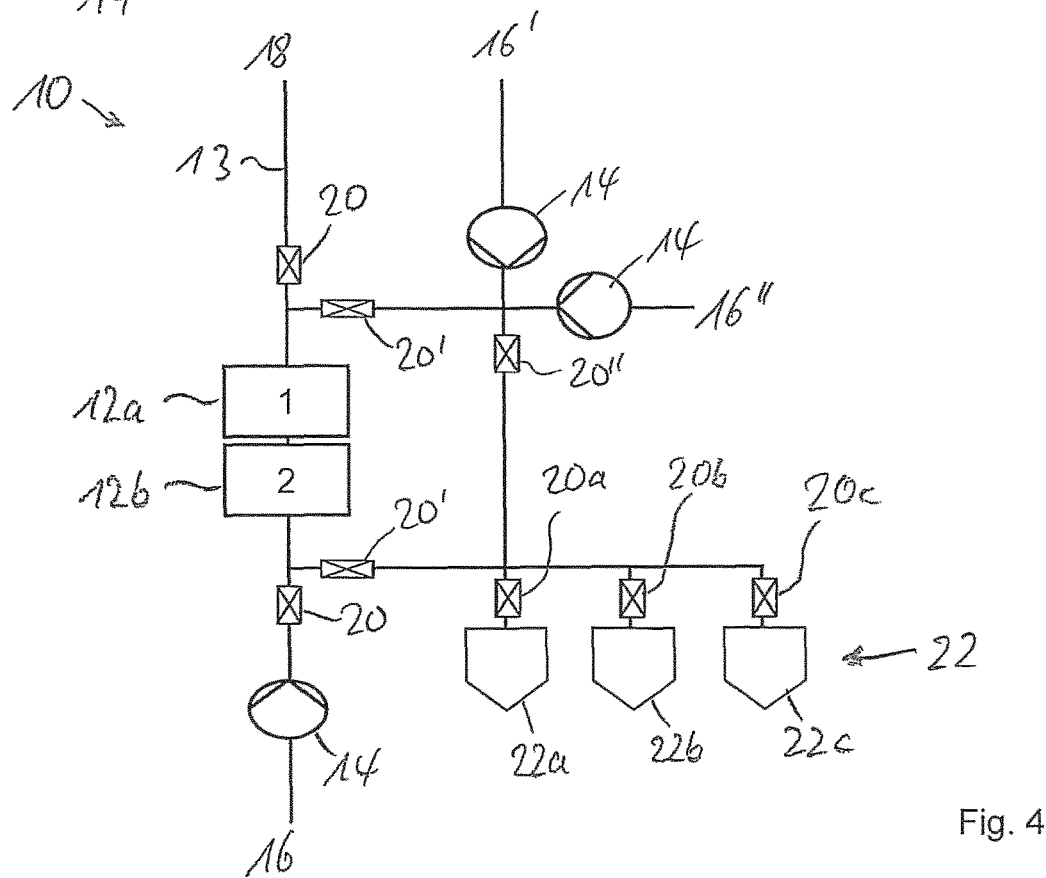
FIG. 4 a schematic diagram of the adsorption system according to the invention according to a further embodiment.

FIG. 4 shows a schematic diagram of the adsorption system 10 according to the invention according to a further embodiment. The adsorption system 10 includes a first working chamber 12a and a second working chamber 12b, which are fluidically connected to each other and arranged indirectly or immediately one after the other. Therein, it can basically be provided that the working chambers 12a, 12b are arranged in separated housings or in a common housing. In case of an arrangement in a common housing, it can further be provided that the working chambers 12a, 12b are separated from each other by a separating tray permeable to liquids or the like to prevent mixing of the sorption agents arranged in the working chambers 12a, 12b. In the present example, the working chamber 12b is filled with a so-called normal phase and/or a polar bound phase as the sorption agent. Normal phases are for example modified or unmodified silica gels or aluminum oxides, on which adsorption procedures on polar OH groups are predominantly utilized for separation. Polar bound phases normally are also based on silica gels, to which chains with certain functional groups are bound. Thereby, these sorption agents are polar to different degrees. The separation is effected by respectively different mechanisms and usually via a combination of multiple effects (molecule size exclusion, adsorption, distribution, ion exchange).

In contrast, the working chamber 12a is filled with a so-called reversed phase as the sorption agent. In reversed phases, the polarity conditions are "reversed" compared to the normal phases. Hereto, non-polar side chains are usually bound to a silica gel framework or to a polymer. Thereby, they behave hydrophobically. With increasing chain length, the phases become more non-polar. The separating mechanism is predominantly based on van der Waals forces. The more similar a flavoring substance is to the hydrocarbon chain of the phase, the greater are its interactions with the sorption agent and the better is its adsorption to the reversed phase.

For loading, that is in the adsorption mode, a flavoring substance-containing, aqueous fluid is conducted through the working chamber 12b through the inlet 16 and the pumping device 14 opposite to the gravity to remove possible air pockets. Therein, the normal phase/polar phase predominantly retains polar flavoring substances, while non-polar ones at least partially further get into the working chamber 12a. The deflavored fluid is then removed from the adsorption system 10 through the outlet 18. The valve devices 20 are opened in the adsorption mode, while the valve devices 20' are closed.

In the desorption mode, the valve devices 20 are closed, while the valve devices 20' are opened. The valve device 20" can be opened or closed as required. A first desorption agent, for example ethanol, or a first desorption agent mixture can be introduced via the inlet 16' and conducted through the working chambers 12a, 12b to a fraction collector 22 with presently three collecting containers 22a-c in direction of gravity. The collecting containers 22a-c can be opened or closed independently of each other via the valve devices 20a-c to collect corresponding fractions as required. It is understood that the number and the type of the collecting containers can be varied.

Alternatively or additionally to the first desorption agent, a second desorption agent, for example water, or a second desorption agent mixture can be conducted through the working chambers 12a, 12b via the conduit system 13 via a further inlet 16". By correspondingly opening and closing the valve devices 20, 20' and 20", both the first and the second desorption agent can be conducted either through the working chamber 12b and subsequently through the working chamber 12a opposite to gravity or through the working chamber 12a and subsequently through the working chamber 12b with the gravity.

Similarly, it is generally possible to generate a continuous or gradual gradient of first and second desorption agent to achieve a certain desorption behavior of the adsorbed flavoring substances. Furthermore, it is generally possible to conduct first one of the desorption agents from the top to the bottom, that is with the gravity, or to overlay one of the working chambers 12a, 12b and subsequently to conduct the other desorption agent through the working chambers 12a, 12b in the opposite direction from the bottom to the top or against gravity. Hereby, particularly sharply resolved fractions can be obtained and collected. Furthermore, 3, 4, 5, 6 or more desorption agents can of course also be used as a mixture and/or gradient.

Thereby, the adsorption system 10 allows a particularly variable and adequate process management. In addition, the use of different sorption agent types, that is of at least one normal phase/polar phase and at least one reversed phase, in the working chambers 12a, 12b allows an improved separation of the flavoring substances by combined adsorption and distribution chromatographic effects. Thus, a separation of flavoring substances due to compound-specific retaining capacities on different sorption agents can be performed in an adsorption system 10. Therein, the separation of certain fractions can for example be effected corresponding to their penetration depth in the reversed phase (working chamber 12a). Similarly, a separation of certain fractions can be effected corresponding to their retention time on the normal phase (working chamber 12b).

Figure 5:
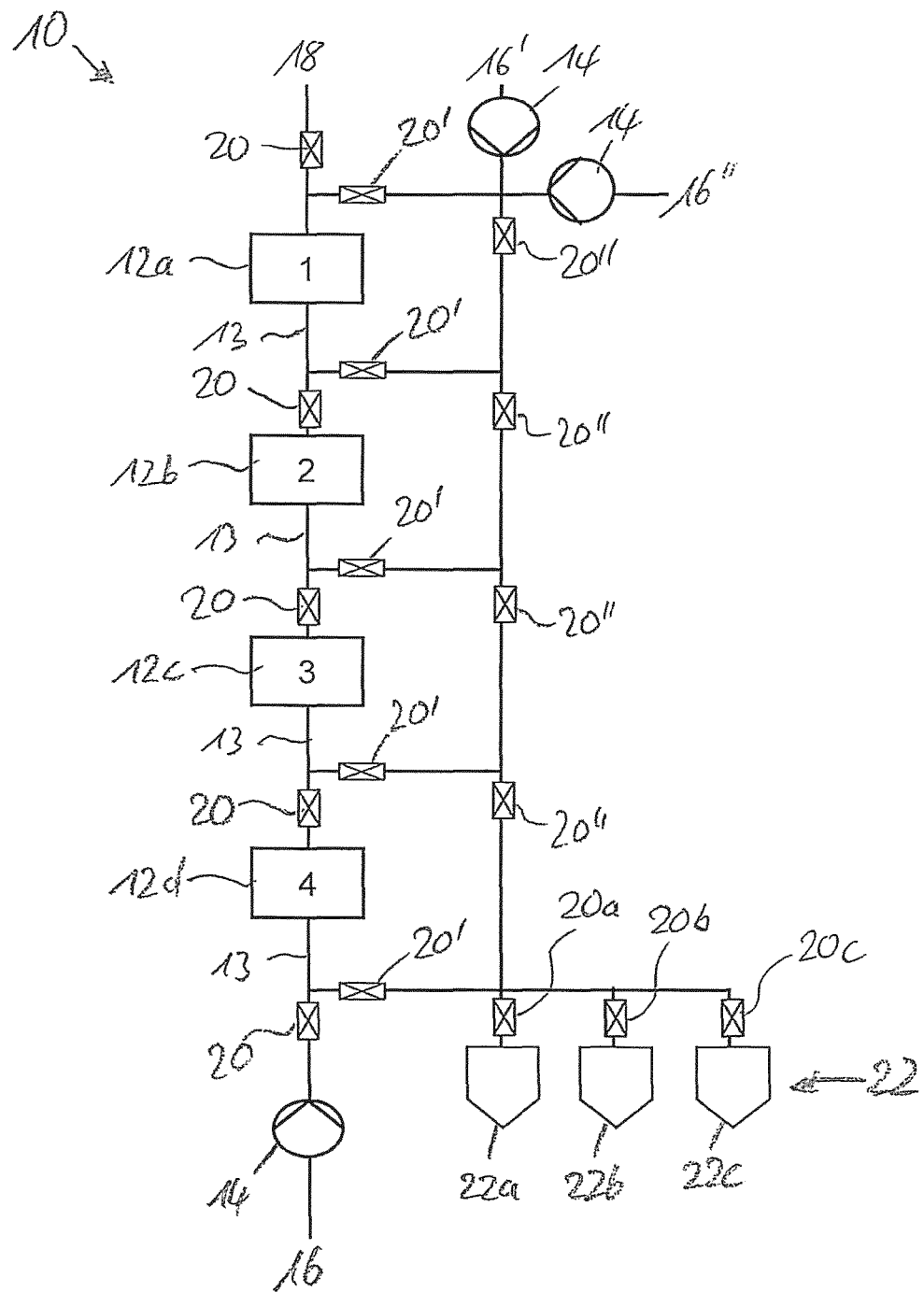
FIG. 5 a schematic diagram of the adsorption system according to the invention according to a further embodiment.

FIG. 5 shows a schematic diagram of the adsorption system 10 according to the invention according to a further embodiment. Therein, the basic construction of the adsorption system 10 corresponds to that of the adsorption system 10 shown in FIG. 4. In contrast to the preceding embodiment, the present adsorption system 10 includes four working chambers 12a-d in total for fractioned separation of different flavoring substances. The four working chambers 12a-d are filled with identical sorption agents or sorption agent mixtures in this example and thereby form four zones, in which the flavoring substances from the fluid distribute by a combination of adsorption and distribution chromatographic effects.

Alternatively, the working chambers 12a-d can be filled with different sorption agents or sorption agent mixtures, wherein at least one sorption agent is selected from the group of the normal phases and/or polar bound phases and at least one other sorption agent is selected from the group of the reversed phases. Furthermore, the adsorption system 10 includes a correspondingly greater number of valve devices 20, 20', 20" controllable or adjustable independently of each other to be able to adequately switch between the adsorption and the desorption mode. In particular, it is possible with the aid of the present adsorption system 10 to individually load and unload each working chamber 12a-d with flavoring substances. Thereby, it becomes for example possible to desorb only the flavoring substances adsorbed in the working chamber 12c or only the flavoring substances adsorbed in the working chambers 12a, 12b and 12d, whereby a particularly flexible process management with dead space reduction at the same time is allowed.

Figure 6:
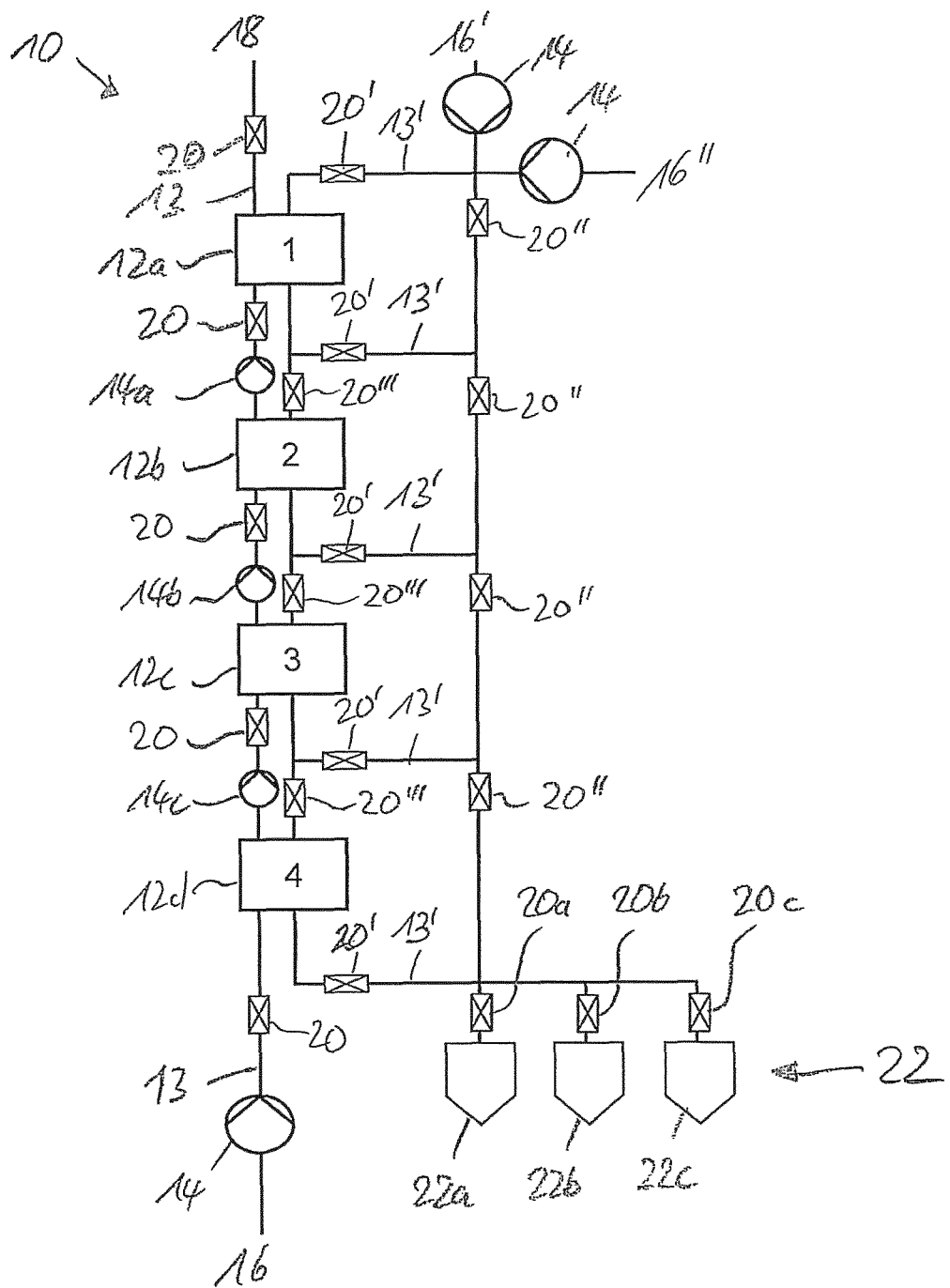
FIG. 6 a schematic diagram of the adsorption system according to the invention according to a further embodiment.

FIG. 6 shows a schematic diagram of the adsorption system 10 according to the invention according to a further embodiment. Therein, the basic construction of the present adsorption system 10 resembles that of the adsorption system 10 described in context with FIG. 5. For dead space minimization, the presently shown adsorption system 10 includes besides a conduit system 13, which is provided for passing the flavoring substance-containing fluid, a second conduit system 13', which is provided for passing the desorption agent or agents and has a lower volume or a lower cross-section than the conduit system 13. In other words, two pipeline systems 13, 13' are used, which accordingly form a first and a second fluid path, wherein a conduit system 13 with comparatively larger average diameter or relatively larger average cross-sectional area is used for loading and a conduit system 13' with comparatively smaller average diameter is used for unloading. Hereby, particularly highly concentrated flavoring substance concentrates are obtained. A further difference to the previous embodiment is in the additional pumping devices 14a-c, which are to be basically regarded as optional and can also be provided in different number and arrangement. The pumping devices 14a-c are each disposed between the working chambers 12a-c and improve the throughput of fluid and the loading speed, respectively, of the sorption agents arranged in the working chambers 12a-c with flavoring substances. Furthermore, the conduit system 13' provided for the desorption agents includes additional valve devices 20''', which are generally closed in the adsorption mode and can be switched independently of each other in the desorption mode to extract individual or combined fractions from the working chambers 12a-d. Therein, the valve devices 20''' can be check valves or ball valves in simplest configuration since these shut-off devices automatically switch via pressure differences, but do not have to be actively controlled and are thereby very inexpensive and operationally reliable.

Figures 7, 8:
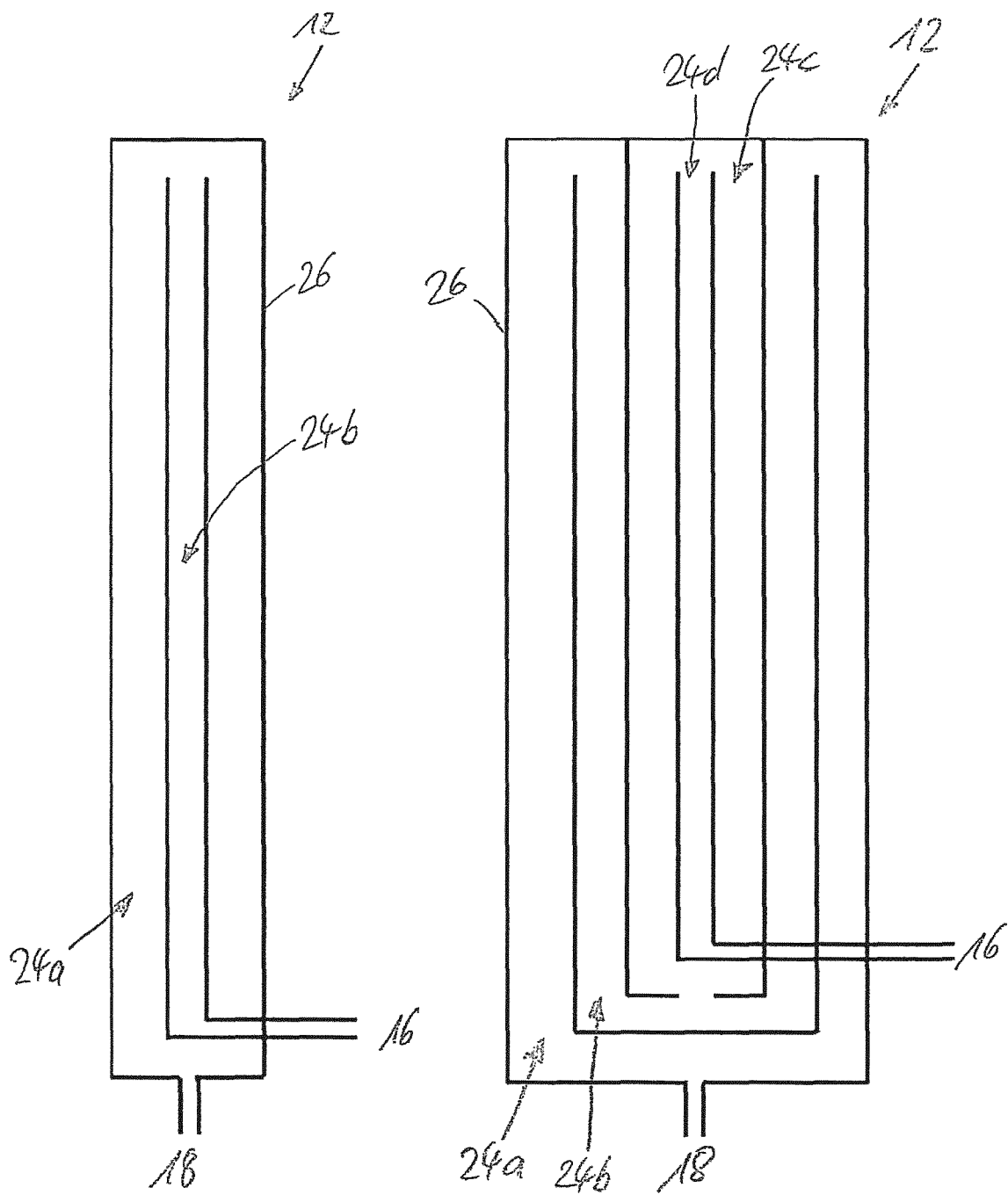
FIG. 7 a schematic sectional view of a working chamber with two channels fluidically connected to each other, which are arranged interleaved with each other in a common housing.
FIG. 8 a schematic sectional view of a working chamber with four channels fluidically connected to each other, which are arranged interleaved with each other in a common housing.

FIG. 7 shows a schematic longitudinal section through a working chamber 12 with two channels 24a, 24b fluidically connected to each other, which are arranged interleaved with each other in a common housing 26. Therein, the housing 26 is formed by a wall of the outer channel 24a, which surrounds the inner channel 24b. The inner channel 24b leads to an inlet 16, through which a fluid or a desorption agent can enter the working chamber 12 and is or can be conducted up to the orifice of the outer channel 24a. Here, the respective fluid is diverted and flows through the channel 24a to the outlet 18, where it again exits the working chamber 12. Thereby, the working chamber 12 gradually widens at the transition from the inner channel 24b to the outer channel 24 viewed in flow direction such that flavoring substances, which inferiorly bind to the sorption agent (mixture) arranged in the inner channel 24b and break through, can still be reliably collected with the aid of the larger capacity of the outer channel 24a. Otherwise stated, the traversed or traversable area of the sorption agent and thereby the capacity thereof gradually increases from the inlet 16 towards the outlet 18. This allows obtaining particularly authentic flavoring substance concentrates.

Basically, the working chamber 12 and its channels 24a, 24b, respectively, can be partially or completely filled with one or more sorption agents of the same type or nature independently of each other. It can also be provided that the channels 24a, 24b are filled with different sorption agent types, for example with a normal phase and a reversed phase. Furthermore, it can of course be provided that fluid or desorption agent is introduced through the outlet 18 and discharged through the inlet 16. The working chamber 12 provides a flow path as long as possible and at the same time relatively "thin" in particularly simple and easily scalable manner, in which a ratio of average cross-sectional thickness to total length is at most 0.3 or less. Therein, the cross-sectional area or thickness of the outer channel 24a substantially corresponds to the cross-sectional area of the working chamber 12 minus the cross-sectional area of the inner channel 24b.

FIG. 8 shows a schematic sectional view of a working chamber 12 with four channels 24a-d fluidically connected to each other, which are arranged interleaved with each other in a common housing 26. In this embodiment too, the cross-sectional area gradually expands at each transition from one to the next channel 24a-d. Thereby, the working chamber 12 provides a particularly long and at the same time "thin" flow path, in which a ratio of average cross-sectional thickness to total length is 0.03 or less. The number of the channels 24a-d can be varied as required such that three, five or more channels 24 can also be provided. The more channels 24 interleaved with each other are provided, the more the cross-sectional area extension along the flow path of the working chamber 12 formally approximates to a funnel. Alternatively, it can be provided that two or more channels 24 are not interleaved with each other, but for example arranged next to each other.

Figure 9:
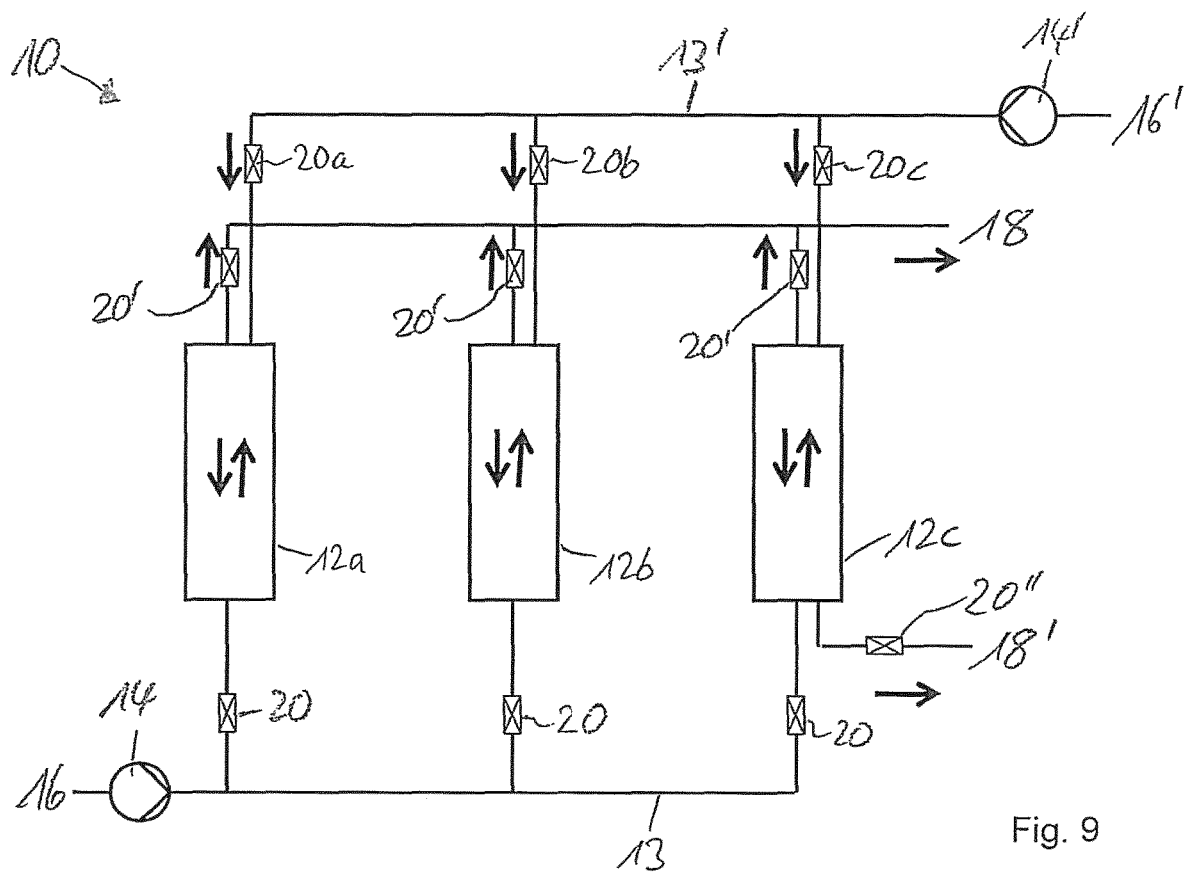
FIG. 9 a schematic diagram of the adsorption system according to the invention according to a further embodiment.

FIG. 9 shows a schematic diagram of the adsorption system 10 according to the invention according to a further embodiment. The flavoring substance-containing fluid, which can also be referred to as water phase, is first continuously supplied through the inlet 16 in the adsorption mode, pumped into the conduit system 13 with the aid of the pumping device 14 and flows parallel through all of the working chambers 12a-c and the sorption agents arranged therein, respectively, opposite to the direction of gravity. The pressure difference between the inlet and the outlet of the working chambers 12a-c is about 4 bar. The deflavored water phase is again removed from the conduit system 13 through the outlet 18.

In the desorption mode, a desorption agent, for example ethanol, is slowly conducted into the first working chamber 12a in intervals from the top through the inlet 16' and the conduit system 13' in that a slightly higher pressure than existing at the inlet 16 is generated by means of the pumping device 14' and in that the valve device 20a is opened, while the valve devices 20b, 20c are closed. Thereby, flavoring extract adsorbed on the sorption agent is pumped back into the water phase and diluted as severely as the concentration of the desorption agent in the fluid does at least substantially not result in desorption of already adsorbed flavoring substances in the downstream working chambers 12b, 12c due to the lower flow rates and volumes. In other words, the flavoring substance-containing fluid (water phase) is flavored and accumulated with already adsorbed and again desorbed flavoring substances, respectively, conducted to the downstream working chambers 12b, 12c and there again caught on the respective sorbent beds. The number of the working chambers 12a-c (extraction cells) and the respective volumes thereof are preferably selected such that the loading time for an individual working chamber 12 is as low as possible.

The described operation is repeated in analogous manner for the next working chamber 12b and subsequently for each further downstream working chamber 12c etc. such that the flavoring substances increasingly collect themselves in the last working chamber (here: 12c) with respect to the flow direction. The valve devices 20, 20' can be opened or closed as required to assist the desorption process and to prevent flavoring substance-containing fluid from flowing out of the outlet 18 in unused manner. Thereby, in the last working chamber 12c viewed in flow direction, a very large amount of flavor collects itself in very short time. The loading time is comparatively short for each individual working chamber 12a-c such that polar or non-polar flavoring substances are virtually not lost by chromatographic processes. This means that the resulting flavoring substance concentrate is very authentic. At the same time, a high concentration factor is achieved and an ethanolic phase with high flavoring substance concentration is obtained, respectively. In that the loading times of each individual working chamber 12a-c are small, the flavoring substance concentrate is obtained multiple times a day in the rhythm of the adsorption device 10, for example every hour, and can be removed via the valve device 20" and the outlet 18'.

Figure 10:
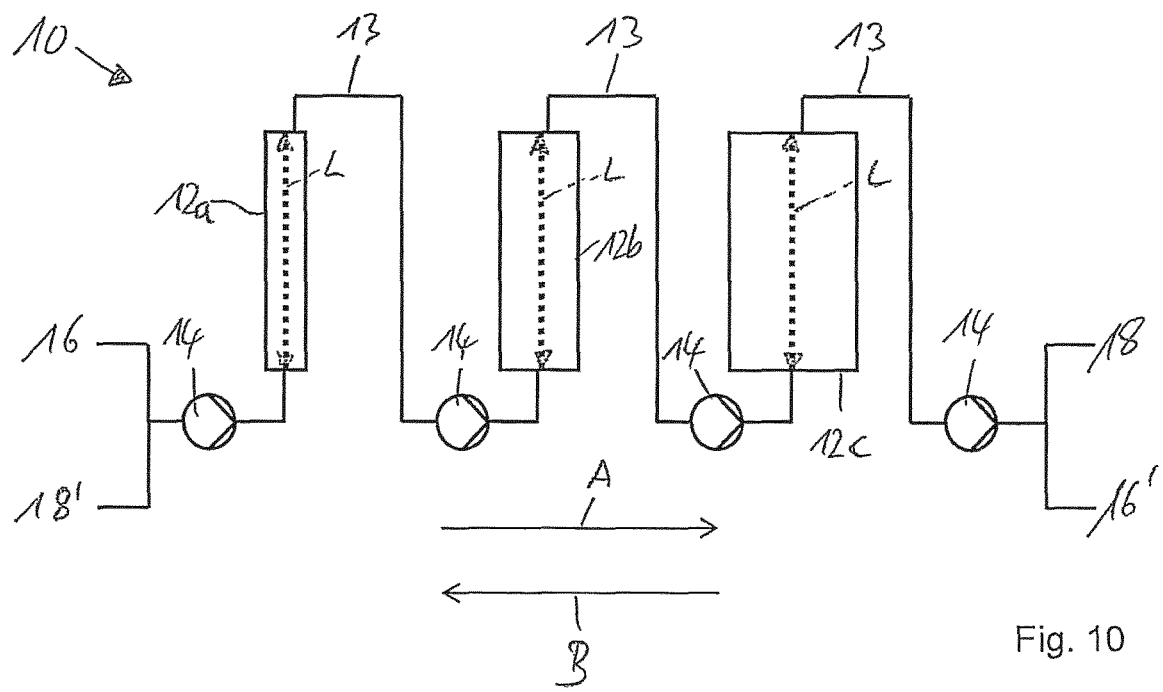
FIG. 10 a schematic diagram of the adsorption system according to the invention according to a further embodiment.

FIG. 10 shows a schematic diagram of the adsorption system 10 according to the invention according to a further embodiment. Therein, the construction of the adsorption system 10 basically corresponds to that shown in FIG. 1, however, in contrast to the first embodiment, the adsorption system 10 includes working chambers 12a-c with different geometries, in particular with different average cross-sectional thicknesses. The working chambers 12a-c are again at least substantially circularly cylindrically formed, but have increasing average cross-sectional thicknesses with respect to the flow direction denoted by the arrow A. In other words, the working chambers 12a-c have the same height, but different diameters or cross-sectional areas, whereby a kind of funnel process results. The first working chamber 12a flown by the flavoring substance-containing fluid in loading is narrower than the second working chamber 12b and all of the downstream working chambers 12b, 12c, respectively. Thereby, it is achieved that those flavoring substances, which can be very efficiently bound to a comparatively small sorbent amount, are no longer or less exclusively in a narrow pipe or in a working chamber 12a with low volume and with a ratio of average cross-sectional thickness to length of the working chamber 12a as small as possible of at most 0.3. In the subsequent desorption, a particularly high final concentration of these flavoring substances then results therefrom.

Those flavoring substances, which require a large amount of sorption agent, to be able to be at least approximately quantitatively bound, are mainly bound in the downstream working chambers 12b or 12c, since they have a larger binding capacity due to their larger diameters. In desorbing opposite to the loading direction (arrow B), the flavoring substances with inferior binding characteristics are then first again released from the largest working chamber 12c in the ratio correct in amount and get into the comparatively narrow first working chamber 12a via the second working chamber 12b, where they dissolve the other well binding flavoring substances.

Thereby, it is mainly achieved that the low binding flavoring substances appear in the correct quantity ratio in the resulting flavoring substance concentrate, whereby it is particularly authentic. If the entire amount of desorption agent of the largest working chamber 12c should not be used for desorption of the smallest working chamber 12a, the entire available amount of poorly binding flavoring substances is not recovered, but the recovered flavoring substances are further quantitatively in the comparable ratio as in the original fluid (water phase).

Figure 11:
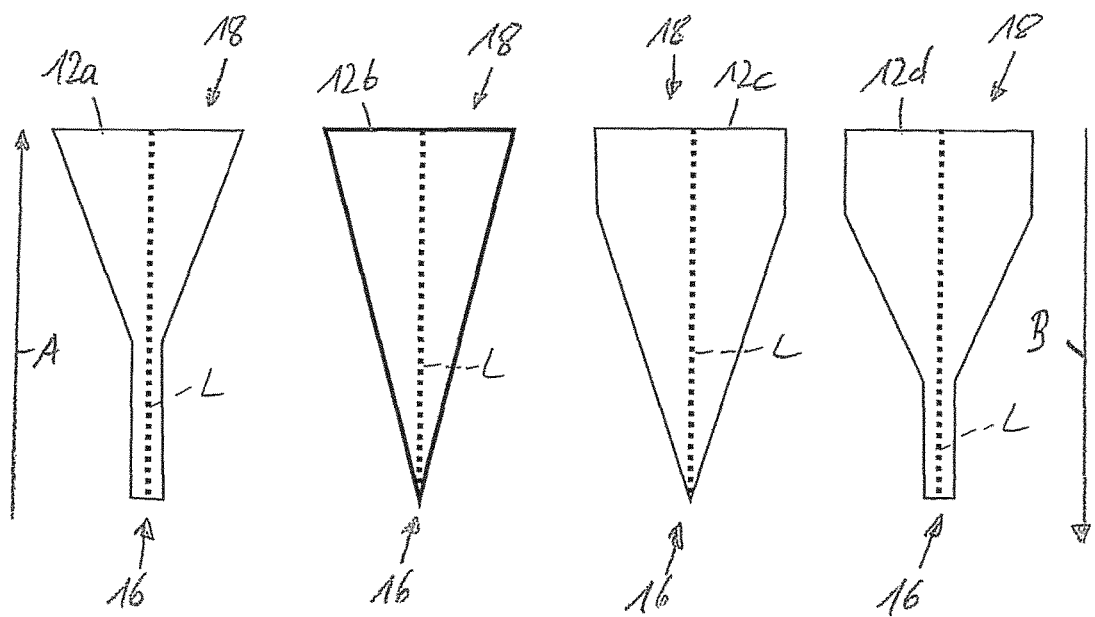
FIG. 11 a schematic sectional view of four working chambers with different geometries.

FIG. 11 shows a schematic sectional view of four working chambers 12a-d with different geometries. One recognizes that all of the working chambers 12a-d have a diameter varying in longitudinal extension direction L or a varying cross-sectional area. Thereby, in each working chamber 12a-d, the traversed or traversable cross-sectional area and thereby the capacity of the sorption agent respectively arranged in the working chamber gradually and/or continuously increases from the inlet 16 towards the outlet 18. This allows the extraction of particularly authentic flavoring substance concentrates since the capacity of the sorption agent increases in flow direction such that more difficultly binding flavoring substances can still be reliably adsorbed. A loading with flavoring substances is accordingly preferably effected in the flow direction denoted by the arrow A, that is from the bottom to the top and from areas with low diameter towards areas with larger diameter, respectively. Hereby, it is ensured that a lower binding capacity is prepared for flavoring substances, which bind well, than for flavoring substances, which inferiorly bind to the respective sorption agent. The unloading is preferably effected in opposite flow direction (arrow B), that is from areas with larger diameters towards areas with smaller diameters. Thereby, an inversely particularly reliable desorption of all of the bound flavoring substances is achieved since the flavoring substances bound in the area of the outlet 18, that is the only weakly adsorbed compounds, dissolve well from the desorption agent, while the flavoring substances bound in the area of the inlet 16, that is the compounds binding strongly to the respective sorption agent, are desorbed on desorption agent with a correspondingly large volume flow. Basically, the working chambers 12a-d can be used individually or in any combination for the adsorption system 10 according to the invention.

Figure 12:
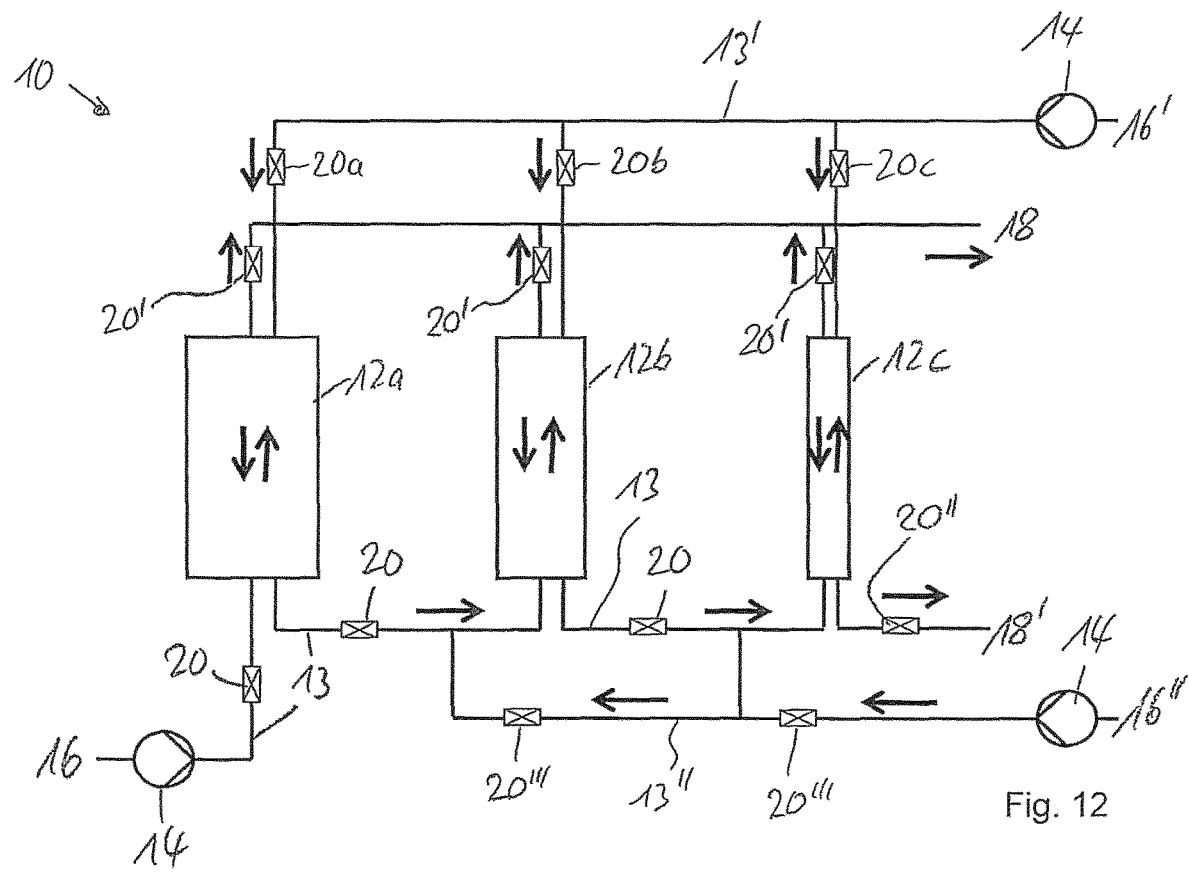
FIG. 12 a schematic diagram of a further embodiment of the adsorption system according to the invention.

FIG. 12 shows a schematic diagram of a further embodiment of the adsorption system 10 according to the invention. The construction of the adsorption system 10 largely corresponds to that of the embodiment shown in FIG. 9. In contrast to the embodiment shown in FIG. 9, the present embodiment comprises three cylindrical working chambers 12a-c, which have the same height, but different cross-sectional areas or diameters and are respectively filled with the same sorption agent or sorption agent mixture.

Therein, the working chamber 12a has the largest volume, while the working chamber 12b has a lower volume and the working chamber 12c has the smallest volume of the three working chambers 12a-c. Thereby, the first working chamber 12a viewed in loading direction and the sorption agent arranged therein, respectively, have the largest binding capacity for flavoring substances and allow the largest volume flow, while the binding capacity and the maximally admissible volume flow of the working chambers 12b, 12c arranged downstream gradually decrease. For example, the volume of the working chamber 12b can be 1/10 of the volume of the working chamber 12a, while the volume of the working chamber 12c is 1/10 of the volume of the working chamber 12b. In this case too, it can of course be provided that only two or four or more working chambers 12 are provided instead of three working chambers 12a-c. Thereby, a particularly low ratio of average cross-sectional thickness to total length of the working chambers 12a-c is overall provided, for example a ratio of at most 0.03 or less.

As a further difference to the embodiment shown in FIG. 9, the present adsorption system 10 comprises an additional conduit system 13'', which leads to the conduit system 13 between the working chambers 12a-12b and 12b-12c and constitutes a third fluid path. The further conduit system 13'' includes an inlet 16'', a pumping device 14 as well as two valve devices 20''' and serves for the supply of water into the conduit system 13 described in the following.

In the presently shown adsorption system 10 too, a fluid, which is a flavoring substance-containing water phase with an ethanol content between 0% by vol. and 50% by vol., for example of 0% by vol., 0.5% by vol., 1% by vol., 6% by vol., 18% by vol., 30% by vol., 37% by vol., 42% by vol. or 49% by vol., is first continuously introduced into the conduit system 13 through the inlet 16 and parallel and uniformly conducted through all of the working chambers 12a-c (extraction cells). Therein, the pressure difference between the lower inlet and the upper outlet of the working chambers 12a-c is about 4 bar.

For desorbing, ethanol as the desorption agent is slowly conducted in intervals through the inlet 16' from the top through the conduit system 13', which constitutes a second fluid path, into the working chambers 12a-c in that a higher pressure than on the water side (conduit system 13) is applied. With the aid of the valve devices 20a-c, an individual subjection of the individual working chambers 12a-c is possible. Thereby, the flavoring substances adsorbed on the sorption agent are desorbed, pumped back into the water phase as a flavoring extract and diluted with water with the aid of the conduit system 13'. Thereby, the ethanol content of the respective desorbate is decreased, whereby an undesired or premature desorption of the flavoring substances adsorbed in the downstream working chamber 12b or 12c is prevented. Therein, the water amount supplied through the conduit system 13' is preferably selected such that the ethanol content of the respective desorbate is maximally 12-13% by vol., before it is conducted into the working chamber 12b or 12c. For example, the highly ethanol-containing desorbate of the working chamber 12a (ethanol content >90% by vol.), in which the flavoring substances are for example accumulated at 1:100 with respect to the fluid, is again diluted 1:10 with water, to adjust an ethanol content of at most 12-13% by vol. Thereby, the flavoring substances, which are introduced into the working chamber 12b, are accumulated approximately by the factor of 10 with respect to the original fluid.

Analogously, the highly ethanol-containing desorbate of the working chamber 12b, in which the flavoring substances are again accumulated by a factor of about 1:100 with respect to the working chamber 12a, is again diluted 1:10 with water such that the flavoring substances, which are introduced into the working chamber 12c, are formally accumulated by the factor of 100 with respect to the original fluid. At the same time, the volume of the desorbate introduced into the working chamber 12c is only about 1/10 of the volume of the desorbate introduced into the working chamber 12b and 1/100 of the fluid introduced into the working chamber 12a, respectively. In the last working chamber 12c viewed in loading direction, a very large flavor amount is thus bound in very short time and can finally be removed from the adsorption system 10 via the outlet 18' as an ethanolic flavoring substance concentrate by opening the valve device 20''. Herein, dilution with water is not effected, whereby an accumulation of the flavoring substances of 1:100 with respect to the working chamber 12b and of 1:1,000 with respect to the working chamber 12a and of 1:10,000 with respect to the original fluid, respectively, is achieved.

Since the loading time for each individual working chamber 12a-c is comparatively short, both non-polar and polar flavoring substances are uniformly accumulated and at least predominantly do not break through. This means that the resulting flavoring substance concentrate is very authentic. At the same time, a higher concentration factor of 1:10,000 or more is thereby achieved. In that the loading times of each individual working chamber 12a-c are small, flavoring extract can be obtained multiple times a day in the rhythm of the plant, for example every hour, or faster.

The deflavored fluid or the deflavored water phase can basically be discharged from the adsorption system 10 via the outlet 18 and discarded or be circulated through the adsorption system 10 via the inlet 16", wherein considerable water savings as well as a particularly high yield and recovery of flavoring substances are achieved in the latter case.

Instead of the conduit system 13' or in addition to the conduit system 13', it can be provided that the adsorption system 10 includes one or more intermediate containers (not shown), in which the respective ethanolic desorbate can be collected, intermediately stored and optionally diluted.

The following table 1 shows the results, which can be realized in processing a flavoring substance-containing fluid with the aid of one of the above shown adsorption systems 10. A water phase with 6% by vol. of ethanol and the beer-typical flavoring substances 3-methylbutane-1-ol, phenol, hexanal, cis-3-hexenol, linalool and 2-phenylethanol was used as the fluid. In table 1, the accumulation factors of each flavoring substance in the flavoring substance concentrate related to its respective initial concentration in the original fluid are indicated on the one hand, wherein the accumulation factors are relatively uniformly situated around the value of 200. This emphasizes the authenticity of the resulting flavoring substance concentrate. Furthermore, the relative accumulation factors of 3-methylbutane-1-ol to hexanal, cis-3-hexenol, linalool and 2-phenylethanol and of phenol to hexanal, cis-3-hexenol, linalool and 2-phenylethanol, respectively, are indicated. Here too, one recognizes that the relative accumulation factors are in the range of 1.0, such that all of the flavoring substances preferably have been very uniformly and thereby discrimination-free accumulated despite of their severely different polarities.

TABLE 1

Accumulation factors

| 6% ethanol in water phase | Accumulation factor | hexanal | cis-3-hexenol | linalool | 2-phenyl-ethanol |
|---|---|---|---|---|---|
| Accumulation factor | | 206 | 217 | 195 | 241 |
| 3-methyl-butane-1-ol | 194 | 1.06 | 1.12 | 1.00 | 1.24 |
| phenol | 244 | 0.84 | 0.89 | 0.80 | 0.99 |

In a further embodiment, a two-stage accumulation of an aqueous fluid is performed, which can for example again contain 3-methylbutane-1-ol, phenol, hexanal, cis-3-hexenol, linalool and 2-phenylethanol as beer-typical flavoring substances. In a first stage, an adsorption with a comparatively high sorbent capacity is performed. For this purpose, one of the above described adsorption systems 10 can for example be used. Therein, relative accumulation factors above 1.49 for the respective quotient of cis-3-hexenol, 2-phenylethanol, linalool, hexanal over 3-methylbutane-1-ol and phenol are not achieved. The accumulation factors in the subsequent desorption with ethanol as the desorption agent are selected comparatively low and are for example 1:10, 1:100 or 1:500.

In a second stage, the flavoring substance concentrate obtained from the first stage, which has an ethanol content of above 90% by vol., is diluted with water to about 6-20% by vol. of ethanol content. Subsequently, an adsorption is performed with the aid of a comparatively long and thin working chamber 12 filled with sorption agent, which can optionally be composed of multiple partial chambers 32 (cf. FIG. 17). Therein, accumulation factors of above 1:100 or 1:1000 or higher are obtained related to the educt of the second stage and the flavoring substance concentrate of the first stage, respectively.

The technological advantage of this two-stage solution is in that one can use two different adsorption systems 10 or two different conduit systems 13, which can be or are optimized to very different flow rates. In other words, the adsorption system 10 and the conduit system 13, respectively, for the first stage can be optimized for high flow rates of the low concentrated, aqueous fluid, while the second adsorption system 10 and the second conduit system 13, respectively, can be optimized for low flow rates of the already highly concentrated flavoring substance concentrate as well as for high ethanol contents, which for example entails higher requirements to fire and explosion protection. Accordingly, the second adsorption system 10 can basically also be referred to as or formed as a high concentration device.

The second adsorption system 10 and the second conduit system 13, respectively, can additionally comprise a working chamber 12 with a particularly low ratio of average cross-sectional thickness to total length due to the considerably lower flow rates, for example a ratio of at most 0.03 or less. This allows the presentation of particularly high concentration factors.

Figure 13:
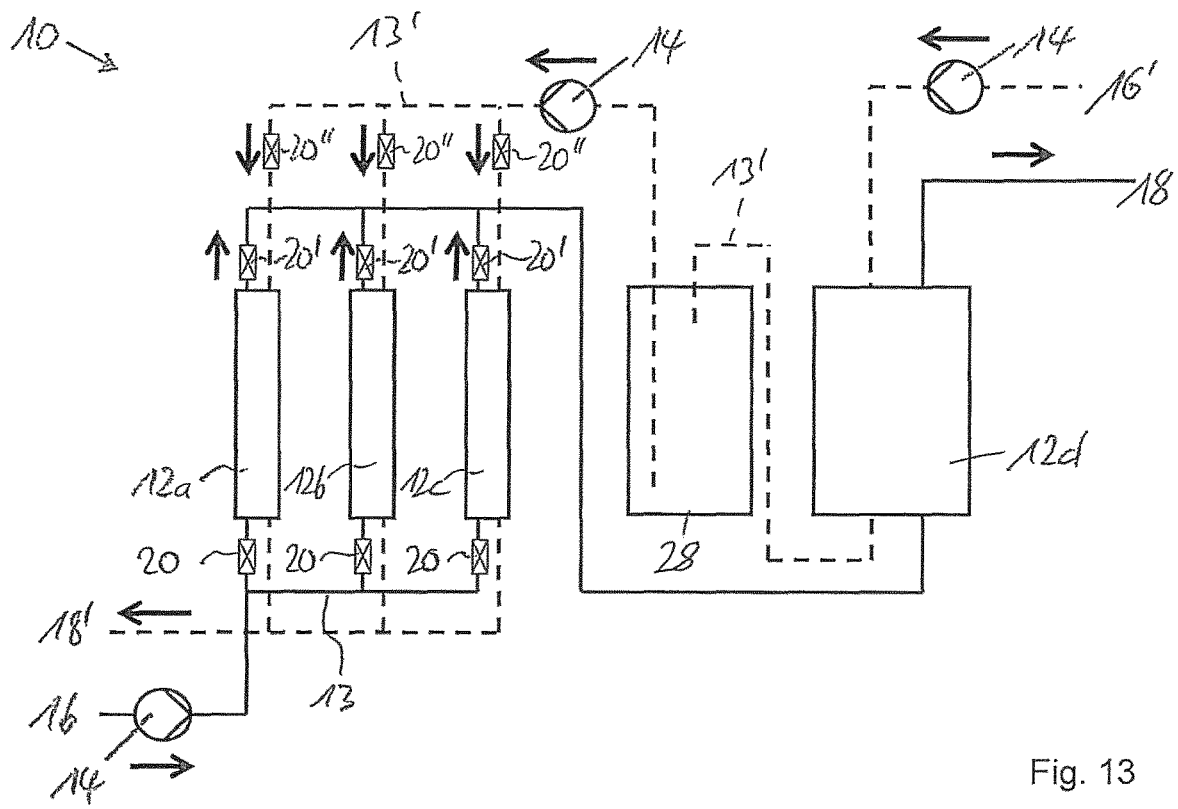
FIG. 13 a schematic diagram of a further embodiment of the adsorption system according to the invention.

FIG. 13 shows a schematic diagram of a further embodiment of the adsorption system 10 according to the invention. Therein, in contrast to the preceding embodiments, the adsorption system 10 includes a collecting container 28, the function of which will be explained in more detail below. One recognizes that the adsorption system 10 comprises three working chambers 12a-c, which are filled with the same sorption agent type and have a low cross-sectional area or a low diameter compared to their length in the present case. Therein, a so-called reversed phase material is used as the sorption agent, which can be monovarietal or a mixture of two or more reversed phase materials. It is understood that a varying number of working chambers 12a-c can also be provided in the present case, which additionally can be identically or differently formed and be filled with identical or different sorption agents, respectively. A flavoring substance-containing water phase from the brewing industry is again used as the fluid and introduced into the conduit system 13 of the adsorption system 10 through the inlet 16.

In an adsorption or collection mode, the valve devices 20, 20' are first opened and the valve devices 20" are closed. The fluid is then conducted parallel through the working chambers 12a-c opposite to the direction of gravity until the sorption agents are overloaded. Thereby, only non-polar flavoring substances are predominantly bound on the sorption agents arranged in the working chambers 12a-c, while polar flavoring substances already partially or completely "break through" and are discharged from the working chambers 12a-c. The polar flavoring substances are conducted to a further working chamber or a further extraction cell 12d with the partially deflavored fluid, which has a greater ratio of diameter or cross-sectional area to length compared to the upstream working chambers 12a-c. By the comparatively larger traversed cross-sectional area, the sorption agent arranged in the working chamber 12d has a higher capacity such that the broken-through polar flavoring substances are at least substantially completely bound. The deflavored fluid is then discharged from the adsorption system 10 through the outlet 18.

For recovering the bound flavoring substances, the adsorption system 10 is switched to a desorption mode. Hereto, the valve devices 20, 20' are closed and the valve devices 20" are opened. Subsequently, a desorption agent, for example ethanol, is conducted through the large working chamber 12d in direction of gravity and opposite to the loading direction, respectively, through the inlet 16'. The recovered flavoring substances are then conducted into the basically optional collecting container 28 via the conduit system 13', from where they can be completely or partially removed, further processed and/or forwarded. In case of forwarding, the already flavoring substance-containing ethanolic desorption agent is further pumped to the working chambers 12a-c by means of the pumping device 14 and flows through them also opposite to the loading direction and in direction of gravity, respectively. The non-polar flavoring substances bound in the small working chambers 12a-c are desorbed by means of the desorption agent and discharged from the adsorption system 10 through the outlet 18'. Basically, it can also be provided that a separate conduit system (not shown) for the desorption agent is associated with the working chambers 12a-c such that the polar and the non-polar flavoring substances can be desorbed independently of each other. Furthermore, it can be provided that the outlet 18' also leads to the collecting container 28 to form the flavoring substance concentrate in it and to combine the polar and non-polar flavoring substances in a desired ratio, respectively. In this case, it is advantageous if the collecting container 28 has a separate outlet (not shown) to remove the flavoring substance concentrate.

Figure 14:
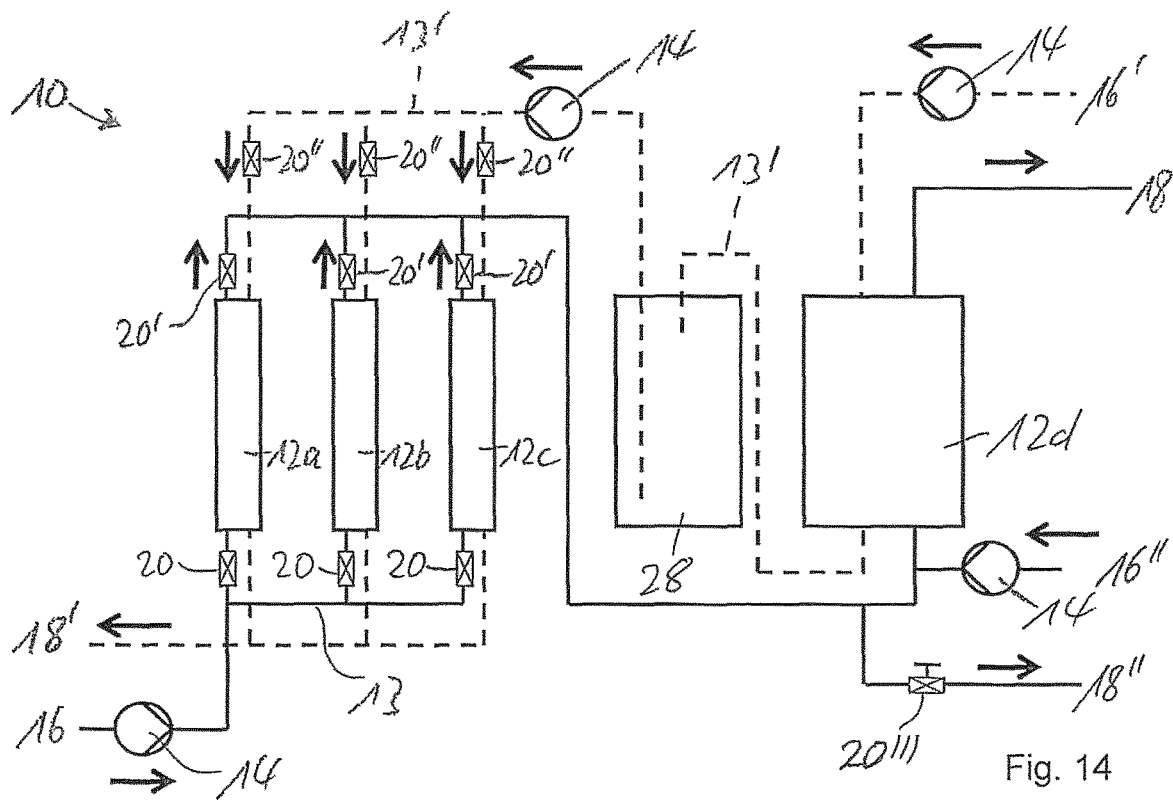
FIG. 14 a schematic diagram of a further embodiment of the adsorption system according to the invention.

FIG. 14 shows a schematic diagram of a further embodiment of the adsorption system 10 according to the invention. Therein, the basic construction and the basic functionality correspond to those of the preceding embodiment. In contrast to the preceding embodiment, the adsorption system 10 additionally includes a further inlet 16" with an associated pumping device 14 as well as an additional outlet 18" with an associated valve device 20'". Thereby, the adsorption system 10 allows performing a controllable and/or adjustable polarity change, in which the permeate flow of the first working chambers or extraction cells 12a-c in loading direction can be modified before entering the working chamber 12d. The polarity change method generally provides that first a flavor containing aqueous fluid with a comparatively high ethanol content of up to 45% by vol. or more as an educt is first introduced through the inlet 16 and conducted through the first working chamber or chambers 12a-c in flow direction, in which first predominantly non-polar flavoring substances are adsorbed. Between the outlet or the outlets of the working chambers 12a-c and the inlet of the working chamber 12d, the polarity and/or the pH value and/or the ionic strength and/or the solid content of the already partially deflavored fluid or permeate are then changed. Hereto, water, acids and/or alkaline solutions can for example be admixed to the flavoring substance-containing permeate flow through the inlet 16". Suitable compounds for pH value adjustment are inherently known to the expert and for example include inorganic and organic acids like sulfuric acid, hydrochloric acid, phosphoric acid, ascorbic acid, citric acid, lactic acid, malic acid, acetic acid, propanoic acid, butyric acid, 2-methylbutyric acid, 3-methylbutyric acid, hexanoic acid, heptanoic acid, octanoic acid, nonanoic acid, decanoic acid and the derivatives thereof as well as inorganic bases like sodium hydroxide, calcium hydroxide and potassium hydroxide, wherein this enumeration is not to be regarded as conclusive. In this manner, a specific discrimination of acidic and alkaline flavoring substances, respectively, is possible. Non-conclusive examples for such flavoring substances are in particular:

amines (primary, secondary and tertiary amines, e.g. monomethylamine, dimethylamine, trimethylamine, monoethylamine, diethylamine, triethylamine etc.) and carboxylic acid-containing compounds (e.g. formic acid, acetic acid etc.)

Independently thereof, it is alternatively or additionally generally possible to add a predetermined amount of at least one substance to the fluid or permeate, which at least partially dissolves in the fluid or permeate. One or more substances can be selected, which is or are solid and/or liquid under standard conditions. Similarly, the at least one substance can be selected from a group, which includes inorganic and organic salts, monomeric, oligomeric and polymeric sugars, protic solvents, aprotic non-polar solvents and aprotic-polar solvents. Similarly, at least one substance can be selected, which dissolves in exergonic manner in the fluid or permeate at 25° C. and 1.013 bar under standard conditions. The at least one substance can be added to the fluid in an amount of at least 0.1 g/l, in particular of at least 1 g/l and preferably of at least 10 g/l. Similarly, it is possible that the at least one substance is added to the fluid in an amount such that a water content of the fluid related to the total volume of the fluid is at most 94% by vol. Therein, the invention is based on the realization that by dissolving the substance or substances, a corresponding amount of fluid molecules is bound to the substance or substances and thereby is no longer available for interactions. With increasing concentration of the substance or the substances in the fluid, the flavoring substance molecules dissolved in the fluid therefore increasingly adsorb on the sorption agent, whereby a particularly high recovery rate and concentration of the flavoring substances still present in the fluid is allowed. Alternatively or additionally, it is generally possible not to use a pure solvent or solvent mixture as the desorption agent, but to add at least one substance to the desorption agent, which is preferably solid under standard conditions and at least partially dissolves in the desorption agent. The desorption agent can basically be a solution, emulsion or suspension. Therein, the invention is based on the realization that the desorption behavior as well as the chromatographic separating behavior of certain flavoring substances can be specifically influenced by the dissolution of the substance or the substances. With increasing concentration of the substance or the substances in the desorption agent, certain flavoring substance molecules increasingly desorb from the sorption agent, whereby a particularly high recovery rate and a simple separation of these flavoring substances from other flavoring substances are allowed. In this case too, the at least one substance can be added in an amount of at least 0.1 g/l, in particular of at least 1 g/l and preferably of at least 10 g/l.

Similarly, it is possible to discharge at least a part of the permeate from the working chambers 12a-c through the outlet 18" by opening the valve device 20'". Thereby, only a part of the polar flavoring substances gets into the working chamber 12d and is bound to the sorption material arranged therein. By this controllable and/or adjustable amount reduction, polar flavoring substances can be relatively depleted with respect to non-polar flavoring substances, wherein the ratio of the polar flavoring substances with respect to each other remains at least substantially constant.

For desorption, after termination of the loading and sorption phase, the flavoring substances of all of the working chambers 12a-d are desorbed with ethanol as the desorption agent in unloading direction reverse to the loading direction and a corresponding flavoring substance concentrate is obtained, which can be discharged through the outlet 18'.

Therein, it can optionally be provided that at least a part of the desorbed polar flavoring substances is discharged via the opened valve device 20''' and the outlet 18''. Hereby too, a relative depletion of the polar with respect to the non-polar flavoring substances is possible while maintaining the relative ratio of the polar flavoring substances to each other. Discharge through the outlet 18'' can be assisted by closing the valve devices 20'. The described polarity change and the elements and additives associated therewith can basically always be used if the flavoring substance-containing fluid is conducted through two or more working chambers 12 in sequence and if a relative depletion of polar with respect to non-polar flavoring substances is desired while at least largely maintaining the relative ratio of the polar flavoring substances to each other.

Figure 15:
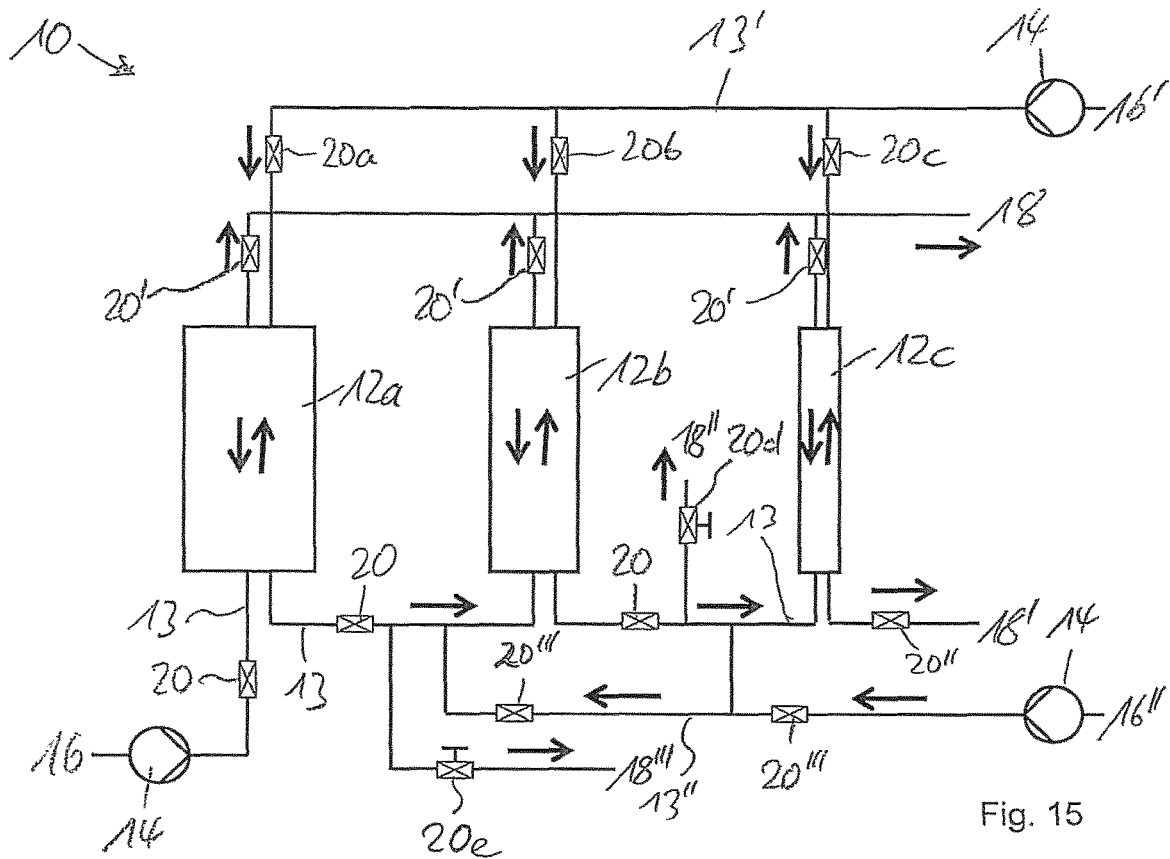
FIG. 15 a schematic diagram of a further embodiment of the adsorption system according to the invention.

FIG. 15 shows a schematic diagram of a further embodiment of the adsorption system 10 according to the invention. Therein, the basic construction of the adsorption system 10 largely corresponds to that of the embodiment shown in FIG. 12. In addition to the embodiment shown in FIG. 12, the adsorption system 10 includes an outlet 18'' openable and closable via a valve device 20*d*, which is fluidically arranged between the first and the second working chamber 12*a*, 12*b*, as well as an outlet 18''' openable and closable via a valve device 20*e*, which is fluidically arranged between the second and the third working chamber 12*b*, 12*c*. Thereby, the adsorption system 10 allows not only a gradual concentration of the flavoring substances via the working chambers 12*a-c*, but also performing the above described polarity change via the inlet 16'' and the valve devices 20''', as well as an amount reduction controllable and/or adjustable independently thereof via the basically optional outlets 18'' and 18'''.

Figure 16:
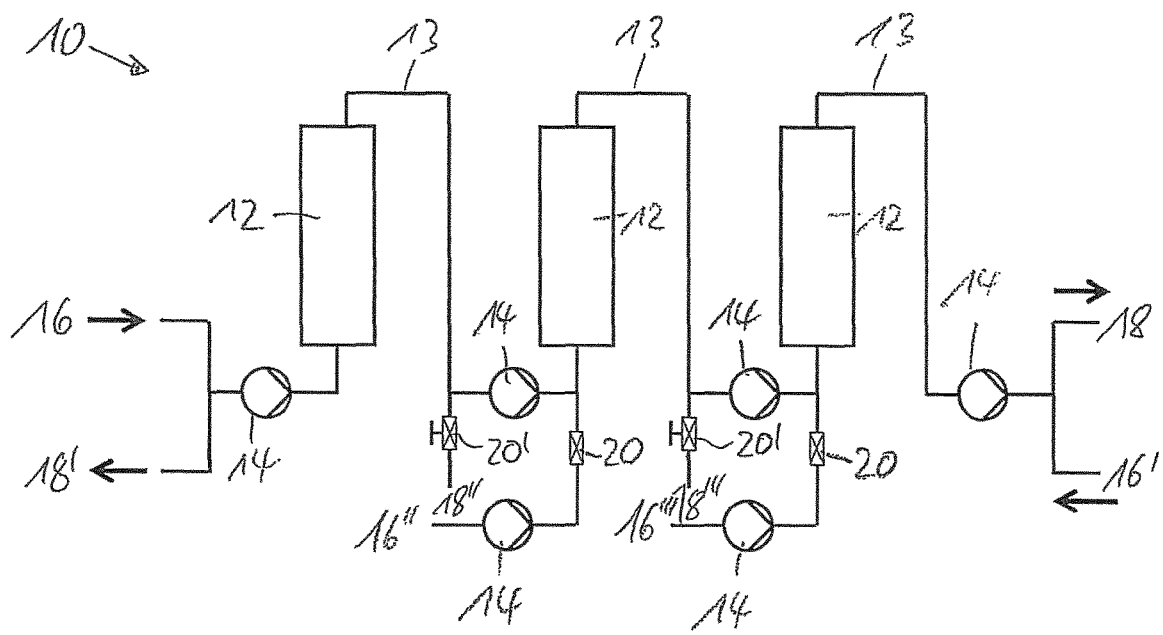
FIG. 16 a schematic diagram of a further embodiment of the adsorption system according to the invention.

Basically, all of the embodiments of the adsorption system 10 according to the invention can be extended by the possibility of a controllable and/or adjustable polarity change and/or a controllable and/or adjustable amount reduction in the shown manner. Hereto, FIG. 16 exemplarily shows a schematic diagram of a further embodiment of the adsorption system 10 according to the invention, the construction of which largely corresponds to that of the adsorption system 10 shown in FIG. 1. In addition to the example shown in FIG. 1, the present adsorption system 10 includes an inlet 16'' openable and closable via a valve device 20 with an associated pumping device 14 as well as an inlet 16''' openable and closable via a valve device 20 with an associated pumping device 14, via which water, acids, bases and/or solutes can be introduced into the conduit system 13 and in the already partially deflavored fluid flow, respectively, as required. The inlets 16'' and 16''' each end between two extraction cells 12. Furthermore, the adsorption system 10 includes an outlet 18'' openable and closable via a valve device 20', as well as an outlet 18''' openable and closable via a valve device 20', via which a demand-related amount reduction can be effected. The outlets 18'' and 18''' also respectively end between two working chambers 12.

Figure 17:
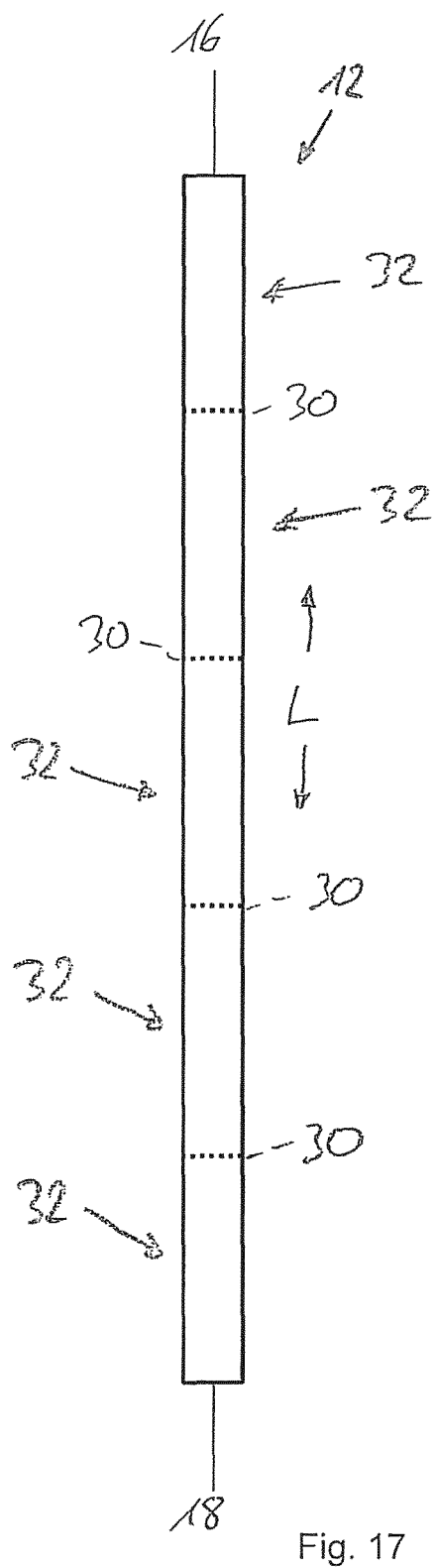
FIG. 17 a schematic sectional view of a divided working chamber.

FIG. 17 shows a schematic sectional view of a divided working chamber 12 according to the invention, which can for example be used in an adsorption system 10 according to the invention. The working chamber 12 can also be referred to as an extraction cell. For realizing a comparatively thin adsorption path as long as possible and thereby for representing a working chamber 12, in which a ratio of average cross-sectional thickness to total length L is at most 0.3, a correspondingly long pipe filled or fillable with sorption material can be used. However, with increasing length L, the flow resistance or the input pressure required for maintaining a reasonable fluid flow also increases. Since sorption materials are usually porous, there is the risk that the sorption material or materials are permanently crushed upon application of pressures above about 1 to 2 bar and thereby lose their adsorption effect and block the flow, which can result in further pressure increase. In addition, the sorption material at high pressure can clog the outlet of the working chamber 12. In order to prevent this phenomenon, extraction paths as long as possible with low cross-sectional areas are allowed according to the invention in that long pipes with comparatively low diameter are segmented by the installation of fixed separating trays 30, which can for example be formed as sieve or sinter trays. Thereby, a series of independent flow resistances arises such that only a pressure drop at that level is realized over each individual segment, which does not damage the sorbent or sorption agent. Accordingly, the working chamber 12 is presently divided into five partial chambers 32 of the same volume by four separating trays 30 exemplary in number and arrangement. It is understood that only 1, 2 or 3 as well as 5, 6, 7, 8, 9, 10 or more separating trays 30 can also be provided instead of four separating trays 30. The resulting partial chambers 32 of a working chamber 12 can basically have identical or different heights, cross-sectional areas and/or volumes. Therein, it can be provided that the pipe is dividable into corresponding pipe segments to facilitate filling and exchanging sorbent agents, respectively. The individual pipe segments can be connectable to each other and settable to each other in any manner, for example by threads, bayonet lock, flanges 34 (see FIG. 18), pipe clamps etc. Similarly, it can be provided that the pipe segments are connected in firmly bonded manner, for example by welding.

For example, if a pressure drop between inlet 16 and outlet 18 of the working chamber 12 filled with a sorption agent of 1 bar is to be adjusted, a certain flow rate would result with an exemplary bed length of 1 m. Typical values for the flow rate are about 1.5 l/min of throughput at 4 bar of pressure and a traversed area of about 20 cm$^2$. In case of a traversed area of about 2000 cm$^2$, the typical throughput with otherwise identical boundary conditions is about 150 l/min. If one would now wish to increase the bed length or the length L of the working chamber 12 for example to 5 m, one would have to increase the pressure at the inlet 16 to 5 bar for maintaining the same flow speed or flow rate. Usually, this would result in a fast destruction or deactivation of the sorption agent, whereby correspondingly high operating cost would also arise besides a considerable maintenance requirement. However, if the 5 m long working chamber 12, as shown, is divided into five partial chambers 32 or segments, which are bounded by respective separating trays 30, only a pressure drop of about 1 bar (i.e. ca. 1 bar/m) arises at each individual one of these separating trays 30, whereby the working chamber 12 and an adsorption system 10 equipped with it can be permanently stably operated without destruction of the sorption agent arranged in the partial chambers 32. Generally, it is advisable to use working chambers 12 with a length between 1 m and 5 m, wherein a separating tray 30 is preferably provided after each meter to prevent crushing of the sorbent.

Similarly, it is not only possible to fill identical sorption agent types, but also different sorption agent types into the individual partial chambers 32, wherein either a monovarietal sorption agent or a sorption agent mixture can be provided in each partial chamber 32. Hereby, the adsorption characteristics of the entire working chamber 12 can be optimally adapted to the respective separating task. For example, reversed phases can be provided in partial chambers 32 upstream with respect to a loading direction, while normal phases and/or polar bound phases are arranged as sorption agent in downstream partial chambers 32. Inverse arrangements, that is first normal phase(s)/polar phase/(s) in loading direction and subsequently reversed phase(s) as well as alternating arrangements are of course also conceivable.

Figure 18:
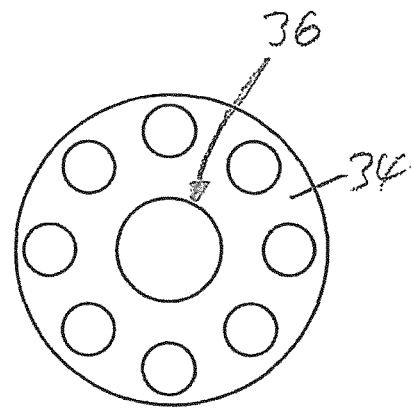
FIG. 18 a schematic top view of a DIN flange.
Figure 19:
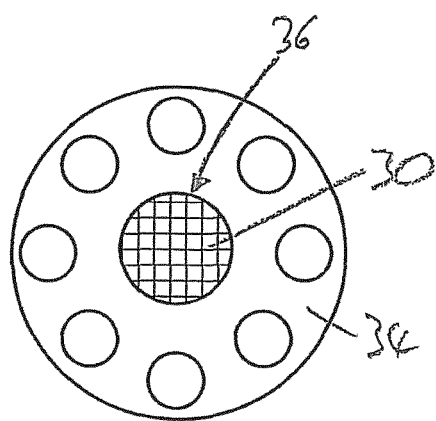
FIG. 19 a schematic top view of the DIN flange, wherein a separating tray is welded into a passage opening.

FIG. 18 shows a schematic top view of a DIN flange 34, via which correspondingly formed pipe segments can be connected to each other to provide a working chamber 12 with two or more partial chambers 32. One recognizes that the flange 34 has a central passage opening 36, into which a separating tray 30 can be inserted. Hereto, FIG. 19 shows a schematic top view of the flange 34, wherein a separating tray 30 formed as a sieve tray is inserted in the passage opening 38 and welded to the flange 34 to ensure a particularly permanent and loadable connection.

Figure 20:
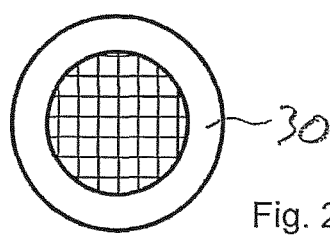
FIG. 20 a schematic top view of the separating tray.

FIG. 20 shows a schematic top view of the separating tray 30, which is exemplarily formed as a sieve tray. The mesh size of the separating tray 30 is adapted to the grain size of the sorption agent in a manner known per se, such that it is reliably retained without preventing the fluid flow through the separating tray 30. Alternatively to a sieve tray, the separating tray 30 can also include sintered material with a typical pore size of about 40-150 µm.

Figure 21:
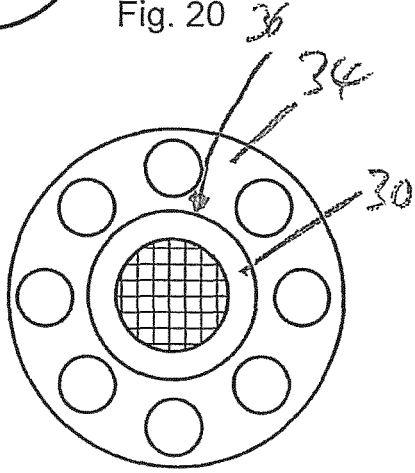
FIG. 21 a schematic top view of the DIN flange, wherein the separating tray is inserted in the middle of the seal across the passage opening.

FIG. 21 shows a schematic top view of the DIN flange 34, wherein the separating tray 30 is inserted in a slightly extended passage opening 36 or can also be inserted in a sealing ring and is thus retained in the center of the flange 34 across the passage opening 36 by this sealing ring. In contrast to a firmly bonded connection, the separating tray 30 can be easily replaced or exchanged and for example be adapted to different sorption agent size distributions in this arrangement.

Figure 22:
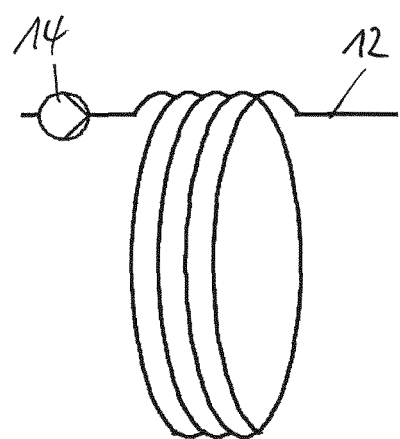
FIG. 22 a schematic representation of a spiral working chamber.

FIG. 22 a schematic representation of a spiral working chamber 12 for an adsorption system 10 according to the invention. One recognizes that the tubular working chamber filled with sorption agent is formed comparatively long and at the same time thin such that a ratio of diameter:length is <0.3. For example, the working chamber can be at least 250 cm long and have an internal diameter of 5 cm, whereby a ratio of diameter:length of 0.02 results. By the spiral configuration, the working chamber 12 is particularly compact and space saving and moreover can correspondingly be simply tempered. Furthermore, one recognizes that the working chamber 12 is coupled to a single pumping device 14, by means of which liquids and/or gases can be pumped through the working chamber 12.

Figure 23:
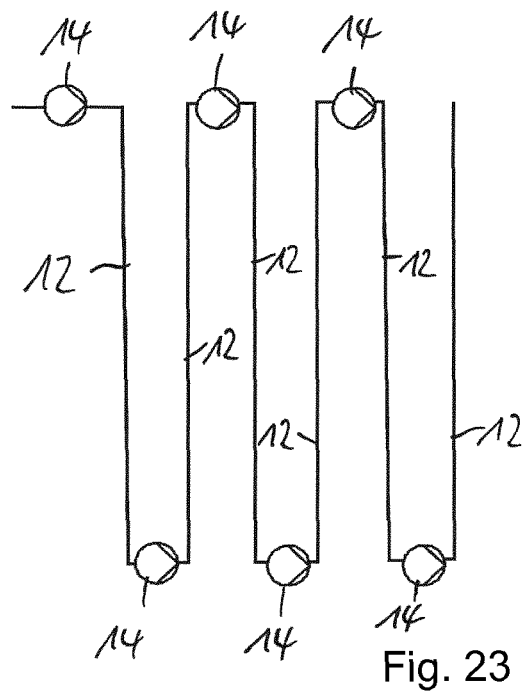
FIG. 23 a schematic representation of multiple working chambers arranged in zigzag-shaped manner with one pumping device per turn.

FIG. 23 shows a schematic representation of multiple zigzag-shaped arranged or alternatingly ascending and descending working chambers 12 with each one pumping device 14 per turn or per working chamber 12. The working chambers 12 are each predominantly linearly formed with angled end areas and constitute a type of pipe bundle. Thereby, six working chambers 12 and six pumping devices 14 arise in the present embodiment, wherein a varying number of working chambers 12 and/or pumping devices 14 can basically also be provided. Hereby, pressure and pumping losses over the long working chambers 12 can be particularly simply compensated for. For example, the individual working chambers 12 can have lengths between 2 m and 20 m independently of each other. In the present case, the working chambers are each 2 m long such that related to the total length of all of the working chambers 12 of presently 12 m, a further pumping device 14 is respectively provided after 2 m, 4 m, 6 m, 8 m and 10 m. In this manner, the working chambers 12 can be equally well traversed in both directions, for example in one direction in the adsorption mode and in the opposite direction in the desorption mode. Moreover, it can be operated with relatively low pressure differences of respectively less than 5 bar, in particular less than 2 bar, whereby more inexpensive pumps can be used on the one hand and the lifetime of the sorption agent is increased on the other hand.

Figure 24:
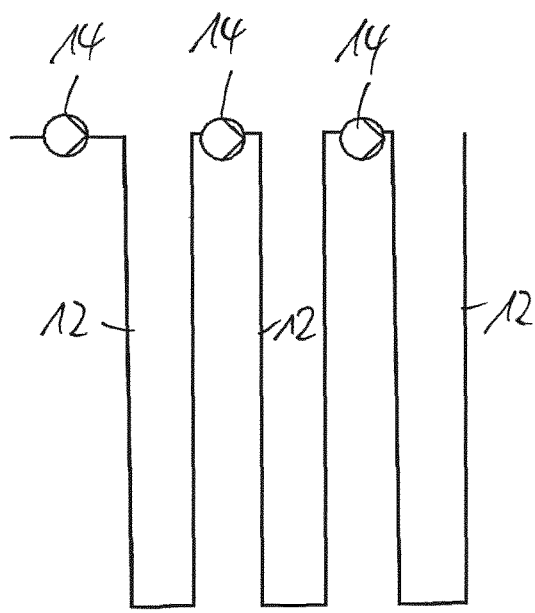
FIG. 24 a schematic representation of multiple working chambers arranged in zigzag-shaped manner with a pumping device for every other turn.

FIG. 24 shows a schematic representation of multiple zigzag-shaped arranged working chambers 12, wherein the working chambers are not substantially linear in contrast to the preceding embodiment, but each have a turn. Accordingly, only three substantially U-shaped working chambers 12 and three pumping devices 14 are present in the shown embodiment, wherein a varying number of working chambers 12 and/or pumping devices 14 can be provided in this case too.

Figure 25:
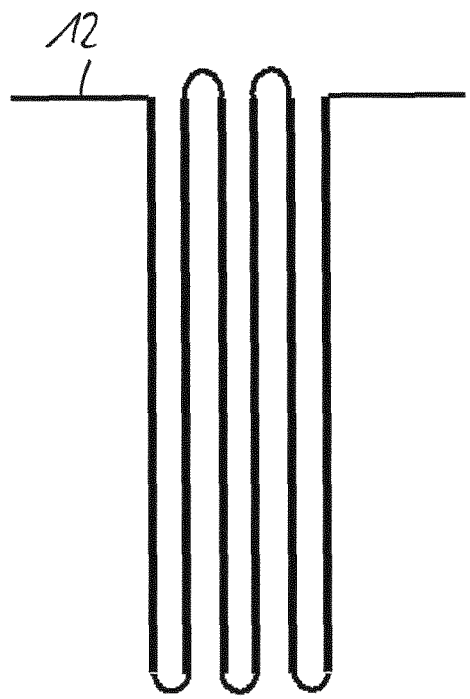
FIG. 25 a schematic representation of a meandering working chamber without pumping devices.

FIG. 25 shows a schematic representation of a meandering working chamber 12 without pumping devices 14. The working chamber 12 includes five turns in the embodiment, wherein a varying number of turns can be provided in this case too. In contrast to the previous embodiments, the turns are not cornered, but rounded, whereby the capability of filling of the working chamber 12 and the exchange of the sorption agent, respectively, are facilitated in some cases.

Figure 26:
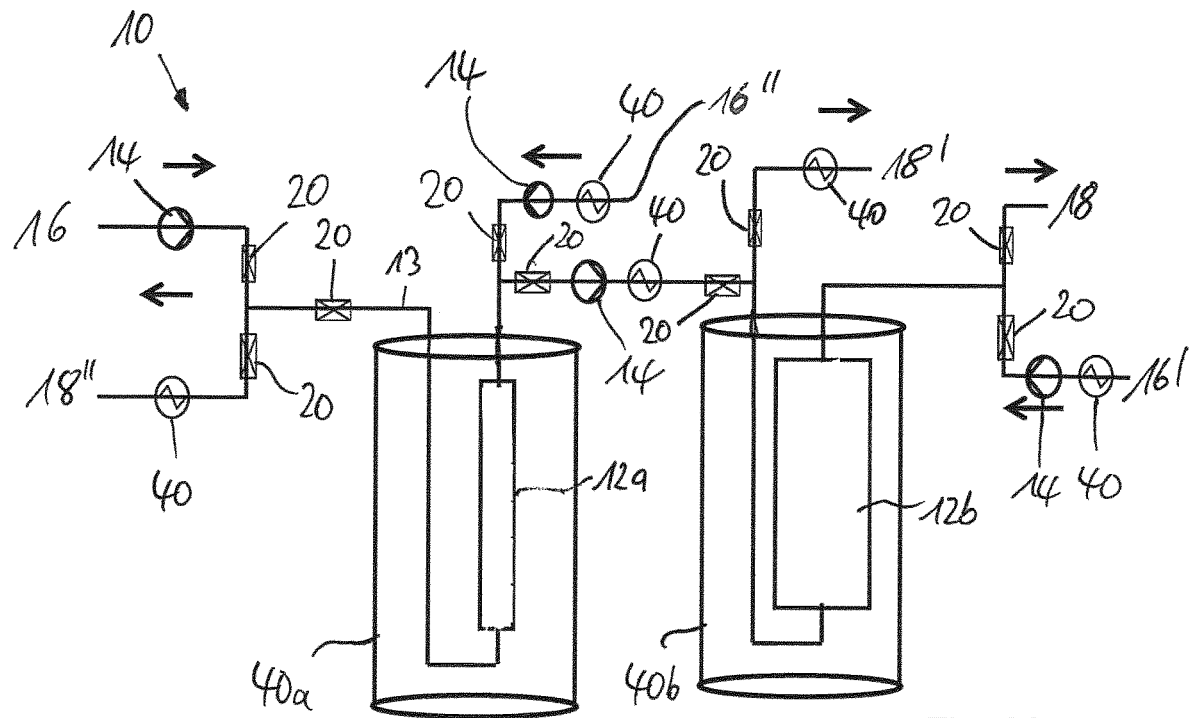
FIG. 26 a schematic diagram of a further embodiment of the adsorption system according to the invention.
Figure 27:
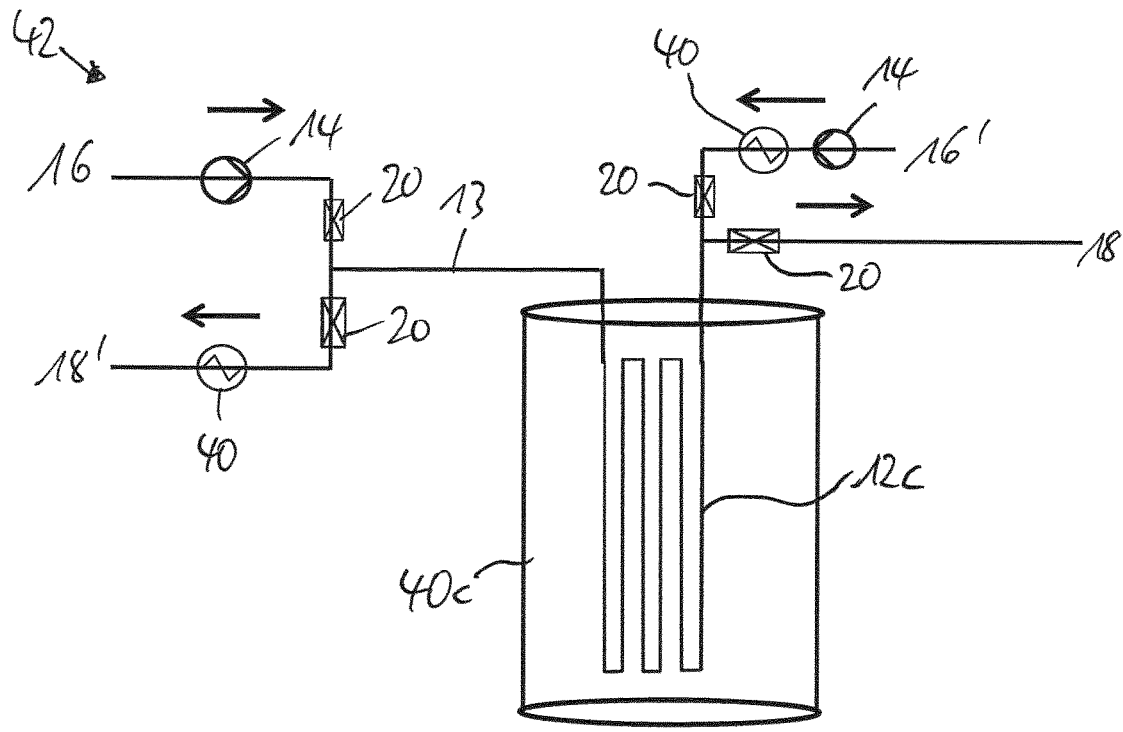
FIG. 27 a schematic diagram of a high concentration device according to the invention.

FIG. 26 shows a schematic diagram of a further embodiment of the adsorption system 10 according to the invention, wherein FIG. 26 only shows a first accumulation stage of the adsorption system 10, while a second, basically optional accumulation stage is shown in FIG. 27. The first accumulation stage of the adsorption system 10 includes two groups of sorbent-filled working chambers 12a, 12b, through which a flavoring substance-containing fluid, for example a distillate, pump sealing water and/or a membrane permeate, is conducted from a dealcoholizing plant and therein the flavoring substances contained in the fluid are sorbed in the adsorption mode. The working chambers 12a, 12b can also be composed of multiple partial chambers 32 or bundles of working chambers 12 independently of each other.

In the first working chamber 12a, which has a lower volume than the second working chamber 12b, non-polar flavoring substances are predominantly bound, while the polar flavoring substances are predominantly bound in the second working chamber 12b. The geometric conditions of the working chambers 12a, 12b determine the amounts of flavoring substances respectively bound there.

Each working chamber 12a, 12b can for example be at least 2.5 m long, wherein lengths of 6 m, 16 m, 20 m, 50 m, 70 m, 100 m or more or corresponding intermediate lengths are also conceivable. Furthermore, it can be provided that one or more working chambers 12a, 12b are divided into two or more partial chambers, wherein a total length is always at least 2.5 m. The number of pumping devices 14 is selected corresponding to the demand and pressure drop, wherein at least one pumping device 14 should be provided per 4 m of working chamber length as a general recommendation. Alternatively or additionally, a pumping device 14 should usually be provided if a pressure drop of 4 bar or more occurs at a percolation rate of 70 ml/min/cm² or more.

The percolation rate of the first working chamber 12a should be set to about 50-100 ml/min/cm². The diameter or the average cross-sectional thickness of the first working chamber 12a is selected corresponding to the desired flow. The diameter or the average cross-sectional thickness of the second working chamber 12b is about 4 to 10 times larger than that of the first working chamber 12a. Generally, a ratio of average cross-sectional thickness or diameter to length is at most 0.3 and preferably between 0.04 for large flow rates and 0.0002 for low flow rates in each working chamber 12a, 12b.

One recognizes that the working chambers 12a, 12b are arranged in respective tempering devices 40a, 40b presently formed as immersion baths, by means of which the temperature of the working chambers 12a, 12b and of the sorption agents located therein, respectively, can be adjusted. In the adsorption mode, a temperature (e.g. 40° C. or more) increased with respect to the room temperature (25° C.) is adjusted in the working chamber 12a by means of the tempering device 40a, while a lower temperature (e.g. 39° C. or less) than in the working chamber 12a is adjusted in the working chamber 12b by means of the tempering device 40b. Hereby, an at least substantially complete adsorption of all of the flavoring substances is achieved.

Inversely, a temperature in the range of the room temperature or cooler (up to 0° C. or less) is adjusted in the working chamber 12a by means of the tempering device 40a in the desorption mode, while a temperature (e.g. 30° C. or more) above the room temperature is adjusted in the working chamber 12b than in the working chamber 12a by means of the tempering device 40b. Alternatively, a temperature increased with respect to the room temperature can also be adjusted in the working chamber 12a in the desorption mode. Hereby, an at least substantially complete desorption of all of the adsorbed flavoring substances is achieved.

One recognizes that the adsorption system 10 includes further tempering devices 40 arranged upstream viewed in flow direction and between the working chambers 12a, 12b in or on the conduit system 13, by means of which the fluid and/or the desorption agent can be tempered as required in the adsorption and desorption mode. Furthermore, multiple valve devices 20 are provided in the conduit system 13, by means of which different fluid paths can be switched as required in the adsorption and desorption mode.

In the adsorption mode, a flavoring substance-containing, aqueous fluid from the brewing industry with an ethanol content between 0% by vol. and 50% by vol. is first pumped through the inlet 16 to the first working chamber 12a. Therein, the first working chamber 12a is heated by means of the tempering device 40a, for example to temperatures of 40° C. or more. The already partially deflavored fluid is cooled downstream of the first working chamber 12a, for example to 25° C. or less, and gets into the second working chamber 12b, which has a larger volume and thereby a larger amount of sorbent with higher binding capacity than the first working chamber 12a, such that inferiorly adsorbing flavoring substances, for example 2-phenylethanol and 3-methylbutane-1-ol, are also reliably sorbed. After the second working chamber 12b, the deflavored aqueous permeate is removed through the outlet 18 and can be discarded or used for producing staple and luxury food items, which are not to have a beer-typical flavor.

Subsequently, the adsorption system 10 is operated in the desorption mode, to recover the adsorbed flavoring substances as a flavoring substance concentrate. Hereto, a first desorption agent, which can for example be ethanol, water or a combination or a gradient herefrom, is conducted into the second working chamber 12b through the inlet 16'. A high water portion above 50% by vol., in particular of more than 95% by vol., including 100% by vol., is preferred.

The desorption agent can be tempered by means of the tempering device 40 arranged downstream of the inlet 16', wherein the temperature is selected depending on the composition of the desorption agent. Usually, a temperature above 30° C. is adjusted. Therein, it can be provided that the temperature is adjusted to values between 70° C. and 100° C. or up to 120° C. or more such that the desorption agent for example includes or is water vapor. Alternatively, the desorption agent can be pressurized such that liquid water with a temperature of 120° C. can for example be used as the desorption agent at a pressure of about 2 bar.

The desorption agent volume, which is pumped through the second working chamber 12b, approximately corresponds to the 5- to 20-fold internal volume, which the second working chamber 12b has on a length of about 2 m to about 4 m.

Therein, it can be provided that the temperature varies during the desorption, in particular is continuously or gradually increased. This allows the increase of the separating effect and a selective desorption of easily desorbable flavoring substances, e.g. alcohols (C3-C6) or ethyl acetate or of flavoring substances with a low log Pow (log Pow<2.0) at low temperatures and subsequently the elution of non-polar compounds such as e.g. longer-chain esters and flavoring substances with a log Pow>2.0 at higher temperature.

Therein, in an embodiment, the valve devices 20 are switched by means of a control device not illustrated for reasons of clarity such that the desorption agent accumulated with desorbed flavoring substances is partially or completely removed through the outlet 18' as a first flavoring substance concentrate and accordingly is not or not completely conducted through the first working chamber 12a. Therein, it can be provided that the flavoring substance concentrate is cooled by means of the tempering device 40 arranged in the area of the outlet 18' to prevent possible flavor losses.

For desorption of the flavoring substances sorbed in the first working chamber 12a, a further desorption agent is introduced through the inlet 16", pumped through the first working chamber 12a and removed from the adsorption system through the outlet 18" as a further flavoring substance concentrate. The further desorption agent can for example be ethanol, water or a combination or a gradient herefrom, wherein a high ethanol portion above 50% by vol., in particular between 65% by vol. and 96% by vol. or more is preferred. The desorption agent volume approximately corresponds to the one- to three-fold internal volume, which the first working chamber 12a has on a length of 2 m to 4 m.

The first and the further flavoring substance concentrate are collected and can then be partially or completely combined, wherein the entire flavor of the original fluid is at least approximately completely recovered by a complete combination. Alternatively, the first and the further flavoring substance concentrate can be used or further processed independently of each other to modify the flavor profile. The two-stage design of the adsorption system 10 thereby allows additional possibilities to the benefit of the specific accumulation or depletion of certain flavoring substances or flavoring substance groups.

The application of water for desorption of difficultly sorbable flavoring substances in the second working chamber 12b saves ethanol and allows higher accumulation of flavoring substances. Inversely, by application of ethanol or desorption agents with high ethanol portion in the first working chamber 12a for desorption of easily sorbable flavoring substances, they are completely desorbed, which often only partially succeeds or requires large volumes with pure water. The two-stage design additionally allows that particularly high accumulation factors can be achieved. One working chamber 12a alone often cannot receive a large initial volume of flavoring substance-containing fluid in an economically reasonable time on the one hand and at the same time generate a low extract volume. For example, with an accumulation by a factor of 3000, ca. 3000 liters would have to be delivered through the adsorption system 10 on the one hand, but only ca. 1 liter of flavoring substance concentrate would have to be extracted.

The use of hot water or water vapor can also be referred to as high-temperature method. Thereby, all of the technological difficulties are omitted, which are related to the handling of organic solvents, such as e.g. flammability, explosion hazard, health hazard, environmental impacts, waste disposal and regulatory limits in the employment in the food and beverage industry. Usually, an organic solvent is employed to again release flavoring substances bound on the sorbent. All of the usual analytical applications of sorbents and also various industrial processes also function on this principle. However, by application of water for desorption with simultaneous application of heat, the binding of flavoring substances on the sorption agent can be cancelled.

Thereby, the requirement of using organic solvents, in particular ethanol, is omitted. The admixture of low portions of organic desorption agents, can be contemplated in the individual case to control the desorption to the effect that non-polar substances eluate earlier. Usually, polar substances with low log $P_{ow}$ are faster desorbed than those with higher log $P_{ow}$. Examples for beer-typical polar substances include 2-methylpropane-1-ol, 2-methylbutane-1-ol, 3-methylbutane-1-ol, ethyl acetate and 2-phenylethanol. In many cases, it is advantageous to load the sorbent at low temperatures (0-30° C.) and to unload it at correspondingly considerably higher temperatures (80-100° C.). The use of water as the desorption agent offers the additional advantage that the resulting flavoring substance concentrate is nearly or completely ethanol-free such that the flavoring substance concentrate can be particularly well used for flavoring and reflavoring, respectively, alcohol-free beers, including beers with an alcohol content <0.045% by vol., since the obtained water phase flavor can be returned to the dealcoholized beer in any amount. In other words, all flavoring substances in the flavoring substance concentrate are preferably accumulated compared to the flavoring substance-containing fluid at least related to the ethanol content and preferably also with respect to the volume, that is in their concentration. In this sense, ethanol is not understood as a flavoring substance.

A further possibility is in the addition of solids, acids and/or bases in the adsorption and/or desorption mode. This allows control of the pH value and increase of the sorbent capacity by salt or other solids soluble in the fluid and/or desorption agent. By an only temporary employment of these additives, the desired effect can be specifically attenuated and thereby controlled. Thus, certain substances can be specifically accumulated or depleted, e.g. organic acids can usually not or predominantly not sorbed upon application of a pH value above about 8 or if they are present in the deprotonated form. Inversely, nitrogen-containing organic compounds cannot or not predominantly be sorbed by adjusting a pH value below about 5 or if they are present in the protonated form.

In an alternative operating mode of the adsorption system 10, the second working chamber 12b is first subjected to hot water as the desorption agent in the desorption mode. In the transition from the second working chamber 12b to the first working chamber 12a, the hot water already accumulated with flavoring substances is introduced into the first working chamber 12a in cooled manner. Thereby, accumulation of those flavoring substances is achieved in the first working chamber 12a, which could migrate into the second working chamber 12b of the plants in the adsorption mode or during the sorption phase.

Subsequently, a desorption of all of the flavoring substances sorbed in the first working chamber 12a by means of ethanol or another suitable desorption agent or desorption agent mixture or gradient is effected. By this method, one achieves a particularly high concentration of flavoring substances in a comparatively small volume, which can subsequently be transferred to an extract with correspondingly high flavoring substance concentration.

FIG. 27 shows a schematic diagram of a high concentration device 42 according to the invention, which is basically optional and can also be referred to as second accumulation stage of the adsorption system 10. The high concentration device 42 includes an inlet 16, through which a flavoring substance concentrate of the first accumulation stage is introduced in an adsorption mode of the high concentration device 42. In case of the above described two- or multi-stage design of the first accumulation stage, the flavoring substance concentrate can be obtained by combining all of the arising flavoring substance (partial) concentrates of the first accumulation stage. Alternatively, only a part of the flavoring substance concentrate or the flavoring substance (partial) concentrates of the first accumulation stage or a certain mixture thereof can be used as the starting material of the second accumulation stage. Alternatively or additionally, it is possible to first adjust the ethanol content of the first flavoring substance concentrate, for example to a value between 2.5% by vol. and 17% by vol. Optionally, this can be effected by addition of ethanol and/or water, in particular brewing water. Hereby, the adsorption of certain flavoring substances on the sorption agent can be improved on demand.

The flavoring substance concentrate is then conducted through a working chamber 12c tempered to a temperature between 0° C. and 30° C. by means of a tempering device 40c, which is filled with a sorption agent and can basically also be referred to as extraction pipe. The deflavored permeate is then discharged through the outlet 18 and can be discarded or further used as described above.

In a desorption mode, a desorption agent, for example ethanol, water or water vapor or any mixture herefrom, is then conducted through the working chamber 12c tempered to a temperature above 60° C. through the inlet 16' in opposite direction such that a second flavoring substance concentrate can be collected via the outlet 18', in which all of the flavoring substances are preferably accumulated compared to the first flavoring substance concentrate at least related to the ethanol content and preferably also with respect to the volume, that is in their concentration. In the area of the outlet 18', a basically optional tempering device 40 is arranged, by means of which the second flavoring substance concentrate can be cooled to prevent undesired alterations of the flavor profile.

The valve devices 20, the tempering devices 40 and the subjection of the sorption agent in the working chamber 12c to the respective fluids can also be controlled or adjusted by the control device of the adsorption system 10 not illustrated for reasons of clarity. In case of the high concentration device 42, there is also the possibility of adding solids, acids and/or bases in the adsorption and/or desorption mode. Here too, this allows controlling the pH value and increasing the sorbent capacity by salt or other solids soluble in the first flavoring substance concentrate and/or desorption agent. By an only temporary employment of these additives, the desired effect can be specifically attenuated and thereby controlled. Thus, certain substances can be specifically accumulated or depleted, e.g. organic acids can usually not or predominantly not sorbed with application of a pH value above about 8. Inversely, amino compounds cannot or predominantly not sorbed by adjusting a pH value below about 5.

The advantage of the high concentration device 42 is in that it can basically be constructed identical or similar to the first accumulation stage of the adsorption system 10, but that the working chamber 12c can be smaller dimensioned and a varying sorption agent can optionally be used. Thereby, very highly concentrated (factor 200 or more related to the fluid) flavoring substance concentrates can then be produced with recovery of even polar flavoring substances.

Flavoring substances are differently strongly bound by sorption agents. In addition, the capacity of the sorption agent is characteristic and different for flavoring substances. During the loading of the sorption agent with a fluid containing flavoring substances, flavoring substances differently deeply penetrate the sorbent bed and are differently strongly sorbed on it, respectively, corresponding to their amount and characteristic. For this reason, in particular flavoring substances, which are important for the character of staple and luxury food items (beer and wine) obtained by fermentation, deeply penetrate the sorbent bed. In order to ensure a complete recovery of flavoring substances and to avoid breakthrough of substances during the loading phase, a correspondingly long, but at the same time relatively thin or narrow sorbent bed is provided according to the invention. The exact length of the sorbent bed can be adapted to the respective requirements with respect to type and amount of important flavoring substances by experiments customary according to the state of the art. In case of beer, in particular 2-methylbutane-1-ol, 3-methylbutane-1-ol, 2-methylpropanol and ethyl acetate are important flavoring substances, which have to be recovered for taste reasons to achieve an authentic, beer-typical flavor profile.

However, the simultaneous recovery of polar and non-polar flavoring substance was technically not possible heretofore since commercial extraction cells have a maximum length of few centimeters to about 1 m. However, this bed height is not sufficient at all to achieve the desired effect of an authentic image with high concentration factors. In contrast thereto, it is possible with the aid of the adsorption system 10 according to the invention to recover besides non-polar flavoring substances also up to 100% of even highly polar flavoring substances such as for example 2-methylbutane-1-ol, 3-methylbutane-1-ol, 2-methylpropanol and ethyl acetate (Log $P_{ow}$=0.73).

In particular by application of the above described two- or multi-stage method with a large-volume first accumulation stage for accumulation by a factor of up to 300 or more and a high concentration device 42 in a small second accumulation stage by a factor of up to 10 or more, firstly, high accumulation factors with at the same time recovery of polar flavoring substances can be achieved, and secondly, the starting material for the second accumulation stage can for example be adjusted with respect to the pH value such that undesired flavoring substances (acids, amines, sulfides etc.) are optionally conducted past the sorption material in deprotonated or protonated form and can be disposed of with the permeate. Thereby, such a pH adjustment does not have to be necessarily performed on the fluid of the first process step and the permeate of the first accumulation stage can be supplied to a further use in its authentic composition, e.g. as an ethanolic basis for alcoholic beverages without beer taste. Inversely, upon use of an ion exchanging sorption material, it is possible to predominantly or exclusively adsorb the deprotonated and protonated compounds, respectively, while the non-ionic flavoring substances can be collected in the permeate.

A further merit of the two or multi-stage design is in that the process duration in case of a high concentration can be below the comparable duration of an adsorption system 10 with a single working chamber 12, since correspondingly thin pipes would have to be used and a correspondingly long loading time with comparatively high pressure differences would result. In addition, in particular polar substances would migrate very long time through the sorbent bed (chromatographic effect) in such a plant such that the bed length would be even higher.

The advantage of a recovery with hot water is in particular advantageous in the production of a flavoring substance concentrate (flavoring extract) for a beer (or a wine) with an alcohol content of 0.0% by vol. with respect to the recovery with ethanol since the ethanol amount does not have to be strictly controlled in mixing. A long sorbent path through relatively thin pipes is in particular also advantageous upon application of a flavoring substance desorption with (hot) water or water vapor since long, thin working chambers 12 can be considerably faster tempered than short, thick working chambers 12.

Usually, those staple and luxury food items are comprehended as alcohol-free, the alcohol content of which is below 0.5% by vol. of ethanol. In these staple and luxury food items, ethanolic flavoring substance concentrates with a relatively low accumulation factor can also be used for flavoring since comparatively large volumes of flavoring substance concentrate can be added starting from an alcohol content of for example 0.4% by vol. without the limit of 0.5% by vol. being exceeded. However, if the staple and luxury food item is to have an alcohol content of 0.1% by vol. or even 0.0% by vol., the actual alcohol content has to be considerably lower, for example below 0.045% by vol. of ethanol, which presents severely increased requirements to the technology. Without the use according to the invention of particularly long and at the same time relatively thin sorbent beds, this demand with simultaneous recovery of a sensorially relevant amount of flavoring substances cannot be satisfied. Without the use of a correspondingly long and comparatively thin sorbent bed, the required residual content of ethanol can be easily achieved for example upon a desorption with (hot) water or water vapor, but not the recovery of the important polar flavoring substances, whereby an authentic and in particular a beer-typical flavor profile would not be given. Inversely, the desired low alcohol content of 0.1% by vol. or less in the end product cannot be satisfied a priori with conventional short, thick extraction cells and the use of ethanol as the desorption agent.

Figure 28:
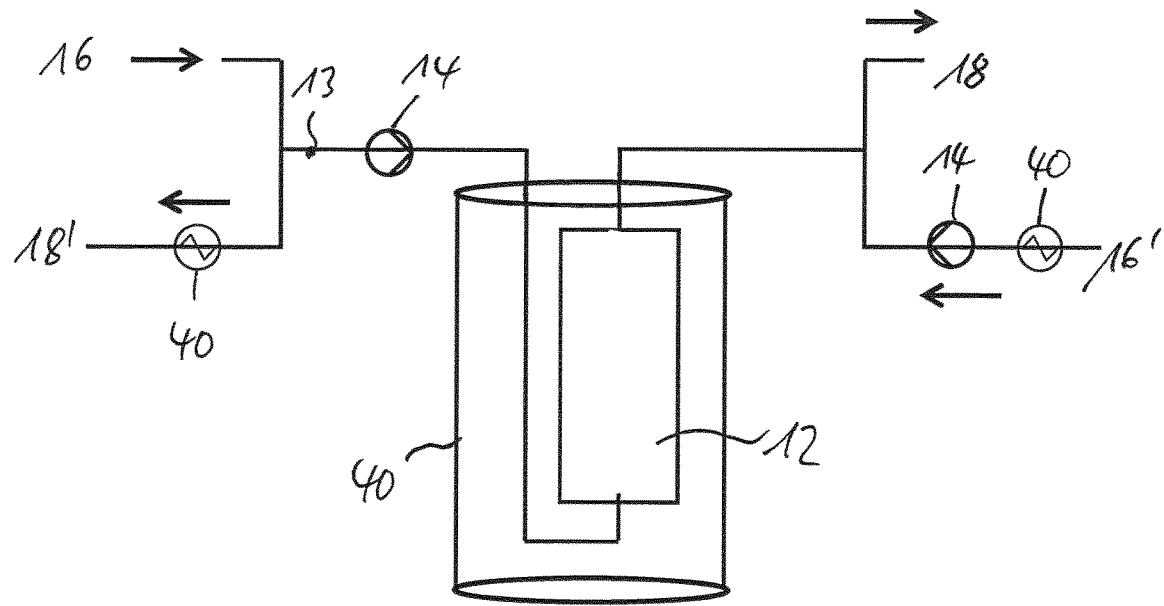
FIG. 28 a schematic diagram of a further embodiment of the adsorption system according to the invention.

FIG. 28 shows a schematic diagram of a further embodiment of the adsorption system 10 according to the invention, wherein valve devices 20 are not illustrated for reasons of clarity. The adsorption system 10 is one-stage constructed and includes only one temperable working chamber 12, which is filled with a sorption agent. In the adsorption mode, a flavoring substance-containing fluid from the brewing trade with an ethanol content of 0 to 40% by vol. is introduced into the conduit system 13 through the inlet 16 and conducted through the working chamber 12 tempered to 0° C.-35° C. The deflavored permeate is discharged through the outlet 18. In the desorption mode, a desorption agent (e.g. water) tempered to 50° C.-100° C. is introduced into the conduit system 13 through the inlet 16' and conducted through the working chamber 12 in opposite flow direction. The temperature can optionally be increased during the desorption process. The resulting flavoring substance concentrate is pre-cooled in the area of the outlet 18' by the tempering device 40. Therein, it can basically be provided that two or more fractions are collected and mixed in specific manner, that is by discarding at least a part of one or more fractions, to adjust the flavor profile of the flavoring substance concentrate.

Here too, there is the possibility of an addition of solids, acids and/or bases in the adsorption and/or desorption mode. This allows controlling the pH value and increasing the sorbens capacity by salt or other solids soluble in the fluid and/or desorption agent. By an only temporary employment of these additives, the desired effect can be specifically attenuated and thereby controlled. Thus, certain substances can be specifically accumulated or depleted, e.g. organic acids usually cannot or predominantly not be sorbed upon application of a pH value above 8. Inversely, amino compounds cannot or predominantly not be sorbed by adjusting a pH value below about 5.

Figure 29:
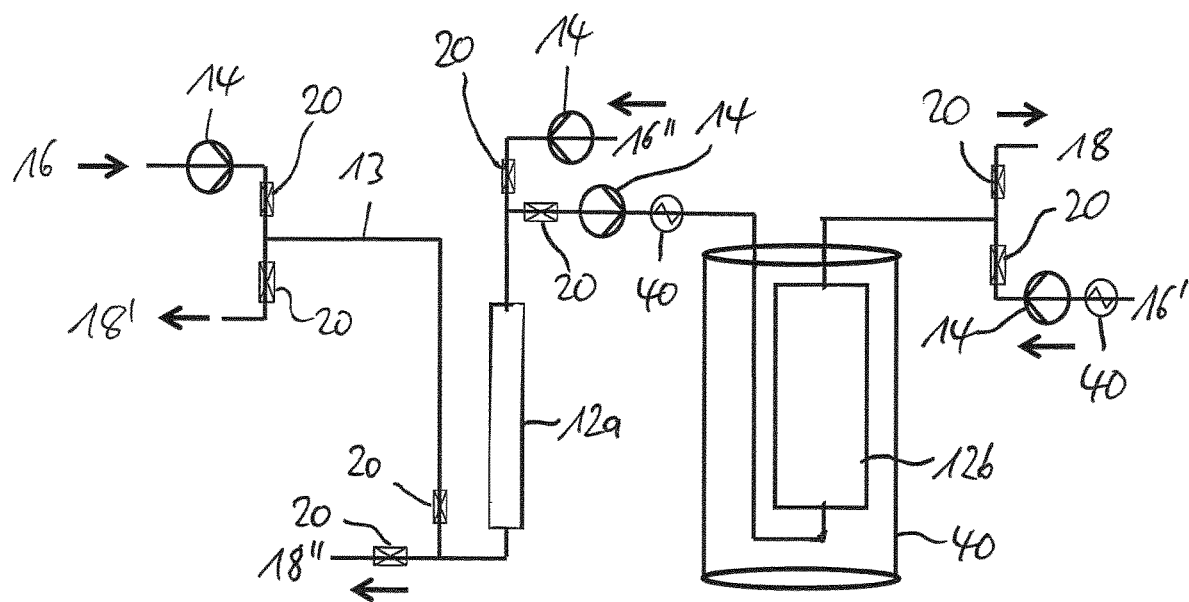
FIG. 29 a schematic diagram of a further embodiment of the adsorption system according to the invention.

FIG. 29 shows a schematic diagram of a further embodiment of the adsorption system 10 according to the invention. The construction of the adsorption system 10 largely corresponds to that of the embodiment shown in FIG. 26. In contrast to the embodiment shown in FIG. 26, the first working chamber 12a is not disposed in an immersion bath and not provided with a tempering device 40, respectively. In contrast to the embodiment shown in FIG. 26, the flavoring substance concentrate exiting the working chamber 12a can be selectively removed via the outlet 18' or via the outlet 18" in the desorption mode. This allows simple fractionation, wherein a predominantly ethanolic eluate can for example be removed from the beginning of the working chamber 12a through the outlet 18" and a predominantly aqueous eluate can be removed from the end of the working chamber 12a through the outlet 18' or vice versa. It is understood that varying constructive variations are also conceivable.

Figure 30:
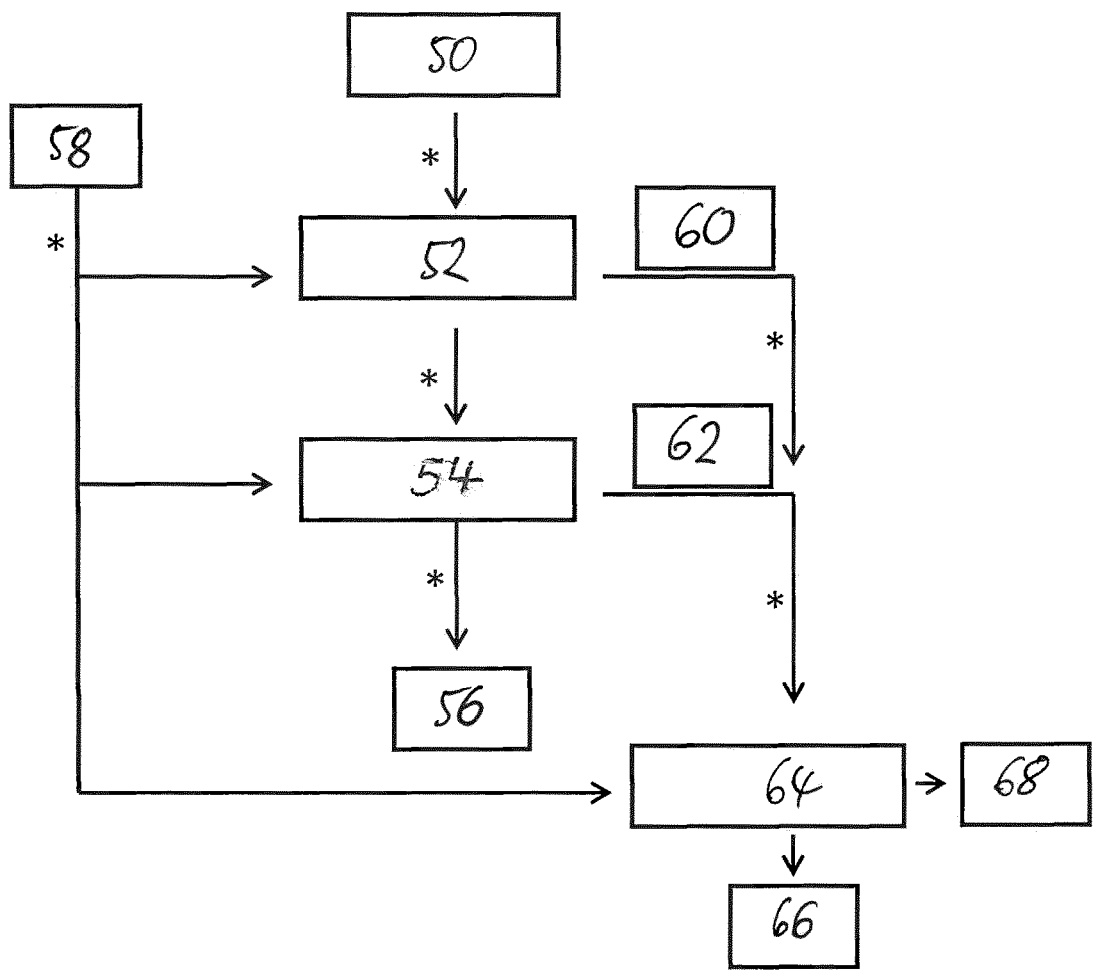
FIG. 30 a simplified flow diagram of a method procedure for producing a flavoring substance concentrate with a beer-typical flavor.

FIG. 30 shows a simplified flow diagram of a method procedure for producing a flavoring substance concentrate with a beer-typical flavor using an adsorption system 10 according to the invention. In a first step 50, a flavoring substance-containing, aqueous fluid from the brewing industry is provided and conducted through a first working chamber 12 filled with sorption agent in step 52. Optionally, one or more further working chambers 12 downstream of the first working chamber 12 can be traversed by the fluid in step 54. In step 56, a partially or completely deflavored permeate is obtained, which can be discarded or otherwise used. In step 58, one or more desorption agents, desorption agent mixtures and/or desorption agent gradients are provided and used for desorption of the flavoring substances, which are still present adsorbed on the sorption agent in the working chamber or chambers. Hereby, one or more flavoring substance concentrates are obtained in step 60 or optionally also 62, which can each be collected in 1, 2, 3, 4, 5, 6, 7, 8, 9, 10 or more fractions. One, multiple or all of the fractions can be subjected to a basically optional high accumulation with the aid of a high concentration device 42 in step 64. The result of such a high accumulation is a permeate separated in step 66 as well as a second flavoring substance concentrate, which is collected in step 68. Therein, all of the flavoring substances in the second flavoring substance concentrate are preferably accumulated compared to the first flavoring substance concentrate (step 60 and/or 62) at least related to the ethanol content and preferably also with respect to the volume, that is in their concentration. In this sense, ethanol is not understood as a flavoring substance. Alternatively, some flavoring substances can be specifically depleted, for example to remove incorrect flavors or to optimally consider the already present flavor profile of a staple and luxury food item, with which the flavoring substance concentrate is to be mixed. A possibility of modulating the desorption behavior is the addition of soluble substances and/or the adjustment or variation of the pH value. This is possible in or before the steps marked by an asterisk symbol independently of each other, wherein any combinations can be provided herein.

According to a further embodiment, a flavoring substance-containing, aqueous fluid from the brewing industry is provided in a first step and conducted through a first working chamber 12a filled with sorption agent in a following step. The adsorbed flavoring substances are first desorbed only with (optionally hot) water as the desorption agent in a following step. Subsequently, the sorption agent in the working chamber 12a is subjected to ethanol as the desorption agent. In other words, a step gradient of water-ethanol is used as the desorption agent. The obtained desorbates (water-ethanol) are separately collected in at least 2 fractions. The portion desorbed by means of water of the flavoring substance concentrate can be employed for reflavoring dealcoholized beer without further processing since larger amounts can also be added without varying the ethanol content.

The portion of the flavoring substance concentrate desorbed by means of ethanol can optionally be diluted with water (brewing water) to a predetermined ethanol content and be supplied to a high concentration device 42. There, the ethanolic first flavoring substance concentrate is sorbed and subsequently correspondingly highly accumulated in ethanol as the second flavoring substance concentrate by means of desorption with ethanol. Due to the high concentration factors of up to 2000 or more, low amounts of second flavoring substance concentrate corresponding to the low-alcohol/alcohol-free beer can be used for generating a desired flavor profile such that the resulting ethanol amount or concentration does not exceed the allowed maximum amounts in the dealcoholized beer product. Alternatively or additionally, the high concentration device 42 can also be desorbed by means of optionally hot water and/or water vapor. By the employment of this method, in particular non-polar and difficultly sorbable flavoring substances, but easily desorbable by means of hot water can be largely quantitatively obtained in the first step, while the easily sorbable non-polar substances are most largely quantitatively obtained in the high accumulation phase. Thereby, it is also achieved that difficultly sorbable substances are most largely quantitatively removed already before the high accumulation stage and accordingly either cannot be lost in this step. Thereby, it is additionally achieved that the required plant size of the high concentration device 42 for high accumulation is minimized and correspondingly higher accumulation factors can be achieved.

A methodology for analyzing the flavoring substance profile of beer or beer-containing beverages via GC/MS is indicated in the following table 2. The measurement results can be used to determine that volume of flavoring substance concentrate, which has to be added to a dealcoholized or fermentation-halted beer to generate or restore a desired, in particular full beer-like flavor profile.

TABLE 2

Measurement approach beer analytics

Sample production:

| | |
|---|---|
| 200-250 mg | beer |
| 800 µl | methanol |
| 100 µl | 2,3-dimethoxy toluene 82.4 ppm in DMOT solution (DMOT) |

External calibration, 2-point calibration
Apparatus parameters

| | |
|---|---|
| Autosampler | Auto Injector AOC-20i |
| GC | Shimadzu GC-2010 plus |
| MS | Shimadzu GCMS-QP2010 SE |
| Liner | Liner filled with glass wool of Shimadzu |
| Temperature injector | 230° C. |
| Injection volume | 1 µl |
| Carrier gas helium 4.6 | 35 cm/s |

Furnace program

| | |
|---|---|
| Starting temperature | 30° C. |
| Retention time | 1 min |
| Heating rate | 6° C./min |
| Final temperature | 240° C. |
| Retention time | 5 min | constant pressure/
split injection

| | |
|---|---|
| Head pressure | 45.6 kPa |
| Total flow rate | 34 ml/min |
| Column flow | 1 ml/min |
| Purge flow | 3 ml/min |
| Split ratio | 30 |

Column: FFAP, 30 m × 0.25 mm internal diameter,
0.25 µm film thickness, J&W Scientific
SIM mode
Capture mass spectra EI mode
70 eV

Analytes and internal standard

| Substance name; CAS number | | retention time | target mass | qualifier mass |
|---|---|---|---|---|
| 2,3-dimethoxy toluene; 4463-33-6 | ISTD | 18,650 | 152 | 137 |
| ethyl acetate; 141-78-6 | Target | 2,750 | 43 | 70 |
| ethyl butyrate; 105-54-4 | Target | 4,950 | 88 | 71 |
| isobutanol; 78-83-1 | Target | 6,250 | 43 | 41 |
| isoamyl acetate; 123-92-2 | Target | 6,650 | 70 | 55 |
| 2-methylbutane-1-ol; 137-32-6 | Target | 8,600 | 57 | 70 |
| 3-methylbutane-1-ol; 123-51-3 | Target | 8,660 | 55 | 70 |
| ethyl hexanoate; 123-66-0 | Target | 9,190 | 99 | 88 |
| 2-phenylethylacetate; 103-45-7 | Target | 21,820 | 104 | 91 |
| 2-phenylethanol; 60-12-8 | Target | 23,600 | 91 | 92 |

Peak Area Correction for Co-Eluting Analytes (2-methylbutane-1-ol and 3-methylbutane-1-ol)

The compounds 2-methylbutane-1-ol and 3-methylbutane-1-ol both have each mass fragments at m/z=55 and at m/z=57. These mass fragments each arise in the mass spectrometer (EI, 70 eV) in constant quantity ratios. These ratios are in the following relation to each other: Ratio of the mass fragments m/z=57 to m/z=55 in 2-methylbutane-1-ol: $r_2$=2.941 Ratio of the mass fragments m/z=57 to m/z=55 in 3-methylbutane-1-ol:$r_3$=0.246 Due to the co-elution, peak areas can only be measured on the mass traces m/z=55 to m/z=57, which each contain portions of 2-methylbutane-1-ol and 3-methylbutane-1-ol, $PA_{55}$ and $PA_{57}$. For determining the respective portions of 2-methylbutane-1-ol and 3-methylbutane-1-ol, according to the following formulas (III) and (IV), for 2-methylbutane-1-ol, the peak area obtained on m/z=57 is corrected by that part, which corresponds to the quantity portion of 3-methylbutane-1-ol on the mass 57. For 3-methylbutane-1-ol the peak area obtained on m/z=55 is corrected by that part, which corresponds to the quantity portion on this mass on 2-methylbutane-1-ol:

$$PA_{corrected,Bmethylbutanol,55} = \frac{PA_{57}\ PA_{55} * r_2}{r_3 - r_2} \quad (III)$$

$$PA_{corrected,zmethylbutanol,57} = \left(PA_{55} \frac{PA_{57}\ PA_{55} * r_2}{r_3 - r_2}\right) * r_2 \quad (IV)$$

In the following table 3, the initial values of beer-typical flavoring substances or a so-called "0.0%" beer, that is a beer, which has been brought to an ethanol content of at most 0.045% by vol. or less by fermentation stop and/or dealcoholization, the initial values of beer-typical flavoring substances of an alcohol-free "0.5%" beer (between 0.3 and 0.5% by vol. of ethanol), as well as target ranges of the corresponding flavoring substances, which are achieved by mixing the respective 0.0% or 0.5% starting beer with a flavoring substance concentrate according to the invention, are exemplarily indicated.

TABLE 3

Example for beers mixed with a flavoring substance concentrate

| | "0.0%" beer - flavor content before addition of the flavoring substance concentrate | "0.5%" beer - flavor content before addition of the flavoring substance concentrate | Flavor content of the beer after mixing with the flavoring substance concentrate | |
|---|---|---|---|---|
| | ppm | ppm | ppm Min | ppm Max |
| ethyl acetate; 141-78-6 | 0.000 | 0.05 | 5 | 50 |
| ethyl butyrate; 105-54-4 | 0.000 | 0.000 | 0 | 0.2 |
| isobutanol; 78-83-1 | 0.000 | 0.000 | 5 | 50 |
| isoamyl acetate; 123-92-2 | 0.000 | 0.000 | 0.2 | 5 |
| 2-methylbutane-1-ol; 137-32-6 | 0.000 | 0.05 | 7 | 25 |
| 3-methylbutane-1-ol; 123-51-3 | 0.001 | 0.05 | 10 | 90 |
| ethyl hexanoate; 123-66-0 | 0.000 | 0.000 | 0.05 | 0.35 |
| 2-phenylethylacetate; 103-45-7 | 0.020 | 0.020 | 0.15 | 1.5 |
| 2-phenylethanol; 60-12-8 | 0.4 | 0.2 | 10 | 50 |

Therein, all of the ppm intermediate values of the respective "ppm Min" and "ppm Max" indications are to be regarded as also disclosed. For example, values of 5 ppm, 6 ppm, 7 ppm, 8 ppm, 9 ppm, 10 ppm, 11 ppm, 12 ppm, 13 ppm, 14 ppm, 15 ppm, 16 ppm, 17 ppm, 18 ppm, 19 ppm, 20 ppm, 21 ppm, 22 ppm, 23 ppm, 24 ppm, 25 ppm, 26 ppm, 27 ppm, 28 ppm, 29 ppm, 30 ppm, 31 ppm, 32 ppm, 33 ppm, 34 ppm, 35 ppm, 36 ppm, 37 ppm, 38 ppm, 39 ppm, 40 ppm, 41 ppm, 42 ppm, 43 ppm, 44 ppm, 45 ppm, 46 ppm, 47 ppm, 48 ppm, 49 ppm, 50 ppm as well as corresponding intermediate values as 5.00 ppm, 5.01 ppm, 5.02 ppm, 5.03 ppm, 5.04 ppm, 5.05 ppm, 5.06 ppm, 5.07 ppm, 5.08 ppm, 5.09 ppm, 5.10 ppm, 5.11 ppm, 5.12 ppm, 5.13 ppm, 5.14 ppm, 5.15 ppm, 5.16 ppm, 5.17 ppm, 5.18 ppm, 5.19 ppm, 5.20 ppm, 5.21 ppm, 5.22 ppm, 5.23 ppm, 5.24 ppm, 5.25 ppm, 5.26 ppm, 5.27 ppm, 5.28 ppm, 5.29 ppm, 5.30 ppm, 5.31 ppm, 5.32 ppm, 5.33 ppm, 5.34 ppm, 5.35 ppm, 5.36 ppm, 5.37 ppm, 5.38 ppm, 5.39 ppm, 5.40 ppm, 5.41 ppm, 5.42 ppm, 5.43 ppm, 5.44 ppm, 5.45 ppm, 5.46 ppm, 5.47 ppm, 5.48 ppm, 5.49 ppm, 5.50 ppm, 5.51 ppm, 5.52 ppm, 5.53 ppm, 5.54 ppm, 5.55 ppm, 5.56 ppm, 5.57 ppm, 5.58 ppm, 5.59 ppm, 5.60 ppm, 5.61 ppm, 5.62 ppm, 5.63 ppm, 5.64 ppm, 5.65 ppm, 5.66 ppm, 5.67 ppm, 5.68 ppm, 5.69 ppm, 5.70 ppm, 5.71 ppm, 5.72 ppm, 5.73 ppm, 5.74 ppm, 5.75 ppm, 5.76 ppm, 5.77 ppm, 5.78 ppm, 5.79 ppm, 5.80 ppm, 5.81 ppm, 5.82 ppm, 5.83 ppm, 5.84 ppm, 5.85 ppm, 5.86 ppm, 5.87 ppm, 5.88 ppm, 5.89 ppm, 5.90 ppm, 5.91 ppm, 5.92 ppm, 5.93 ppm, 5.94 ppm, 5.95 ppm, 5.96 ppm, 5.97 ppm, 5.98 ppm, 5.99 ppm, 6.00 ppm etc, are to be understood by the indication 5 ppm Min and 50 ppm Max. The same applies to all of the other ppm ranges. It is understood that varying target ranges for the mixing can basically also be provided, for example to generate typical flavor profiles of different beer types, and that the initial concentrations in the 0.0% beer and in the 0.5% beer can deviate according to beer type and used technology for dealcoholizing.

Since various flavoring substances such as for example 3-methylbutane-1-ol in 0.0% beer are regularly depleted by the factor of 10 or more with respect to a 0.5% beer, in which various flavoring substances are depleted by the factor of 10 or more with respect to a full beer, correspondingly more flavoring substance concentrate or a comparable amount of a higher concentrated flavoring substance concentrate usually has to be added to generate or restore a mixing with a full beer-typical flavor profile. Therefore, with decreasing ethanol content of the starting beer, it is all the more crucial that the flavoring substance concentrate according to the invention or produced according to the invention contains a content as high as possible or as authentic as possible in particular of the polar flavoring substances indicated in table 3, which are predominantly fermentionally formed, and therefore vitally contribute to the beer-typical flavor. In this context, it is indicated that all of the possible stereoisomers of the respectively mentioned flavoring substances and compounds are to be basically regarded as also disclosed within the scope of the present disclosure.

The parameter values indicated in the documents for the definition of process and measurement conditions for the characterization of specific characteristics of the inventive subject matter are to be considered as encompassed by the scope of the invention also within the scope of deviations—for example due to measurement errors, system errors, weighing errors, DIN tolerances and the like.

The invention claimed is:

1. A method for operating an adsorption system for accumulating flavoring substances as a flavoring substance concentrate, the adsorption system comprising:

at least one working chamber, in which at least one sorption agent which is reversed phase is arranged as a stationary phase in the at least one working chamber of the adsorption system to be traversed by a flavoring substance-containing fluid as a mobile phase such that at least a part of the flavoring substances contained in the fluid adsorbs on the sorption agent, wherein the flavoring substance-containing fluid is a food item from the group of beer, beer-containing beverages, beer wort, hops, hop extract, malt water, malt beer, malt wort and brewery-specific ingredients and products and/or is obtained from an ethanol-containing food item from the group of beer and beer-containing beverages by means of a dealcoholizing device, wherein a ratio of average cross-sectional thickness to total length of the at least one working chamber is at most 0.3 and a total length of the flow path for the fluid provided by the at least one working chamber is at least 4.0 m, wherein the adsorption system further comprises:

a control device, which is formed to operate the adsorption system in an adsorption mode, in which the at least one sorption agent is subjected to the flavoring substance-containing fluid, to adsorb the flavoring substances on the sorption agent, and in a desorption mode, in which the at least one sorption agent is subjected to a fluidic desorption agent to desorb flavoring substances adsorbed to the sorption agent as a flavoring substance concentrate, and at least one tempering device, by means of which the at least one working chamber can be tempered to a predetermined temperature, wherein the adsorption system is operated by means of the control device in the adsorption mode, in which the at least one sorption agent is subjected to the flavoring substance-containing fluid, to adsorb the flavoring substances on the sorption agent, and in the desorption mode, in which the at least one adsorption agent is subjected to a fluidic desorption agent to desorb the flavoring substances adsorbed to the sorption agent as a flavoring substance concentrate; and wherein the at least one working chamber is tempered to the predetermined temperature by means of the at least one tempering device, and wherein the control device is coupled to the tempering device and operates the tempering device such that a lower temperature is adjusted in the adsorption mode than in the desorption mode.

2. The method according to claim 1,
wherein a flavoring substance-containing distillate and/or a flavoring substance-containing membrane permeate of an at least partially dealcoholized beer is used as the fluid and/or that a fluid with an ethanol content between 0% by vol. and 50% by vol. is used.

3. The method according to claim 1,
wherein the flavoring substance-containing fluid is conducted parallel through at least two working chambers and/or that the fluid is serially conducted through at least two working chambers, wherein at least one downstream working chamber has a larger volume than at least one upstream working chamber.

4. The method according to claim 1,
wherein the sorption agent is subjected to a fluidic desorption agent after adsorbing at least a part of the flavoring substances from the fluid such that the flavoring substances adsorbed on the sorption agent at least partially desorb as the flavoring substance concentrate.

5. The method according to claim 4,
wherein the desorption agent is conducted through the at least one working chamber in opposite flow direction compared to the flavoring substance-containing fluid and/or that the desorption agent is serially conducted through at least two working chambers and/or that the desorption agent is pumped opposite to the flow direction of the fluid with a higher differential pressure.

6. The method according to claim 4,
wherein upon conducting through at least one working chamber, a desorption agent gradient is employed and/or a solvent change for gradual desorption of flavor from the same working chamber is employed and/or that different desorption agents are conducted through different working chambers and/or that different desorption agent volumes are conducted through different working chambers.

7. The method according to claim 4,
wherein differently tempered desorption agents are conducted through different working chambers and/or that only predetermined areas of the at least one working chamber are subjected to desorption agent and/or that at least one working chamber is subjected to a desorption agent at increased pressure with respect to a standard pressure.

8. The method according to claim 4,
wherein at least a part of a first flavoring substance concentrate from at least one working chamber of a first accumulation stage of the adsorption system is separated into at least one flavoring permeate depleted in flavoring substances and into at least one second flavoring substance concentrate accumulated in flavoring substances by means of a high concentration device, which starting from the first flavoring substance concentrate produce the second flavoring substance concentrate with a relative depletion of ethanol to the flavoring substances.

\* \* \* \* \*

UNITED STATES PATENT AND TRADEMARK OFFICE
CERTIFICATE OF CORRECTION

PATENT NO. : 11,118,147 B2
APPLICATION NO. : 15/773908
DATED : September 14, 2021
INVENTOR(S) : Hasselbarth et al.

Page 1 of 1

It is certified that error appears in the above-identified patent and that said Letters Patent is hereby corrected as shown below:

On the Title Page

Item (30): Foreign Application Priority Data
Please add:
--DE 10 2015 119 154.7 filed on November 06, 2015
DE 10 2016 105 993.5 filed on April 01, 2016
DE 10 2016 105 992.7 filed on April 01, 2016
DE 10 2016 105 997.8 filed on April 01, 2016--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*